(12) United States Patent
Campbell et al.

(10) Patent No.: US 11,192,053 B2
(45) Date of Patent: *Dec. 7, 2021

(54) FILTER CARTRIDGES; FEATURES AND METHODS OF ASSEMBLY; AIR CLEANER ASSEMBLIES; AND, FILTER CARTRIDGE COMBINATIONS

(71) Applicant: Donaldson Company, Inc.

(72) Inventors: Steven Campbell, Lakeville, MN (US); Michel Baseotto, Hasselt (BE)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/851,244

(22) Filed: Apr. 17, 2020

(65) Prior Publication Data

US 2020/0353397 A1    Nov. 12, 2020

Related U.S. Application Data

(63) Continuation of application No. 15/935,271, filed on Mar. 26, 2018, now Pat. No. 10,625,191, which is a
(Continued)

(51) Int. Cl.
*B01D 46/00* (2006.01)
*B01D 46/24* (2006.01)
(Continued)

(52) U.S. Cl.
CPC ..... *B01D 46/0005* (2013.01); *B01D 46/0019* (2013.01); *B01D 46/0023* (2013.01);
(Continued)

(58) Field of Classification Search
CPC .......... B01D 46/02; B01D 46/0019; B01D 46/0023; B01D 46/0002; B01D 46/0004; B01D 46/0005; B01D 46/0024; B01D 46/0098; B01D 46/2411; B01D 46/2414; B01D 46/521; B01D 46/522;
(Continued)

(56) References Cited

U.S. PATENT DOCUMENTS 2,962,121 A    3/1958   Wilber
3,160,488 A    12/1964  Wilber
(Continued)

FOREIGN PATENT DOCUMENTS

DE    38 18 595    12/1989
DE    19944344     3/2000
(Continued)

OTHER PUBLICATIONS

International Search Report for PCT/US2013/072495 dated Jun. 11, 2014 (9 pages).
(Continued)

*Primary Examiner* — Minh Chau T Pham
(74) *Attorney, Agent, or Firm* — Merchant & Gould P.C.

(57) ABSTRACT

Filter cartridge arrangements, features thereof and assembly for use therewith, are provided. Selected filter cartridge features are disclosed. Methods of assembly and systems for use are described.

19 Claims, 64 Drawing Sheets

Related U.S. Application Data continuation of application No. 14/646,532, filed as application No. PCT/US2013/072495 on Nov. 29, 2013, now Pat. No. 9,925,485, which is a continuation of application No. 13/834,885, filed on Mar. 15, 2013, now abandoned, and a continuation of application No. 13/841,440, filed on Mar. 15, 2013, now Pat. No. 9,067,161.

(60) Provisional application No. 61/731,259, filed on Nov. 29, 2012.

(51) Int. Cl.
  B01D 46/52 (2006.01)
  F02M 35/02 (2006.01)
  F02M 35/024 (2006.01)
  B01D 46/02 (2006.01)

(52) U.S. Cl.
  CPC ......... *B01D 46/0098* (2013.01); *B01D 46/02* (2013.01); *B01D 46/2411* (2013.01); *B01D 46/2414* (2013.01); *B01D 46/522* (2013.01); *B01D 46/523* (2013.01); *F02M 35/0216* (2013.01); *F02M 35/0245* (2013.01); *F02M 35/02416* (2013.01); *B01D 2201/127* (2013.01); *B01D 2201/295* (2013.01); *B01D 2271/027* (2013.01)

(58) Field of Classification Search
  CPC ............ B01D 46/523; B01D 2271/027; B01D 2201/295; B01D 2201/127; F02M 35/0245; F02M 35/02416; F02M 35/0216
  USPC ...... 55/385.3, 490, 498, 502, 482, 510, 521, 55/DIG. 5, DIG. 28; 123/198 E
  See application file for complete search history.

(56) References Cited

U.S. PATENT DOCUMENTS

| | | | |
|---|---|---|---|
| 4,135,899 A | 1/1979 | Gauer | |
| 4,261,710 A | 4/1981 | Sullivan | |
| 4,999,108 A | 3/1991 | Koch et al. | |
| 5,522,909 A | 6/1996 | Haggard | |
| 5,916,435 A | 6/1999 | Spearman | |
| 6,235,073 B1* | 5/2001 | Bannister | B01D 35/30 411/166 |
| 6,312,489 B1 | 11/2001 | Ernst et al. | |
| 6,383,244 B1 | 5/2002 | Wake et al. | |
| 6,416,561 B1 | 7/2002 | Kallsen | |
| D471,623 S | 3/2003 | Gieseke et al. | |
| 6,540,806 B2 | 4/2003 | Reinhold | |
| 6,572,667 B1 | 6/2003 | Greif et al. | |
| 6,599,342 B2 | 6/2003 | Andress | |
| D477,659 S | 7/2003 | Gieseke et al. | |
| 6,602,308 B1 | 8/2003 | Carle | |
| D481,101 S | 10/2003 | Boehrs | |
| 6,652,614 B2 | 11/2003 | Gieseke et al. | |
| 6,662,954 B2 | 12/2003 | Gottwald-Grill | |
| 6,736,874 B2 | 5/2004 | Reiger | |
| 6,837,920 B2 | 1/2005 | Gieseke et al. | |
| 6,986,805 B2 | 1/2006 | Gieseke et al. | |
| 7,070,642 B2 | 4/2006 | Scott et al. | |
| 7,115,156 B2 | 10/2006 | Schaerlund | |
| 7,267,706 B2 | 9/2007 | Schaerlund | |
| 7,291,198 B2 | 11/2007 | Gieseke et al. | |
| 7,311,748 B2 | 12/2007 | Holmes | |
| 7,413,588 B2 | 8/2008 | Holzmann | |
| 7,524,349 B2 | 4/2009 | Schrage et al. | |
| 7,537,631 B2 | 5/2009 | Scott et al. | |
| 7,572,310 B2 | 8/2009 | Gieseke et al. | |
| 7,662,203 B2 | 8/2010 | Scott et al. | |
| RE41,713 E | 9/2010 | Gunderson | |
| 7,828,870 B1 | 11/2010 | Rech | |
| RE42,174 E | 3/2011 | Gunderson | |
| 7,981,186 B2 | 7/2011 | Schrage et al. | |
| 7,981,187 B2 | 7/2011 | Gieseke et al. | |
| 7,988,757 B2 | 8/2011 | Scott et al. | |
| 8,038,756 B2 | 10/2011 | Iddings et al. | |
| 8,066,791 B2 | 11/2011 | Baseotto et al. | |
| 8,142,533 B2 | 3/2012 | Gillenberg | |
| 8,147,576 B2 | 4/2012 | Gillenberg | |
| 8,152,876 B2 | 4/2012 | Gillenberg | |
| 8,163,056 B2 | 4/2012 | Coulonvaux et al. | |
| 8,202,419 B2 | 6/2012 | Wallerstorfer et al. | |
| 8,216,335 B2 | 7/2012 | Scott et al. | |
| 8,273,143 B2 | 9/2012 | Coulonvaux et al. | |
| 8,287,612 B2 | 10/2012 | Gillenberg | |
| 8,292,984 B2 | 10/2012 | Baseotto et al. | |
| 8,394,166 B2 | 3/2013 | Scott et al. | |
| 8,414,675 B2 | 4/2013 | Iddings et al. | |
| 8,460,452 B2 | 6/2013 | Scott et al. | |
| 8,758,470 B2 | 6/2014 | Blossey et al. | |
| 8,784,523 B2 | 7/2014 | Coulonvaux et al. | |
| 9,039,802 B2 | 5/2015 | Scott et al. | |
| 9,067,161 B2* | 6/2015 | Campbell | B01D 46/0005 |
| 9,162,174 B2 | 10/2015 | Baseotto et al. | |
| 9,221,004 B2 | 12/2015 | Iddings et al. | |
| 9,353,657 B2 | 5/2016 | Scott et al. | |
| 9,586,166 B2 | 3/2017 | Coulonvaux et al. | |
| 9,889,398 B2 | 2/2018 | Campbell et al. | |
| 9,925,485 B2* | 3/2018 | Campbell | B01D 46/2411 |
| 10,029,199 B2 | 7/2018 | Scott et al. | |
| 10,245,544 B2 | 4/2019 | Iddings et al. | |
| 10,307,704 B2 | 6/2019 | Scott et al. | |
| 10,625,191 B2* | 4/2020 | Campbell | B01D 46/522 |
| 10,710,017 B2 | 7/2020 | Baseotto et al. | |
| 10,717,034 B2 | 7/2020 | Scott et al. | |
| 10,751,661 B2 | 8/2020 | Iddings et al. | |
| 10,786,772 B2 | 9/2020 | Baseotto et al. | |
| 11,007,462 B2 | 5/2021 | Coulonvaux et al. | |
| 2002/0040569 A1 | 4/2002 | Reinhold | |
| 2003/0146149 A1 | 8/2003 | Binder et al. | |
| 2004/0134171 A1* | 7/2004 | Scott | B01D 46/521 55/482 |
| 2007/0163945 A1 | 7/2007 | Banzhaf et al. | |
| 2007/0170103 A1 | 7/2007 | Fick | |
| 2009/0049814 A1* | 2/2009 | Baseotto | B01D 46/2411 55/482 |
| 2009/0101567 A1 | 4/2009 | Benson et al. | |
| 2009/0188856 A1 | 6/2009 | Benson et al. | |
| 2010/0000414 A1* | 1/2010 | Williams | B01D 46/2414 96/226 |
| 2010/0243554 A1 | 9/2010 | Herrin et al. | |
| 2011/0094197 A1 | 4/2011 | Gillenberg et al. | |
| 2011/0247582 A1 | 10/2011 | Blossey et al. | |
| 2011/0308212 A1 | 12/2011 | Kaufmann et al. | |
| 2012/0055127 A1 | 3/2012 | Holzmann et al. | |
| 2013/0086877 A1 | 4/2013 | Kori et al. | |
| 2013/0199138 A1 | 8/2013 | Scott et al. | |
| 2014/0102060 A1 | 4/2014 | Kato et al. | |
| 2014/0174296 A1 | 6/2014 | Schultz et al. | |
| 2014/0298763 A1 | 10/2014 | Blossey et al. | |

FOREIGN PATENT DOCUMENTS

| | | |
|---|---|---|
| DE | 198 49 998 | 5/2000 |
| EP | 1 123 460 | 8/2001 |
| EP | 1 128 891 | 9/2001 |
| EP | 1 144 078 | 10/2001 |
| WO | WO 2004/009215 | 1/2004 |
| WO | WO 2009/014986 | 1/2009 |
| WO | WO 2009/047196 | 4/2009 |
| WO | WO 2010/057843 | 5/2010 |
| WO | WO 2011/110952 | 9/2011 |
| WO | WO 2012/116314 | 8/2012 |

OTHER PUBLICATIONS

International Written Opinion for PCT/US2013/072495 dated Jun. 11, 2014 (16 pages).

(56) References Cited

OTHER PUBLICATIONS

Declaration with Exhibits of Daniel E. Adamek dated Sep. 7, 2016.
Declaration with Exhibits of Johan Fobe dated May 22, 2017.
Exhibit A, Pending claims of U.S. Appl. No. 16/931,658 dated Aug. 11, 2020.
Exhibit B, Pending claims of U.S. Appl. No. 16/918,790 dated Aug. 11, 2020.
Exhibit C, Pending claims of U.S. Appl. No. 16/291,164 dated Aug. 11, 2020.
Exhibit D, Pending claims of U.S. Appl. No. 15/450,625 dated Aug. 11, 2020.
The Examiner's attention is directed to issued U.S. Pat. No. 9,067,161 with respect to any potential double patenting considerations.
The Examiner's attention is directed issued U.S. Pat. No. 9,925,485 with respect to an potential double patenting considerations.
The Examiner's attention is directed to issued U.S. Pat. No. 9,889,398 with respect to any potential double patenting considerations.
The Examiner's attention is directed to issued U.S. Pat. No. 10,625,191 with respect to any potential double patenting considerations.
The Examiner's attention is issued U.S. Pat. No. 7,070,642, for consideration of any double patenting considerations.
The Examiner's attention is also directed to U.S. Pat. No. 7,662,203, for consideration of any double patenting considerations.
The Examiner's attention is also directed to U.S. Pat. No. 7,988,757, for consideration of any double patenting considerations.
The Examiner's attention is also directed to issued U.S. Pat. No. 8,460,425 for consideration of any double patenting considerations.
The Examiner's attention is also directed to issued U.S. Pat. No. 8,852,309 for consideration of any double patenting considerations.
The Examiner's attention is directed to issued U.S. Pat. No. 9,353,657 with respect to any potential double patenting considerations.
The Examiner's attention is directed to issued U.S. Pat. No. 10,029,199 with respect to any potential double patenting considerations.
The Examiner's attention is directed to issued U.S. Pat. No. 10,717,034 with respect to any potential double patenting considerations.
The Examiner's attention is directed to the pending claims of U.S. Appl. No. 16/931,658 with respect to any potential double patenting considerations. Pending claims is attached as Exhibit A.
The Examiner's attention is also directed to issued U.S. Pat. No. 8,216,335 with respect to any potential double patenting considerations.
The Examiner's attention is directed to issued U.S. Pat. No. 8,394,166 with respect to any potential double patenting considerations.
The Examiner's attention is also directed issued U.S. Pat. No. 8,702,831 for consideration of any double patenting considerations.
The Examiner's attention is also directed issued U.S. Pat. No. 9,039,802 for consideration of any double patenting considerations.
The Examiner's attention is directed to U.S. Pat. No. 10,307,704 with respect to any potential double patenting considerations.
The Examiner's attention is also directed to issued U.S. Pat. No. 7,524,349, for consideration of any double patenting considerations.
The Examiner's attention is also directed to issued U.S. Pat. No. 7,981,186, for consideration of any double patenting considerations.
The Examiner's attention is directed to issued U.S. Pat. No. 8,292,984 with respect to any potential double patenting considerations.
The Examiner's attention is directed to issued U.S. Pat. No. 8,814,973 with respect to any potential double patenting considerations.
The Examiner's attention is directed to issued U.S. Pat. No. 9,718,019 with respect to any potential double patenting considerations.
The Examiner's attention is directed to issued U.S. Pat. No. 10,710,017 with respect to any potential double patenting considerations.
The Examiner's attention is directed to the pending claims of U.S. Appl. No. 16/918,790 with respect to any potential double patenting consideration. Pending claims is attached as Exhibit B.
The Examiner's attention is directed to issued U.S. Pat. No. 8,066,791 with respect to any potential double patenting considerations.
The Examiner's attention is directed to issued U.S. Pat. No. 8,480,778 with respect to any potential double patenting considerations.
The Examiner's attention is directed to issued U.S. Pat. No. 9,238,189 with respect to any potential double patenting considerations.
The Examiner's attention is directed issued U.S. Pat. No. 10,124,285 with respect to any potential double patenting considerations.
The Examiner's attention is also directed issued U.S. Pat. No. 8,038,756 for consideration of any double patenting considerations.
The Examiner's attention is directed to issued U.S. Pat. No. 8,545,588 with respect to any double patenting considerations.
The Examiner's attention is directed issued U.S. Pat. No. 9,221,004 with respect to any potential double patenting considerations.
The Examiner's attention is directed to U.S. Pat. No. 10,245,544 with respect to any potential double patenting considerations.
The Examiner's attention is directed to the pending claims of U.S. Appl. No. 16/291,164 with respect to any potential double patenting considerations. Currently pending claims is attached as Exhibit C.
The Examiner's attention is also directed to issued U.S. Pat. No. 8,273,143, for consideration of any double patenting considerations.
The Examiner's attention is also directed to issued U.S. Pat. No. 8,784,523, for consideration of any double patenting considerations.
The Examiner's attention is directed to issued U.S. Pat. No. 9,586,166 with respect to any potential double patenting considerations.
The Examiner's attention is directed to the pending claims of U.S. Appl. No. 15/450,625 with respect to any potential double patenting considerations. Pending claims is attached as Exhibit D.
The Examiner's attention is directed to issued U.S. Pat. No. 8,414,675 with respect to any potential double patenting considerations.

* cited by examiner

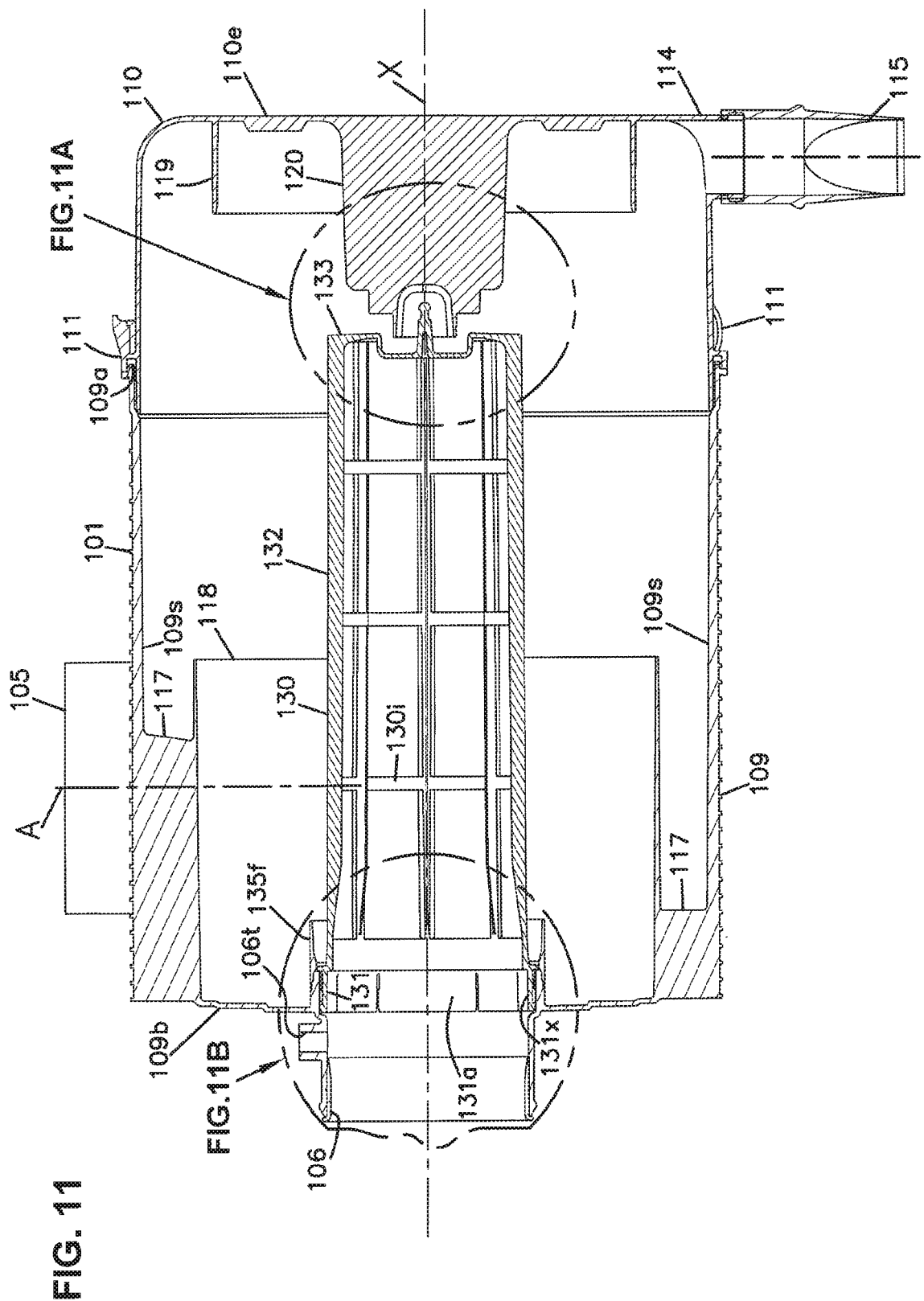

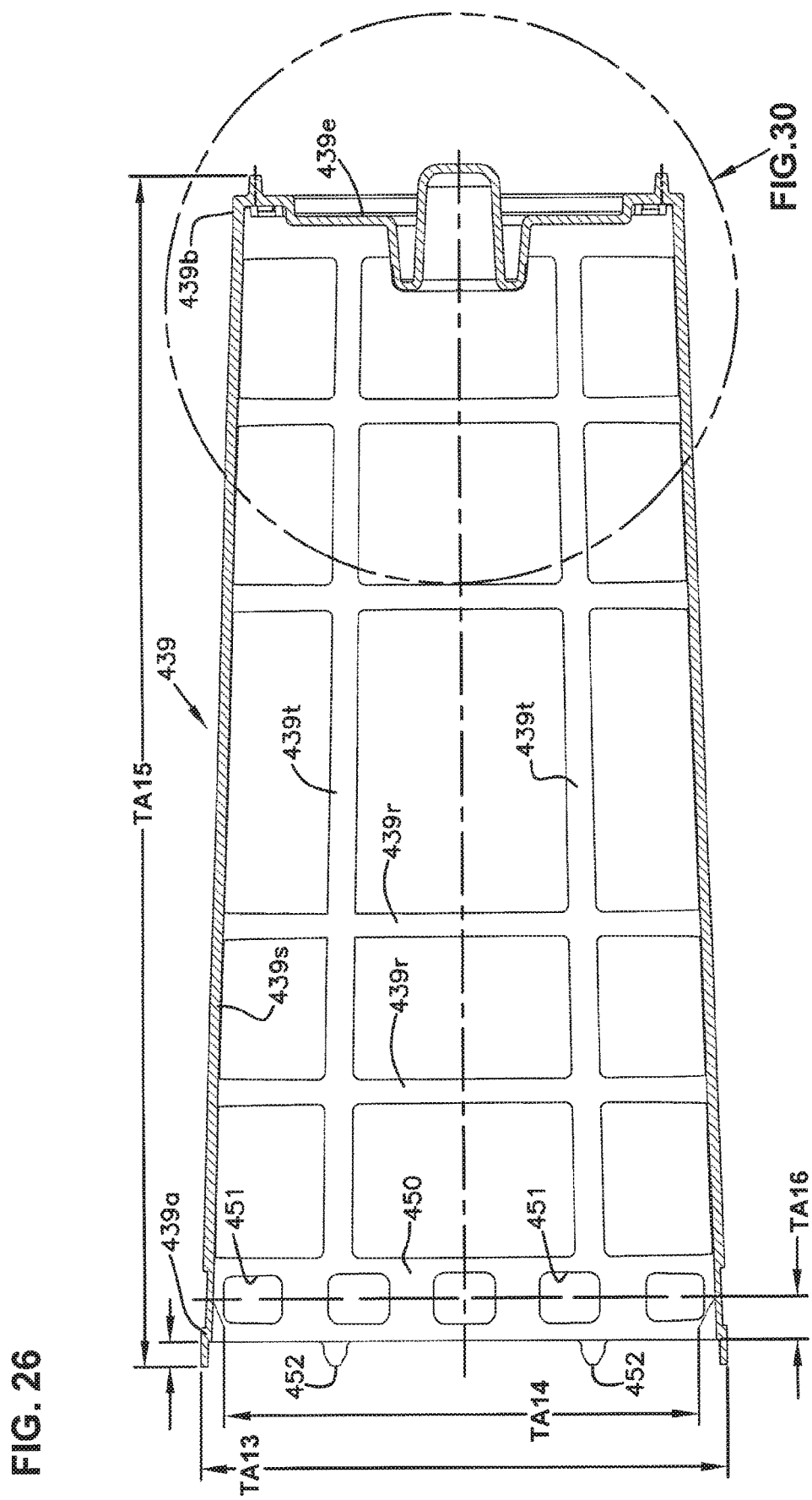

FILTER CARTRIDGES; FEATURES AND METHODS OF ASSEMBLY; AIR CLEANER ASSEMBLIES; AND, FILTER CARTRIDGE COMBINATIONS

CROSS-REFERENCE TO RELATED APPLICATION

This application is a continuation of U.S. Ser. No. 15/935,271, filed Mar. 26, 2018, now U.S. Pat. No. 10,625,191. U.S. Ser. No. 15/935,271 is a continuation of U.S. Ser. No. 14/646,532, filed May 21, 2015, now U.S. Pat. No. 9,925,485. U.S. Ser. No. 14/646,532 is a National Stage of International Application No. PCT/US2013/072495, filed Nov. 29, 2013, which claims benefit of U.S. Ser. No. 61/731,259, filed Nov. 29, 2012; U.S. Ser. No. 13/834,885, filed March 15, 2013, now abandoned; and, U.S. Ser. No. 13/841,440, filed Mar. 15, 2013, now U.S. Pat. No. 9,067,161. The above referenced application includes with edits, the disclosures of U.S. Ser. No. 13/841,440, filed Mar. 13, 2013; and, U.S. Ser. No. 13/834,885, also filed Mar. 15, 2013, each of which included the disclosure of, with edits, U.S. Ser. No. 61/731,259, filed Nov. 29, 2012. The complete disclosures of U.S. Ser. Nos. 15/935,271; 14/646,532; PCT/US2013/072495; U.S. Ser. No. 13/841,440; U.S. Ser. No. 13/834,885; and, U.S. Ser. No. 61/731,259 are incorporated herein by reference. To the extent appropriate, a claim of priority is made to U.S. Ser. Nos. 15/935,271; 14/646,532; PCT/US2013/072495; U.S. Ser. No. 13/841,440; U.S. Ser. No. 13/834,885; and, U.S. Ser. No. 61/731,259.

FIELD OF THE DISCLOSURE

The present disclosure relates to filter assemblies, filter cartridges, features and techniques. Certain selected example features and techniques described are configured to be particularly convenient as, or for use with, secondary or safety filter cartridges for air or other gas filter arrangements and assemblies. Also, advantageous main filter cartridges and advantageous filter assemblies are also described. Preferred features of selected filter cartridges, filter assemblies, and methods of assembly are described.

BACKGROUND

Gas filters are used in a variety of assemblies and systems. For example, it is desirable to filter intake air to a variety of vehicles and other equipment. Typically, the intake air is combustion air for an internal combustion engine, often a diesel engine. Filtration is generally conducted with a gas (air) cleaner assembly (i.e. a filter assembly) typically including a housing and an internally positioned filter cartridge arrangement. The filter cartridge arrangement typically includes a main filter cartridge, through which the air is passed and which is operated with deposition of particulate material carried therein onto filter media of a main filter cartridge. In a variety of air cleaner assemblies, the main filter cartridge and the remainder of the assembly are configured for out-to-in flow during filtering, in reference to direction of air flow through the media of the main filter cartridge, during normal operation. When this is the case, the media of the main filter cartridge is typically configured surrounding an open filter interior that is a clean air side of the media.

In many instances, a safety or secondary filter cartridge is included within the filter assembly. When a safety or secondary filter cartridge is used with an assembly configured for out-to-in flow during filtering, the safety filter is typically configured with media thereof surrounding an open filter interior and projecting into an open filter (clean gas) interior of the main filter cartridge. Thus, after the gases (air) pass through the media of the main filter cartridge, the gases (air) pass through the media of the safety filter cartridge as those gases (air) are directed toward an outlet from the air cleaner.

In a typical assembly, both the main filter cartridge and the safety filter cartridge are configured as service components. That is, they are configured to be removable from, and to be replaceable within, the air cleaner assembly. As a result, each is typically provided with a releasable housing seal, i.e., a seal which removably seals to a portion of the housing or air cleaner assembly, when the two filter cartridges are properly and operably positioned. Such seals are sometimes referred to as "releasable seals" since they can be established and be removed without damage to the cartridges or housing component(s) engaged.

A variety of assemblies have been developed which can use such general arrangements. Examples are described in WO 2009/014986 A1 and WO 2012/116314 A1, each which is incorporated herein by reference and which are owned by the owner of the present disclosure, Donaldson Co., Inc., of Bloomington Minn.

Issues relating to the safety or secondary filter cartridge configuration concern limitations in its size and shape imposed by the requirements of the gas filter assembly for location of the safety filter, typically enclosed within the main filter cartridge yet still meant to be removably sealed to a feature of the air cleaner assembly or housing; and the preferred desire to be able to service the main filter without dislodging the safety. Improvements have been sought.

In addition, main filter cartridge features are generally sought to be improved, with respect to a variety of such issues as: managing appropriate interaction with a safety filter cartridge or other cartridge support when present; and, for appropriate housing interaction as well as secure installation and convenient assembly. Features characterized herein facilitate this in selected applications.

Herein, in addition, selected features and filter assemblies, including housings therefor, for advantageous use, assembly, and operation are described. Also, methods are depicted.

SUMMARY

According to the present disclosure, some advantageous features of filter assemblies, such as air cleaner assemblies are provided. Selected advantageous features concern a variety of components for such an assembly. Selected features described and disclosed relate to one or more of: a main filter cartridge; a housing; and, a secondary or safety filter cartridge. There is no specific requirement that all of the advantageous features with respect to all of the components described be implemented, in order to obtain some advantage according to the present disclosure.

According to one aspect of the present disclosure, a filter cartridge, typically to be used as a secondary or safety filter cartridge by being positioned with media thereof oriented projecting into an open interior of a main filter cartridge, is provided. The safety or secondary filter cartridge comprises an extension of media, typically surrounding an open filter interior and having a first end and the second end. In preferred configurations, at the first end, the media either: has no pleats; or, if pleated, preferably has no pleats greater than about 3 millimeters in depth, more preferably no greater than 2 mm in depth. However, at the second end, in most preferred applications, the media is pleated, with a pleat depth of at least 5 mm, typically at least 10 mm and often at least 15 mm.

This overall media and pleat configuration can be provided in a filter cartridge with a variety of additional features, to substantial advantage, as discussed below. In addition, it allows for an advantageous combination with main filter cartridge features and/or filter assembly features generally.

According to an alternate aspect of the present disclosure, some features and techniques usable in a media support, for advantageously securing a filter cartridge in place, especially a secondary safety filter cartridge, are discussed and described. These can be used in combination with the preferred pleat feature(s) identified above, or in alternate configurations as desired. In an example depicted, an end of a frame for the cartridge includes an aperture therethrough, which is lined, and in some instances closed, by a cushion and/or seal (grommet) member. The housing can include structure that projects into engagement with the cushion and/or seal member, to advantage. Also, a main cartridge can include features that engage the cushion and/or seal member, to advantage.

Also, herein selected advantageous structural features, for example media support features, for preferred filter cartridges are described. These can be used in association with the various features described previously in this section, or independently, to advantage.

Methods of assembling a filter cartridge in accord with the features described herein are also provided. The methods can be used to advantage, to achieve a desirable filter cartridge in an efficient manner.

Also according to the present disclosure, filter assemblies, including features specifically and advantageously configured for use with preferred filter cartridges are described herein are shown and described. Also main or primary filter cartridge configurations that particularly well adapted for use with components as characterized herein are described. Further, methods of installing main filter cartridges are described There is no specific requirement that a filter cartridge or component include all of the features specifically characterized herein, or even as specifically characterized above in this section, in order to obtain some benefit according to the present disclosure. Further, there is no specific requirement that the features described herein, in the context of a safety or secondary filter cartridge, only be implemented in a safety filter cartridge, as opposed to an alternate filter cartridge, unless otherwise specifically recited. In addition, while the techniques are described in connection with air filtration, they can be applied with other types of gas filters or in filtering of other media. It is noted, however, that the techniques were particularly developed for, and are particularly advantageous for, air filter applications, especially these involving either or both of: a secondary or safety filter cartridge; and, a central support position in the housing.

BRIEF DESCRIPTION OF THE DRAWINGS

The general features of FIGS. 1-15 were included in the identified priority document U.S. Ser. No. 13/841,440, filed Mar. 15, 2013 and incorporated herein by reference.

FIG. 11 is a schematic cross-sectional view of an example housing for use in an air cleaner assembly that can include a cartridge according to FIGS. 1-10, according to the present disclosure.

The following FIGS. 16-57, were not included in the various priority documents identified above and incorporated herein by reference.

Figure 16:
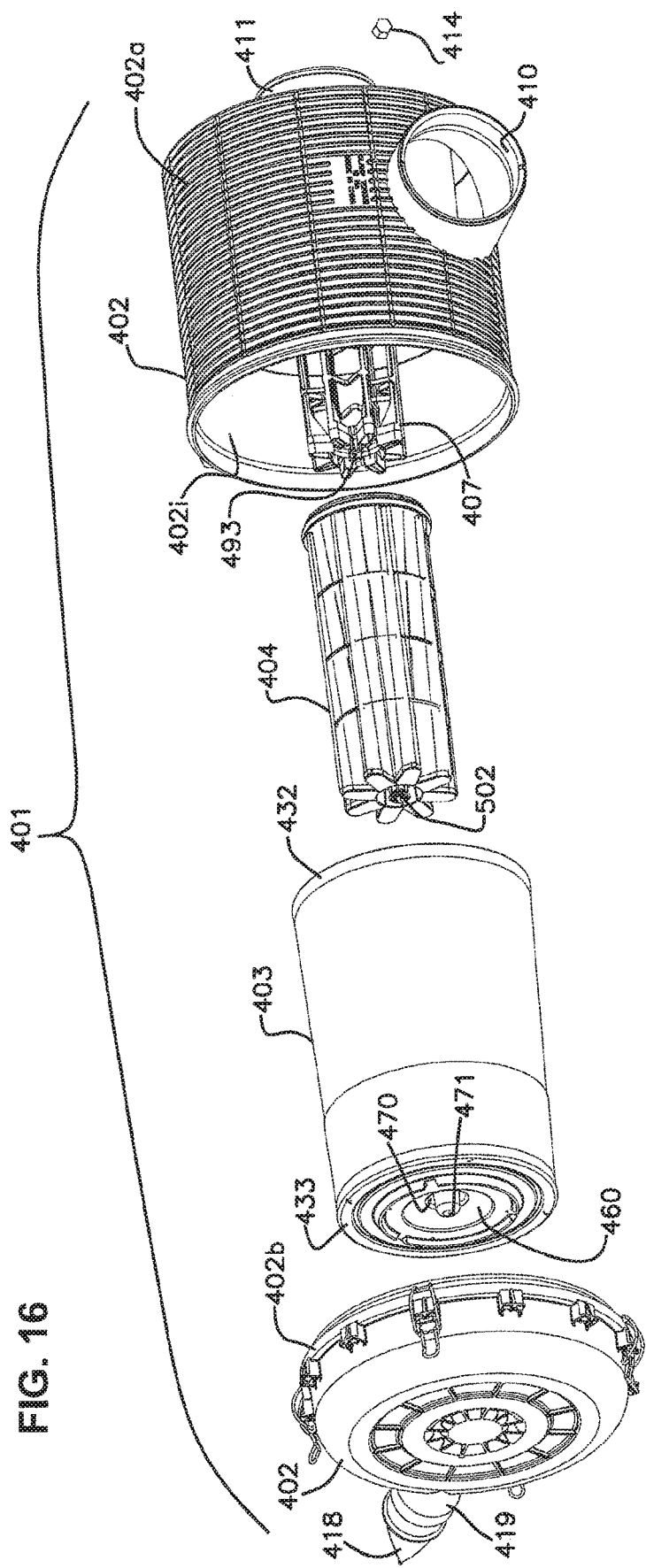

FIG. 16 is an exploded, schematic, perspective view of an air cleaner assembly including selected components according to selected features of the present disclosure.

Figure 17:
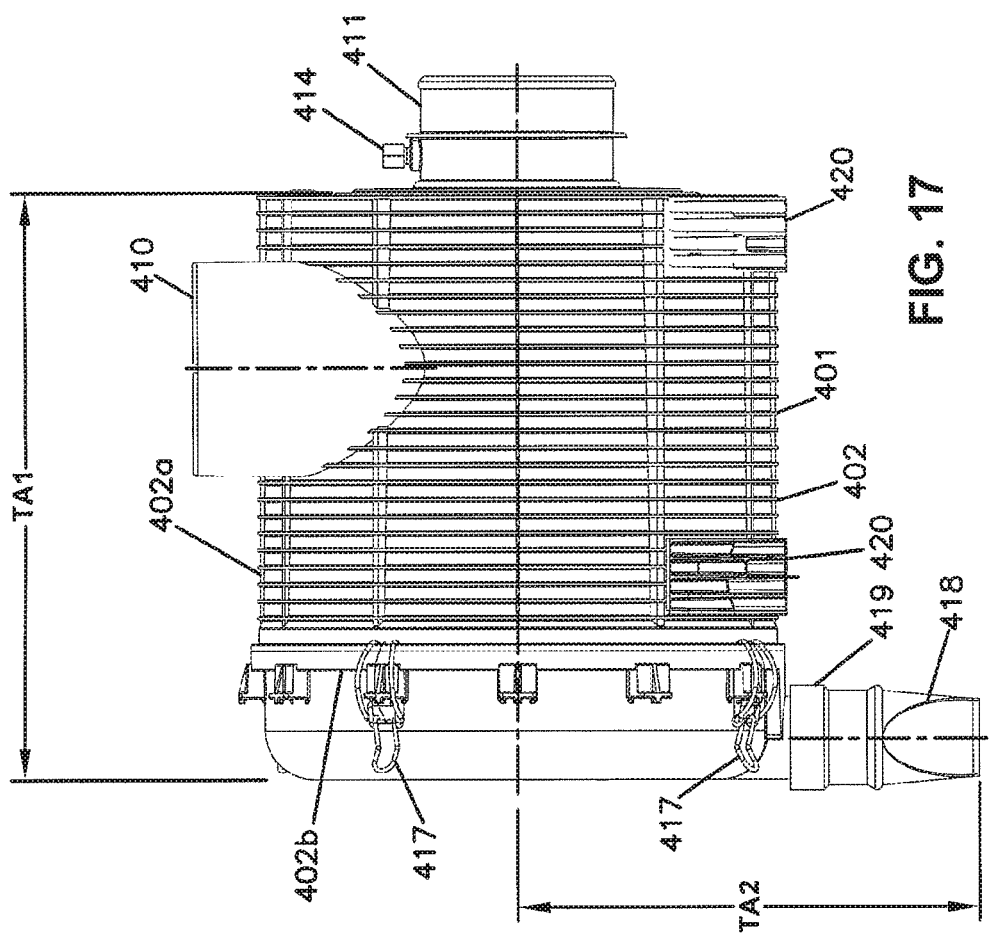

FIG. 17 is a schematic side elevational view of the air cleaner assembly of FIG. 16.

Figure 18:
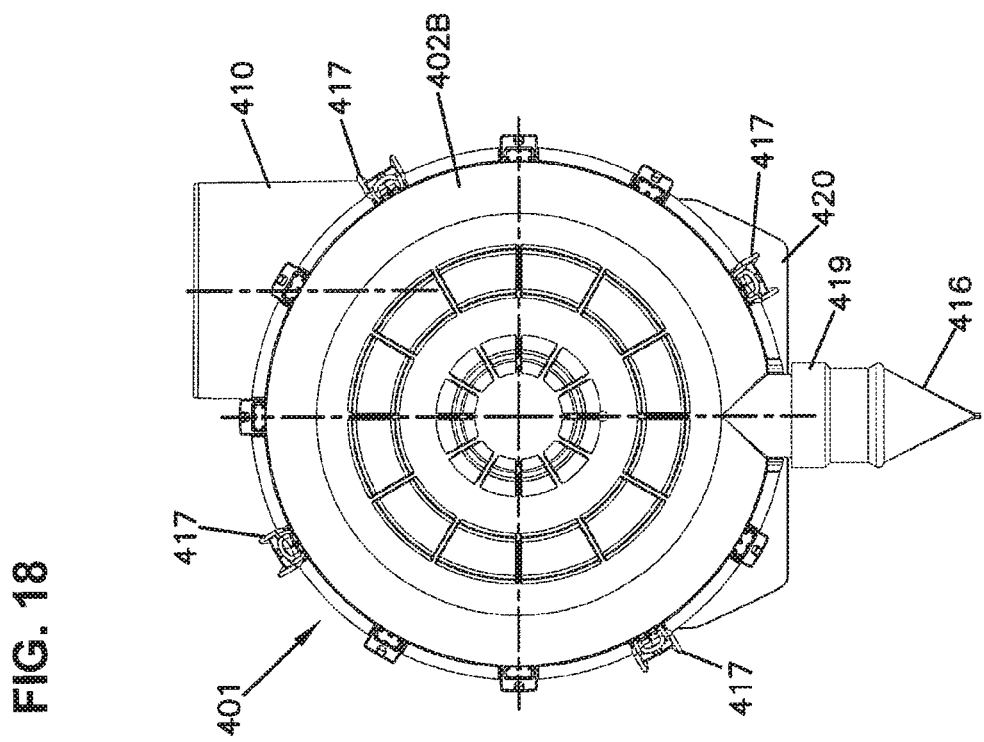

FIG. 18 is a schematic end plan view of the air cleaner assembly of FIG. 17.

Figure 19:
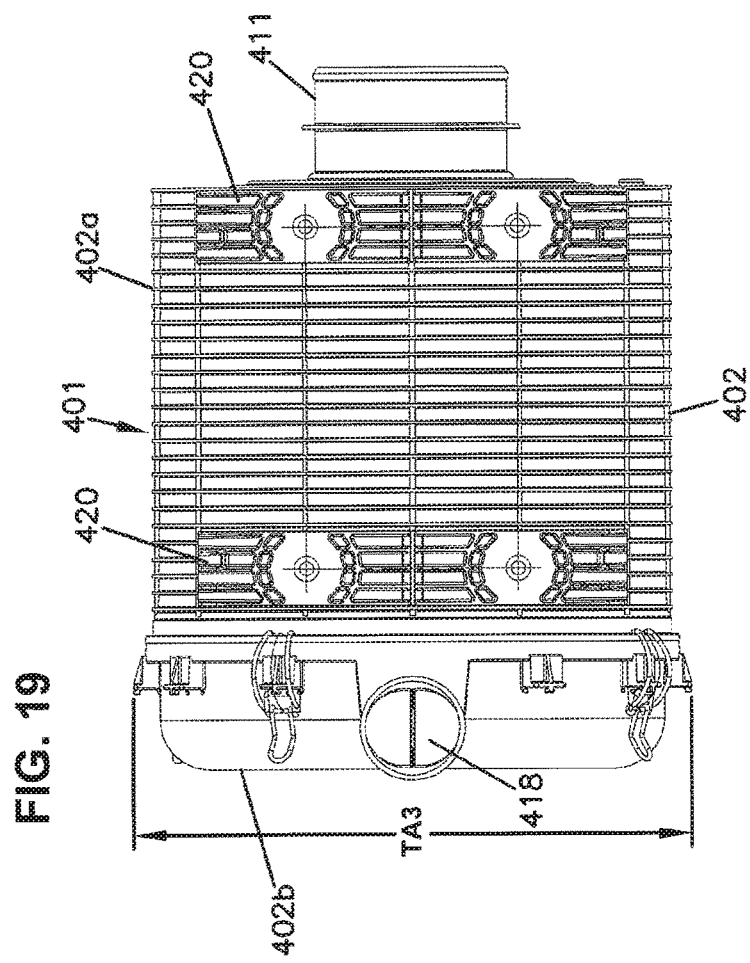

FIG. 19 is a schematic bottom plan view of the air cleaner assembly of FIG. 17.

Figure 20:
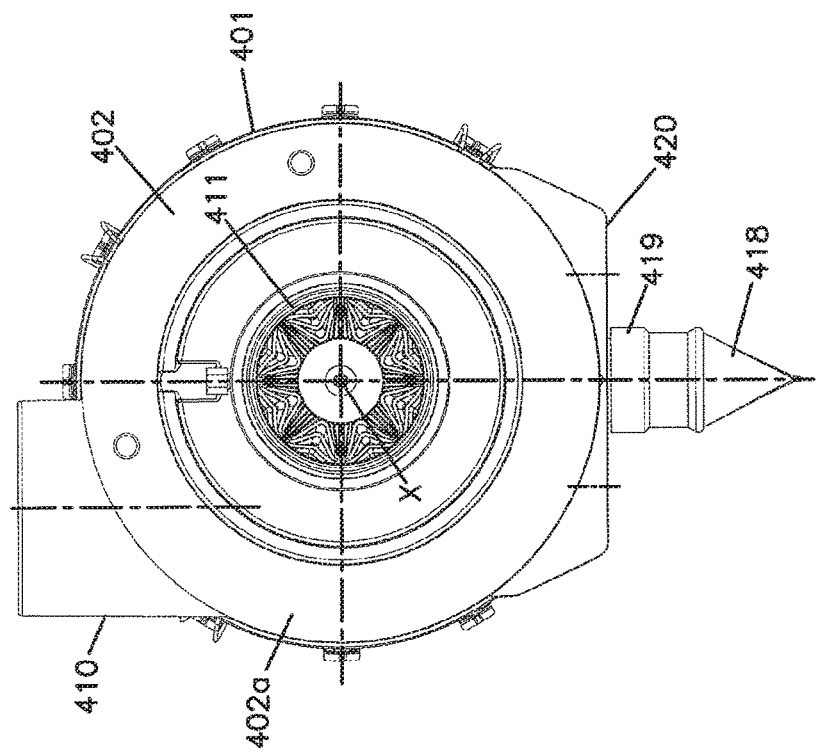

FIG. 20 is a schematic outlet end view of the air cleaner assembly of FIG. 17.

Figure 21:
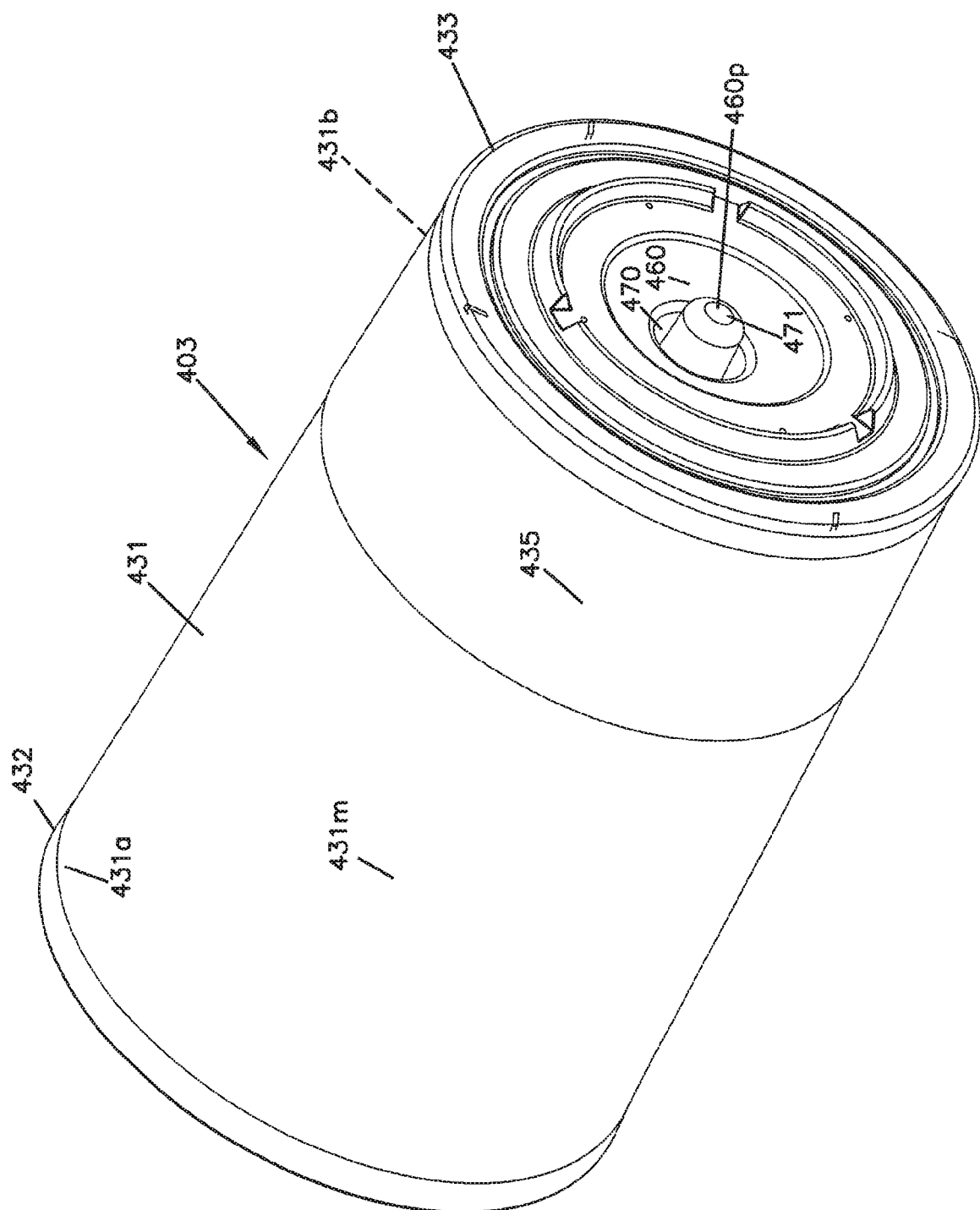

FIG. 21 is a schematic perspective view of a main filter cartridge component of FIG. 16-20.

Figure 22:
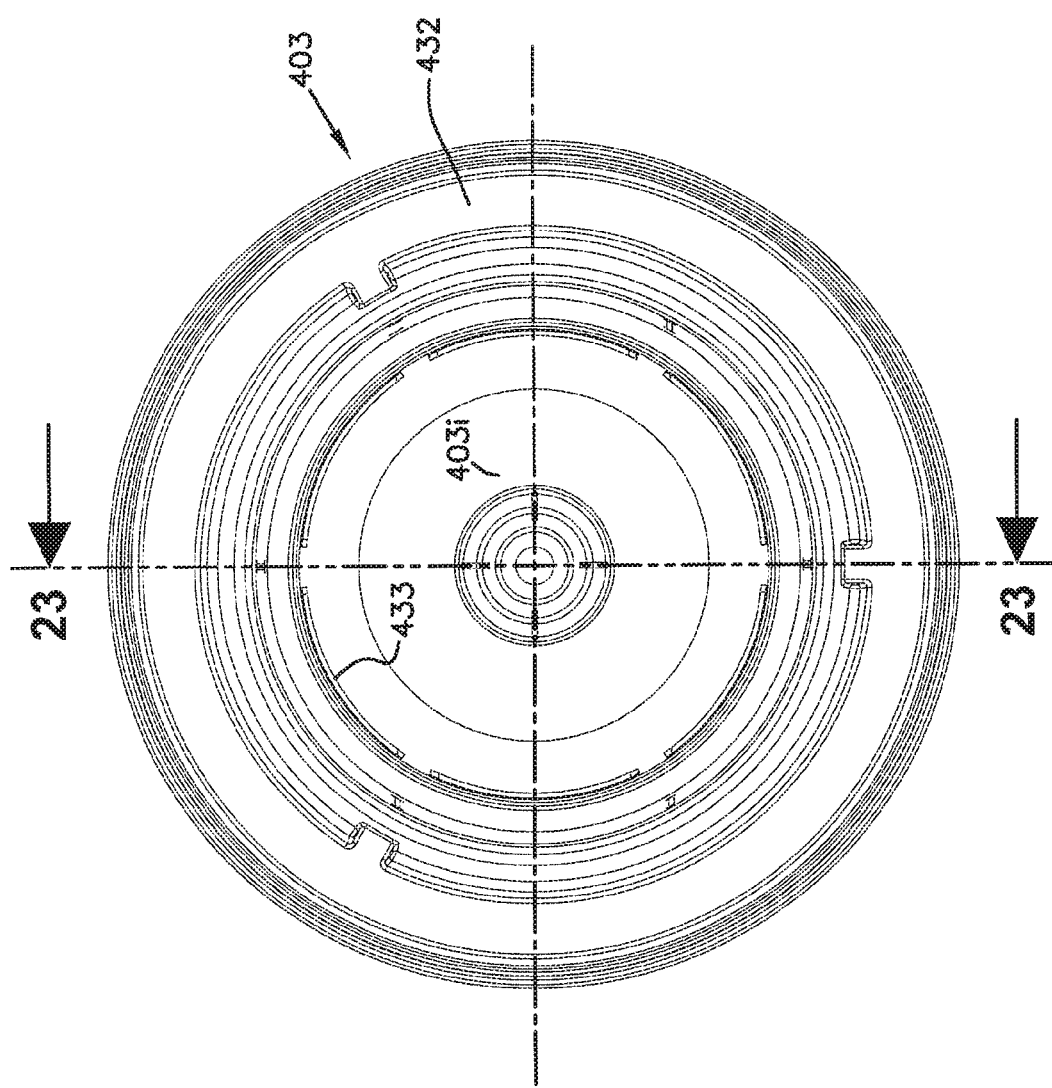

FIG. 22 is a schematic open end plan view of the filter cartridge of FIG. 21.

Figure 23:
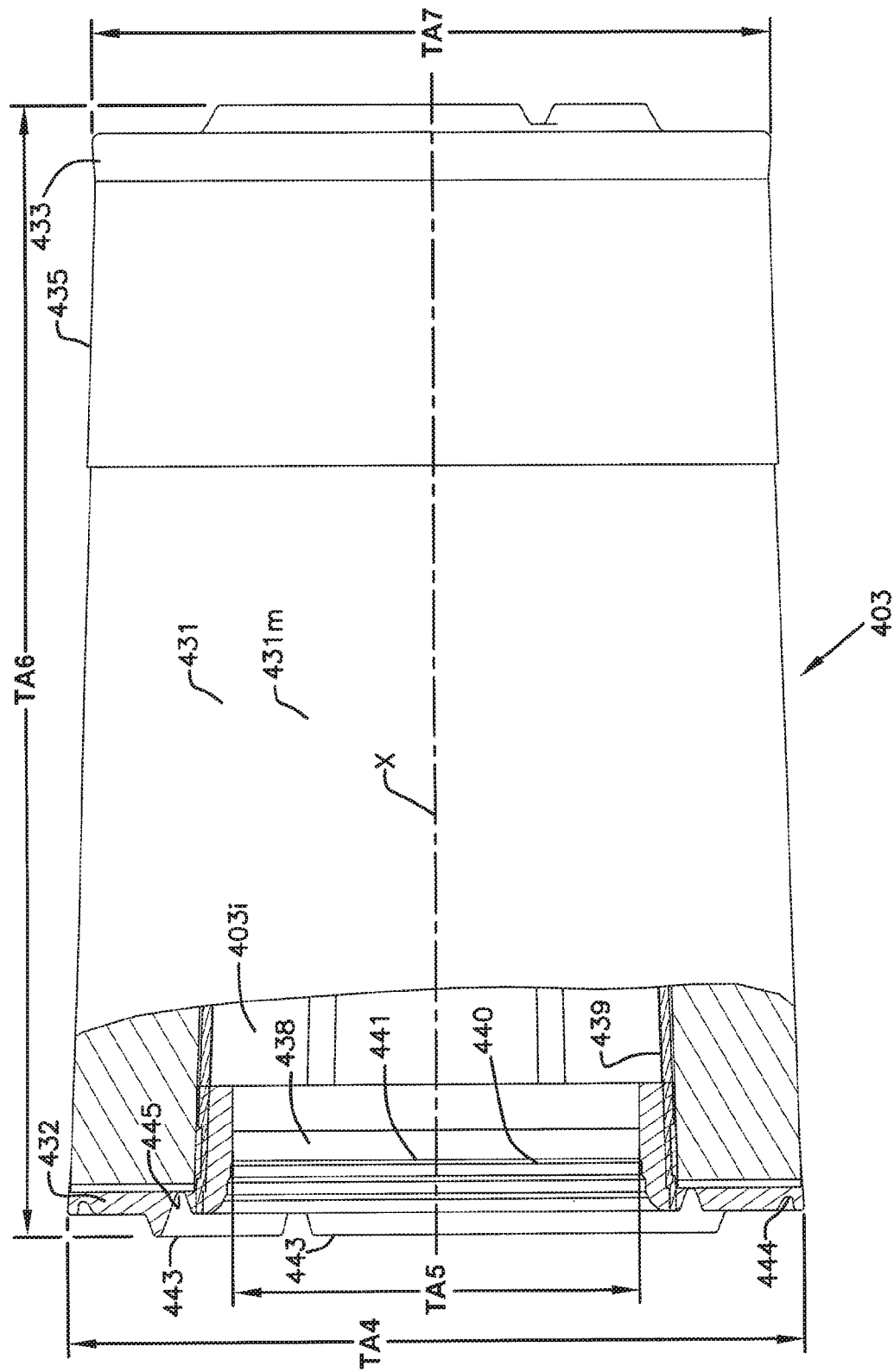

FIG. 23 is a schematic side elevational view of the filter cartridge of FIG. 21, with portions shown broken away and in cross-section.

Figure 24:
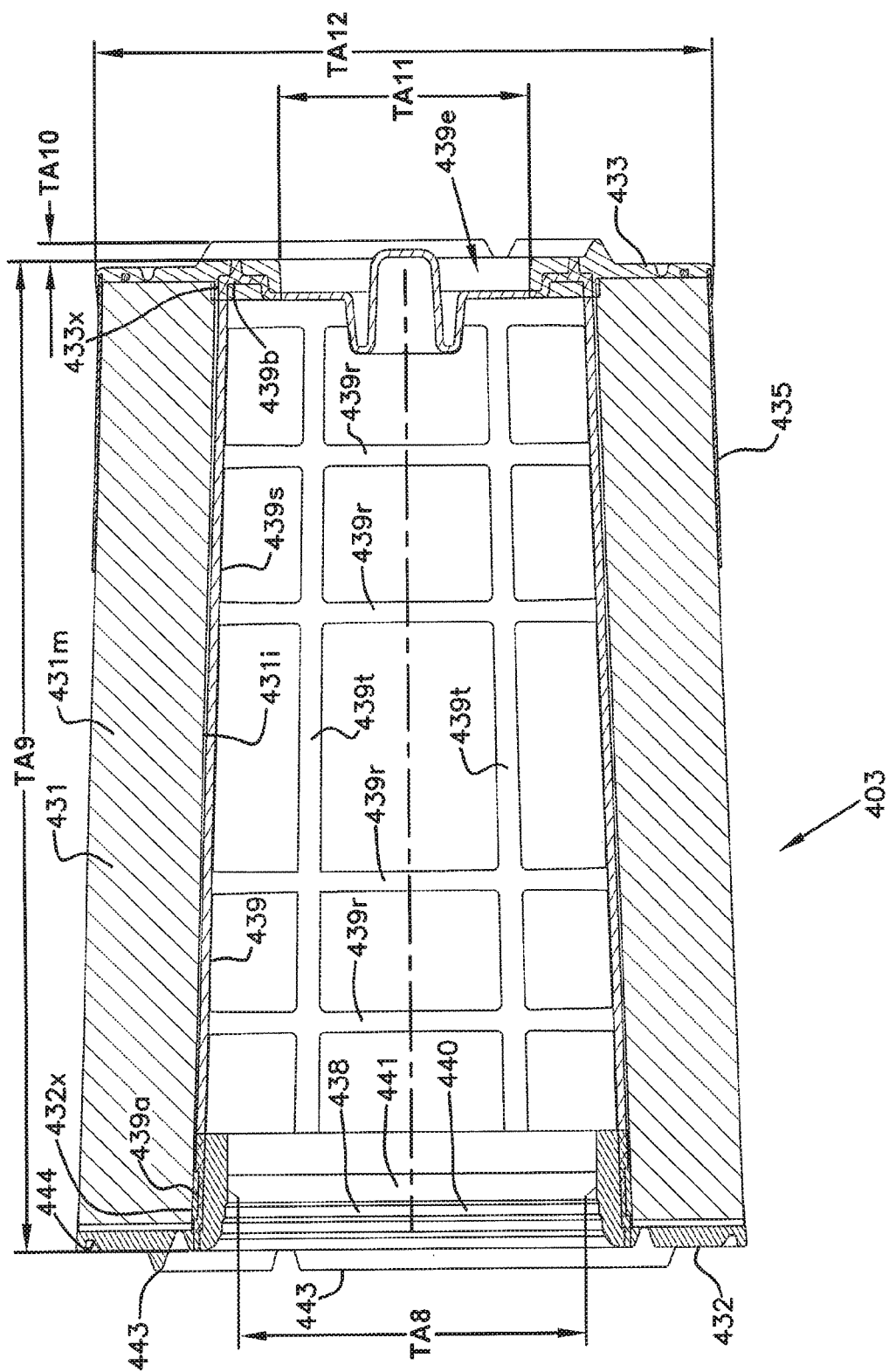

FIG. 24 is a schematic cross-sectional view of the filter cartridge of FIG. 21.

Figure 25:
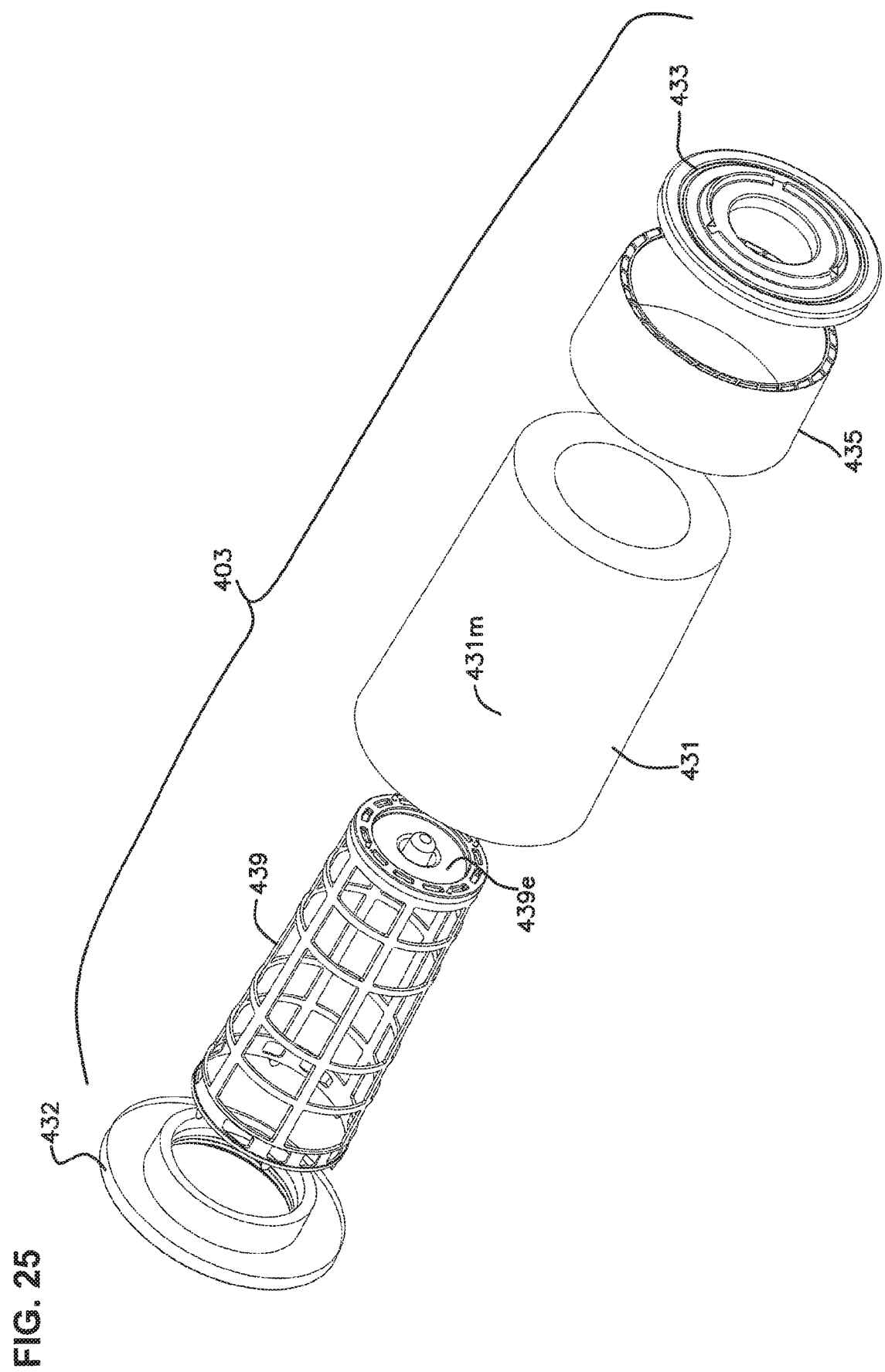

FIG. 25 is a schematic exploded perspective view of a filter cartridge of FIG. 21.

FIG. 26 is a schematic cross-sectional view of an inner liner component of the filter cartridge of FIG. 21.

Figure 27:
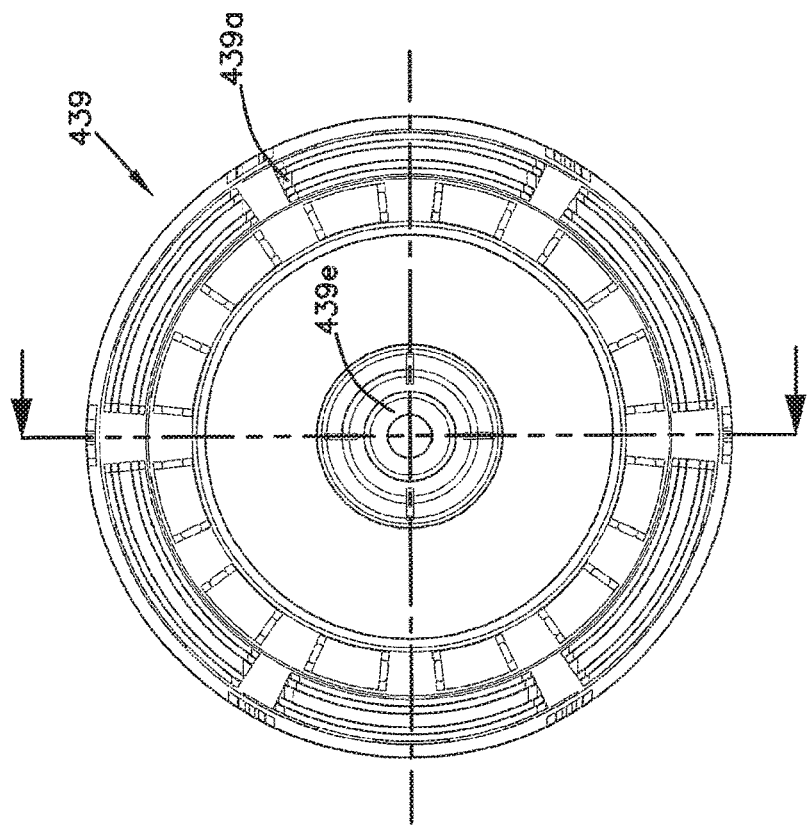

FIG. 27 is an open end plan view of the liner component of FIG. 26.

Figure 28:
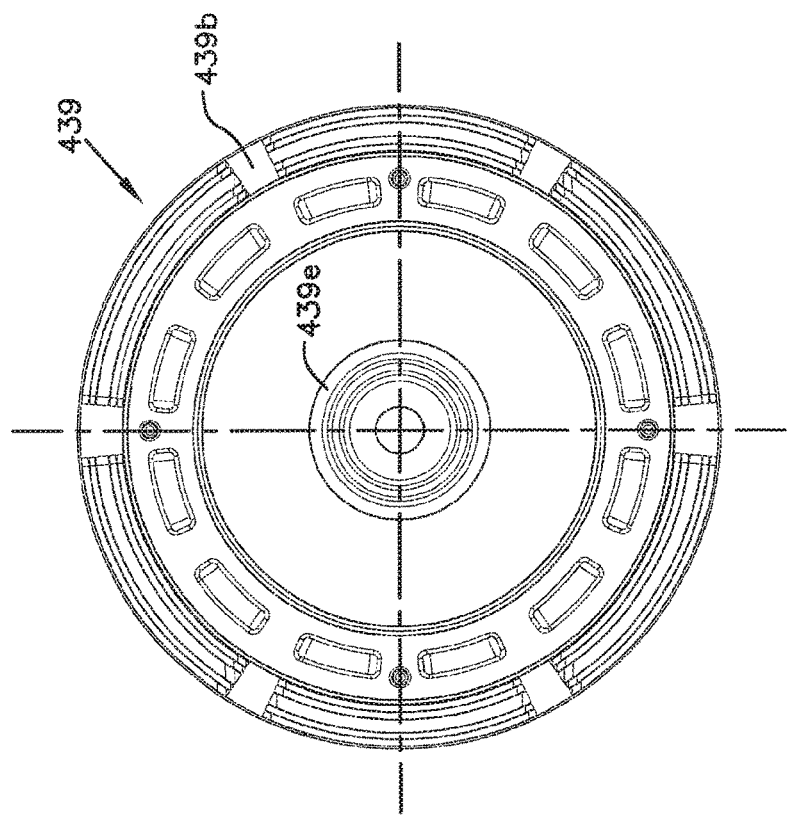

FIG. 28 is a schematic closed end plan view of the liner component of FIG. 26.

Figure 29:
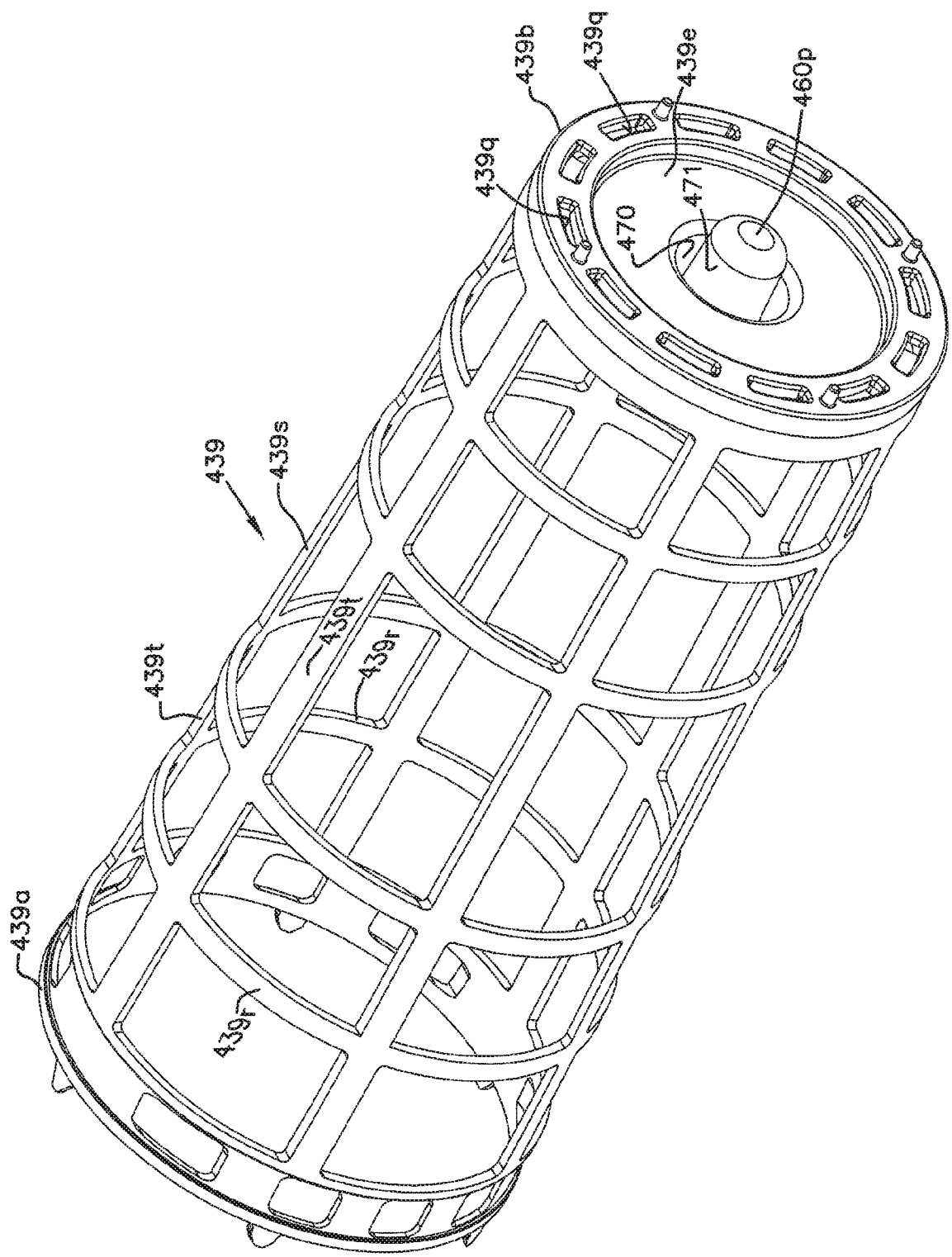

FIG. 29 is a schematic perspective view of the liner component of FIG. 26.

Figure 30:
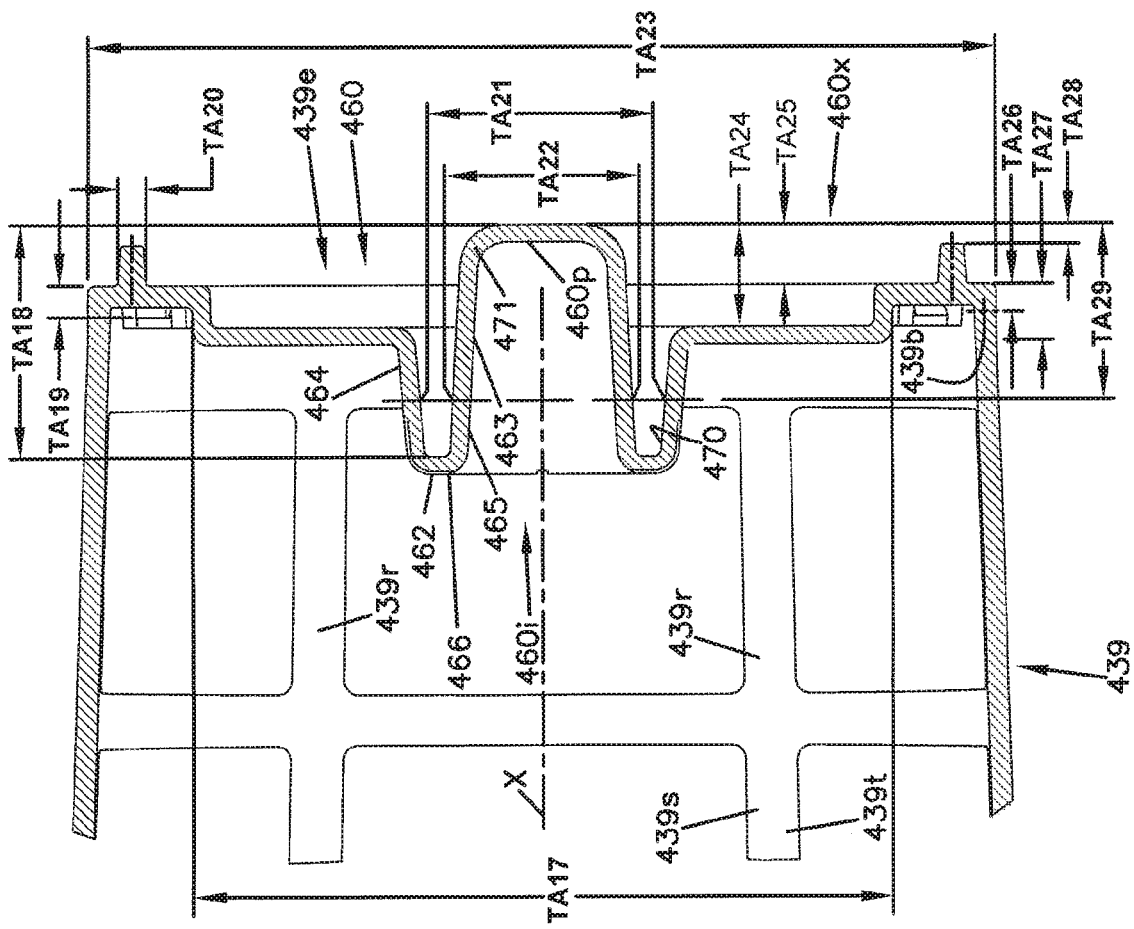

FIG. 30 is an enlarged fragmentary schematic cross-sectional view of the liner component of FIG. 29, taken adjacent the closed end thereof.

Figure 31:
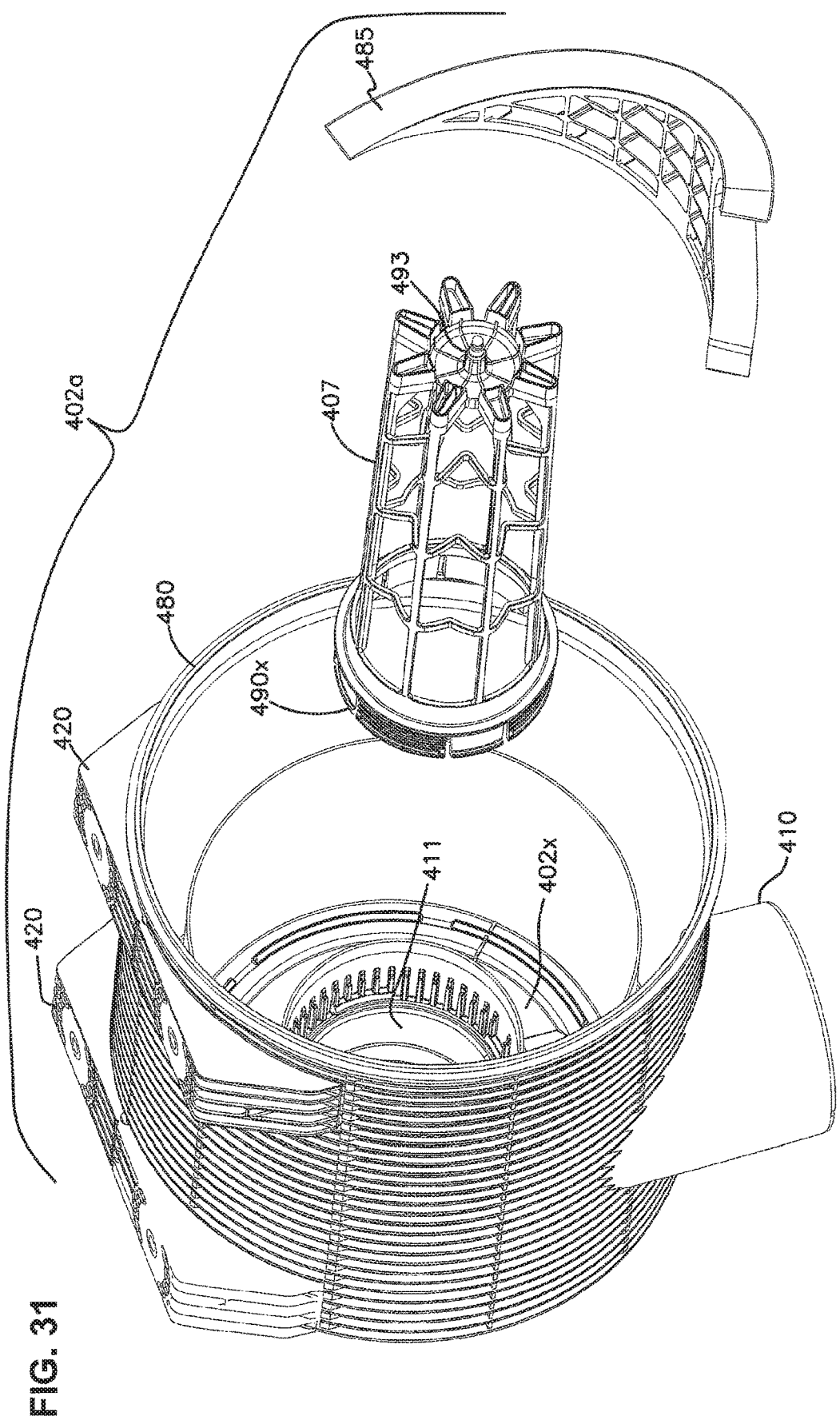

FIG. 31 is a schematic exploded perspective view of the housing body component of the air cleaner assembly of FIGS. 16-20.

Figure 32:
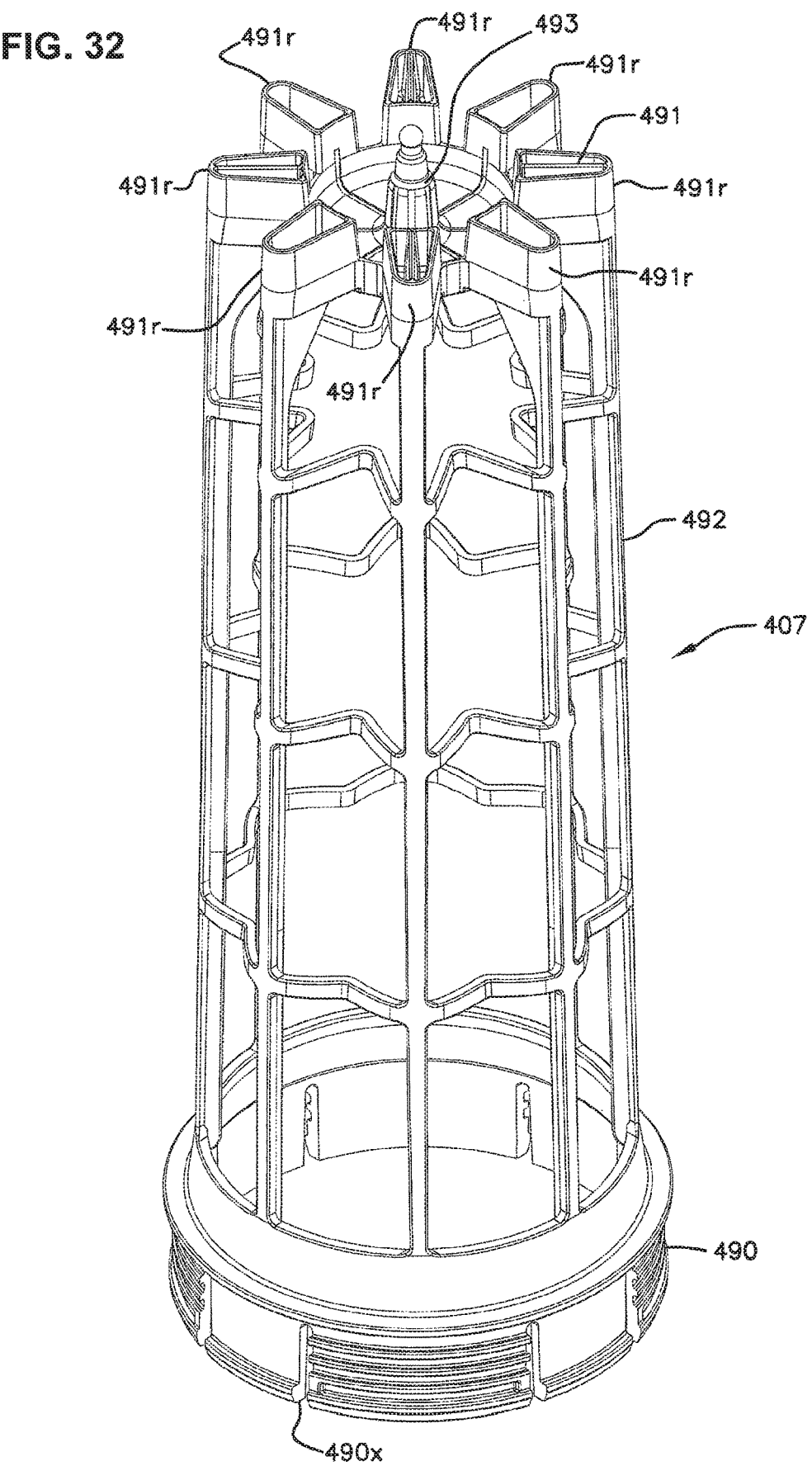

FIG. 32 is a schematic perspective view of a center support member of the housing body of FIG. 31.

Figure 33:
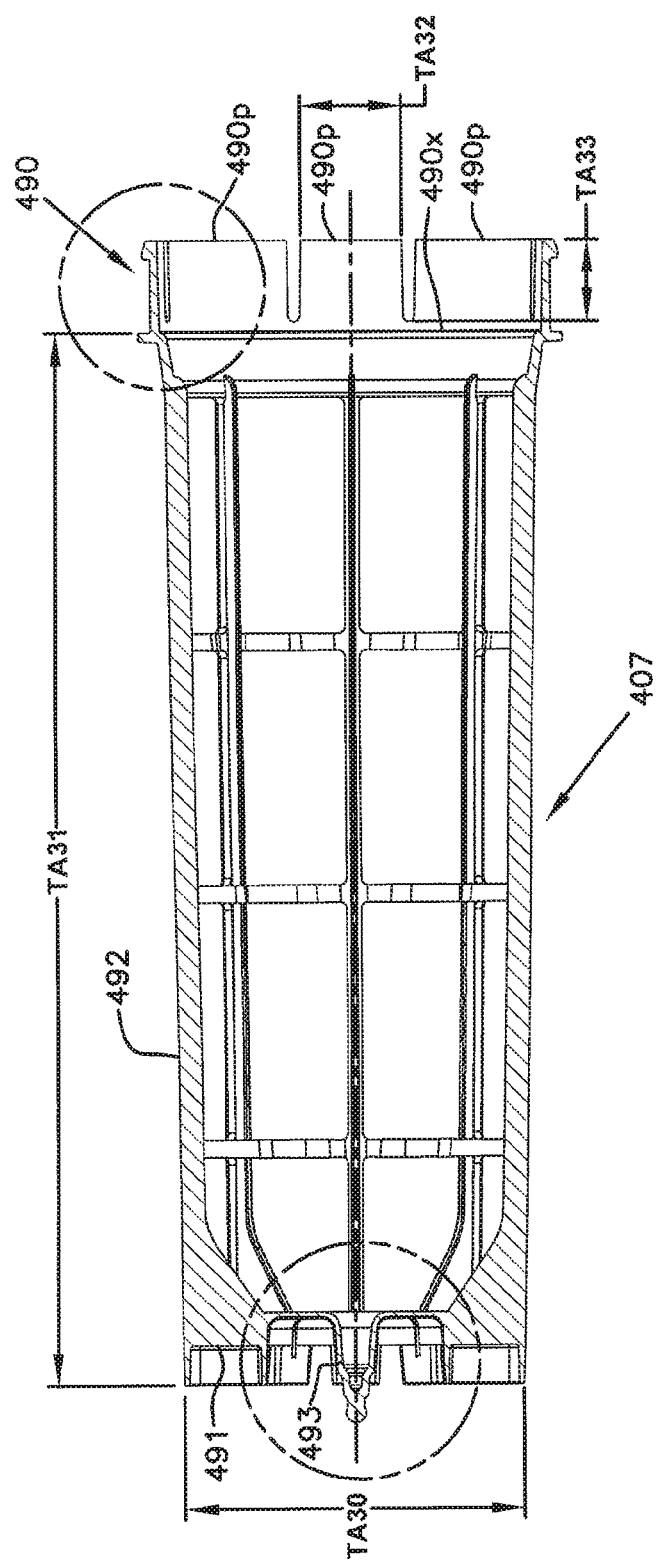

FIG. 33 is a schematic cross-sectional view of the support component of FIG. 32.

Figure 34:
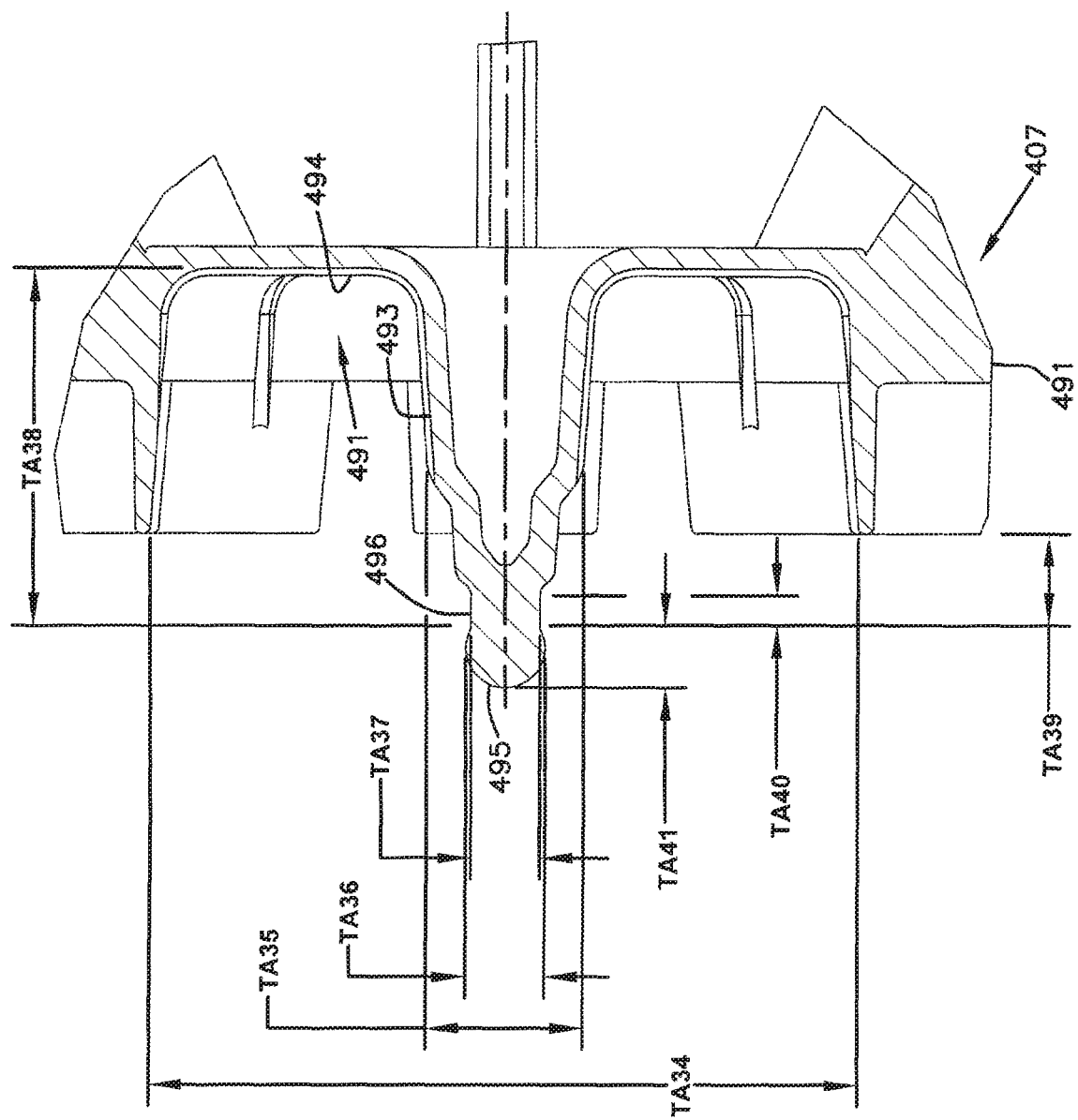

FIG. 34 is a schematic enlarged fragmentary view of an identified portion of FIG. 33.

Figure 35:
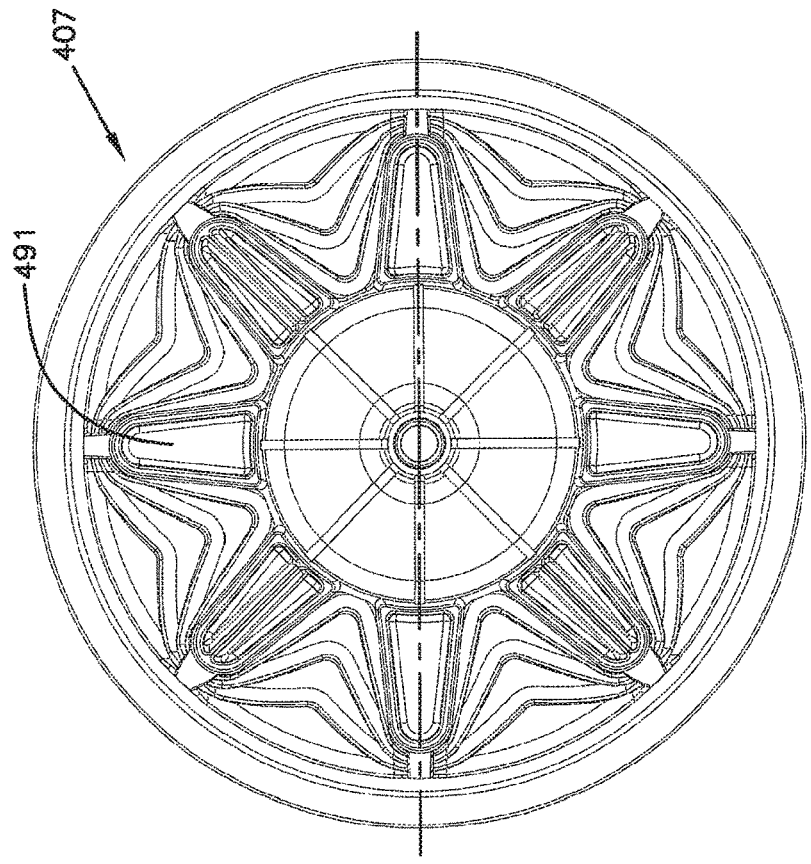

FIG. 35 is a schematic closed end perspective view of the support component of FIG. 32.

Figure 36:
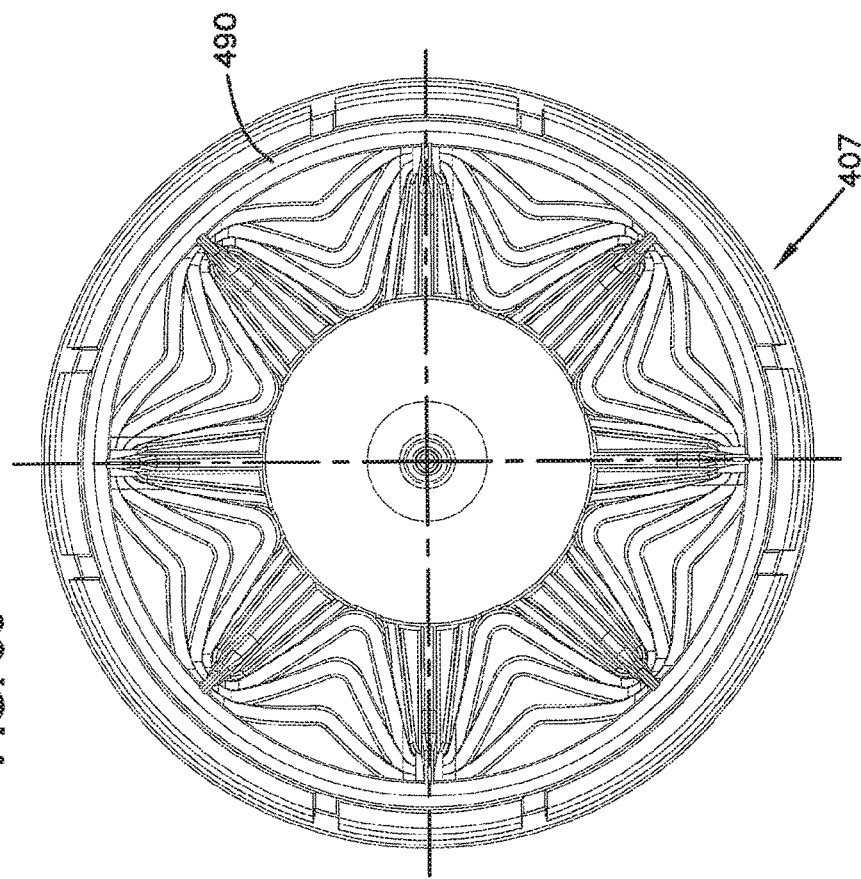

FIG. 36 is a schematic open end perspective view of the support component of FIG. 33.

Figure 37:
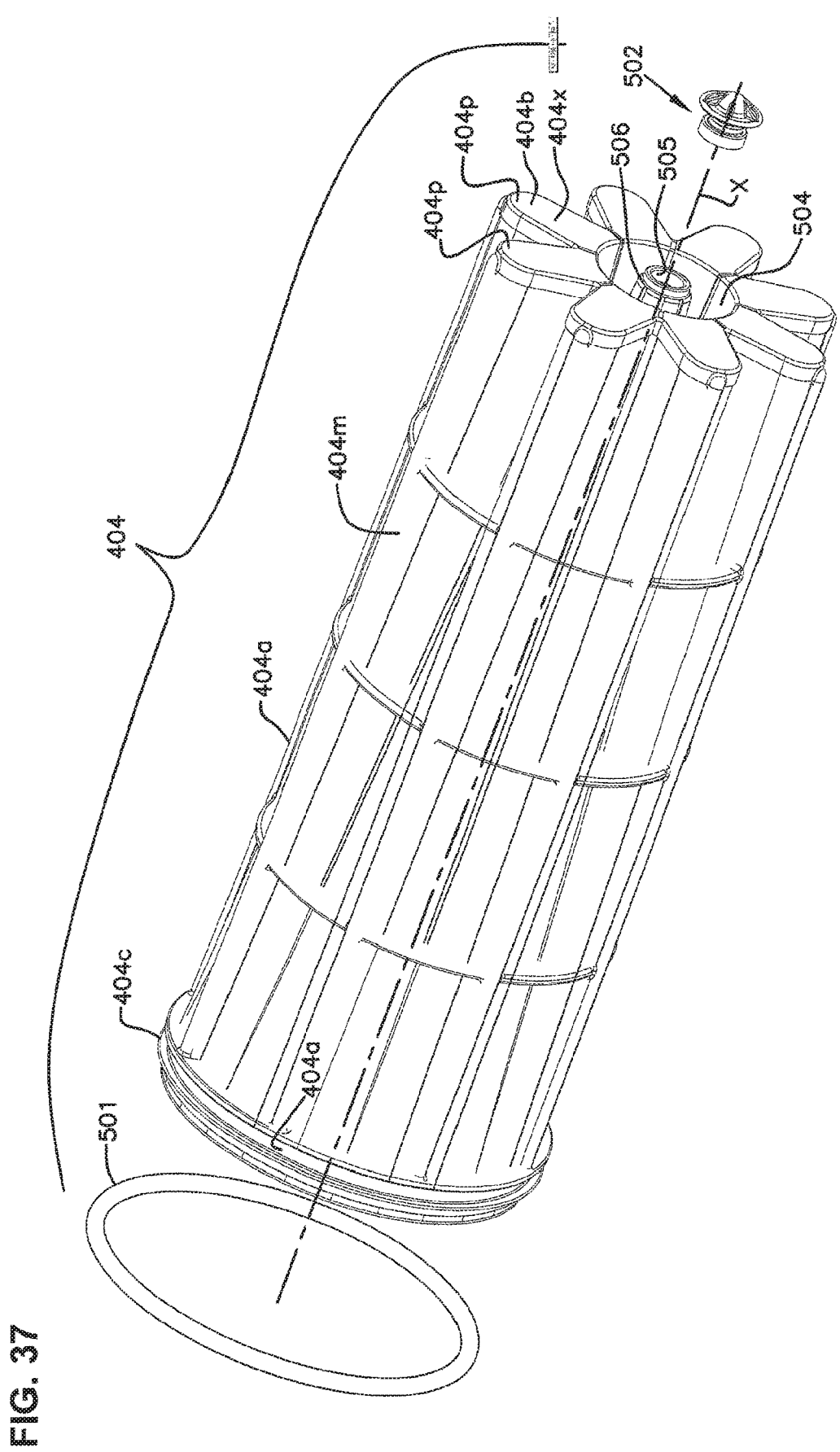

FIG. 37 is an exploded perspective view of a secondary or safety filter component of the air cleaner assembly of FIGS. 16-20.

Figure 38:
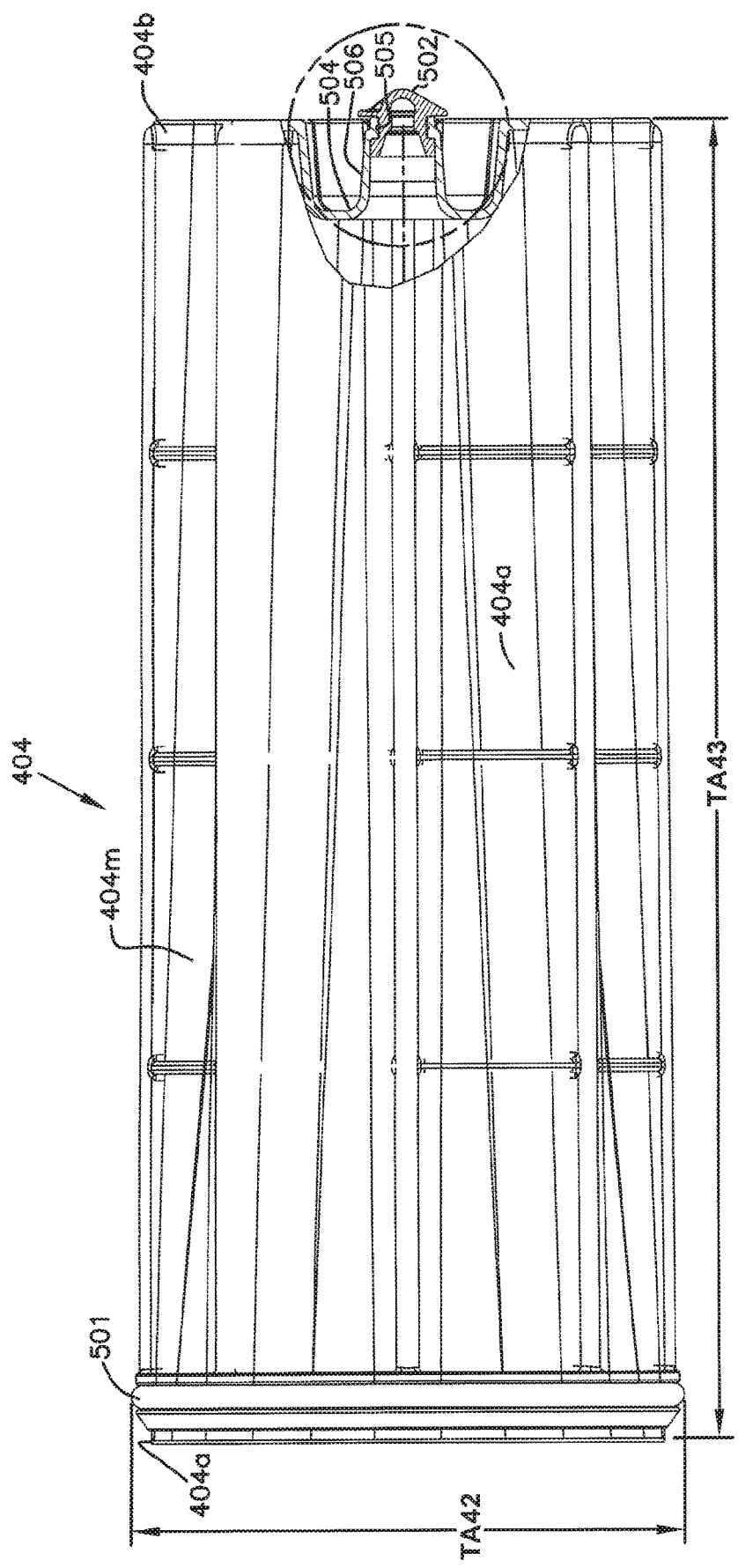

FIG. 38 is a side elevational view of the filter cartridge component of FIG. 37, with a portion shown broken away in cross-section.

Figure 39:
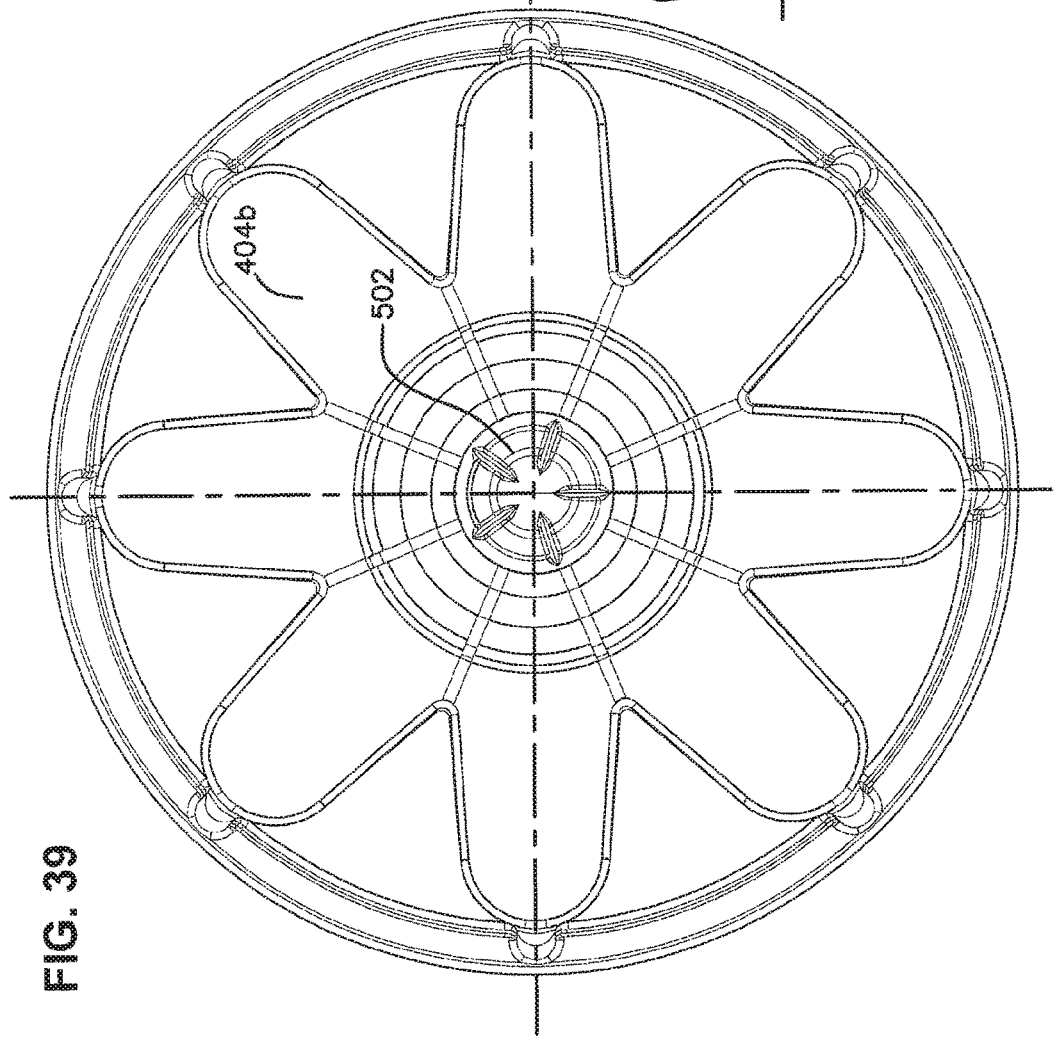

FIG. 39 is a closed end plan view of the secondary or safety filter cartridge component of FIGS. 37 and 38.

Figure 40:
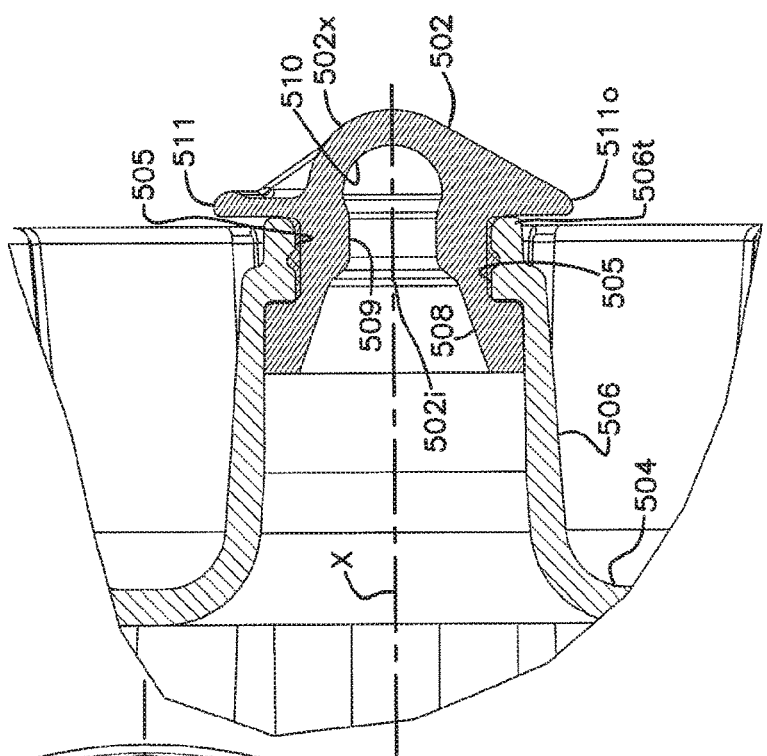

FIG. 40 is an enlarged fragmentary schematic cross-sectional view of an identified portion of FIG. 38.

Figure 41:
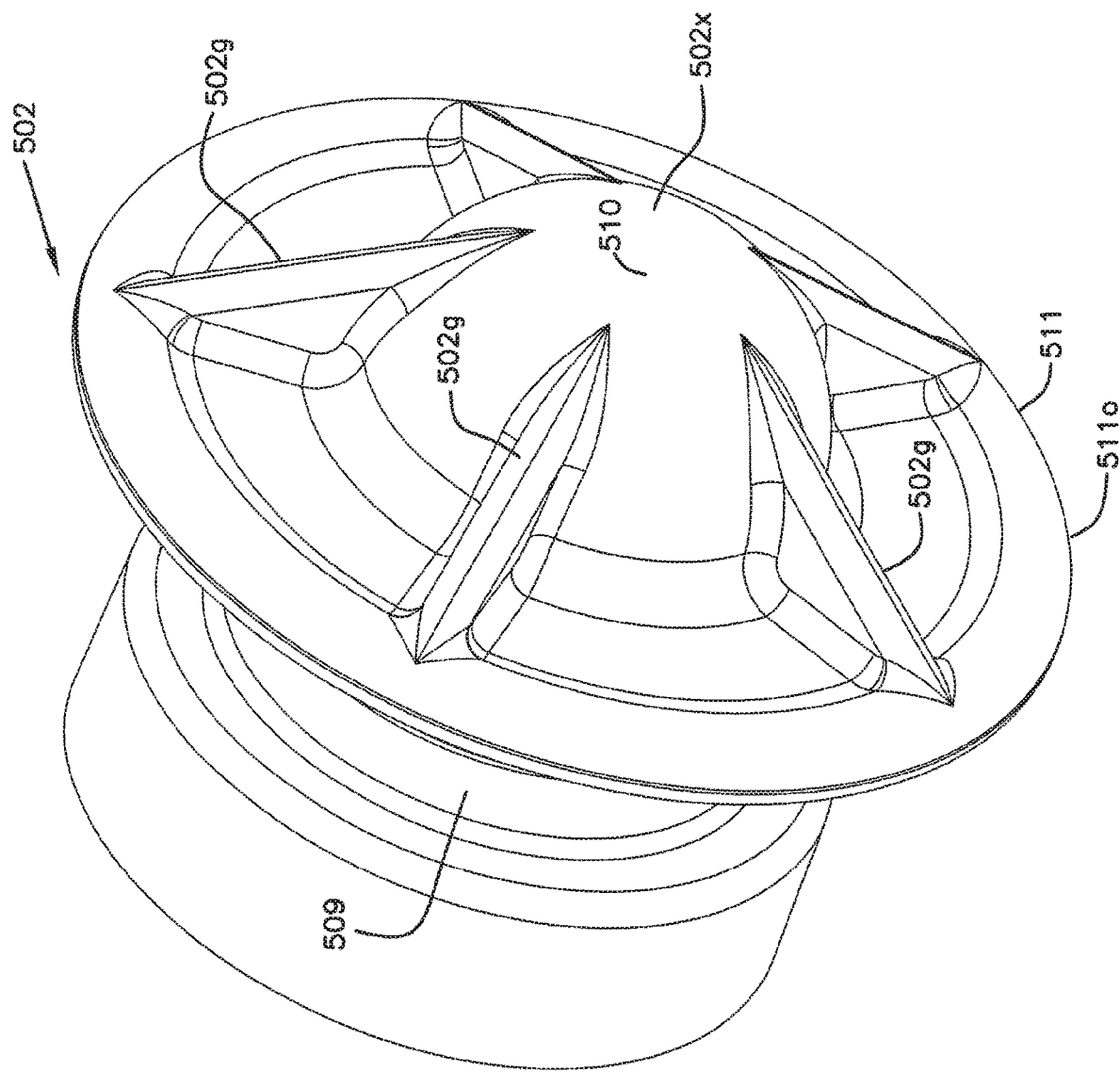

FIG. 41 is an enlarged perspective view of a grommet or resilient cushion component of the cartridge of FIGS. 37 and 38.

Figure 42:
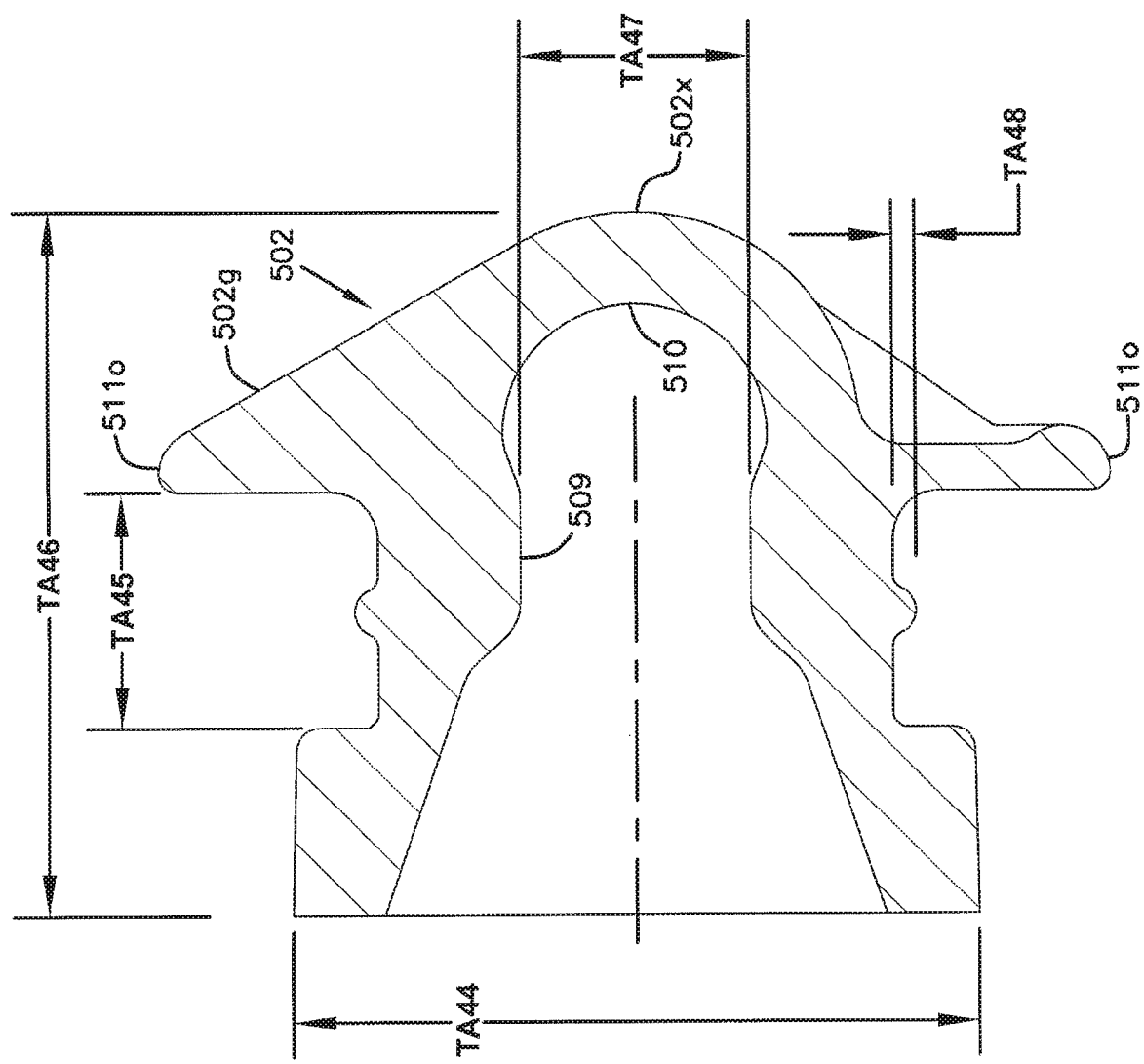

FIG. 42 is a schematic cross-sectional view of the component of FIG. 41.

Figure 43:
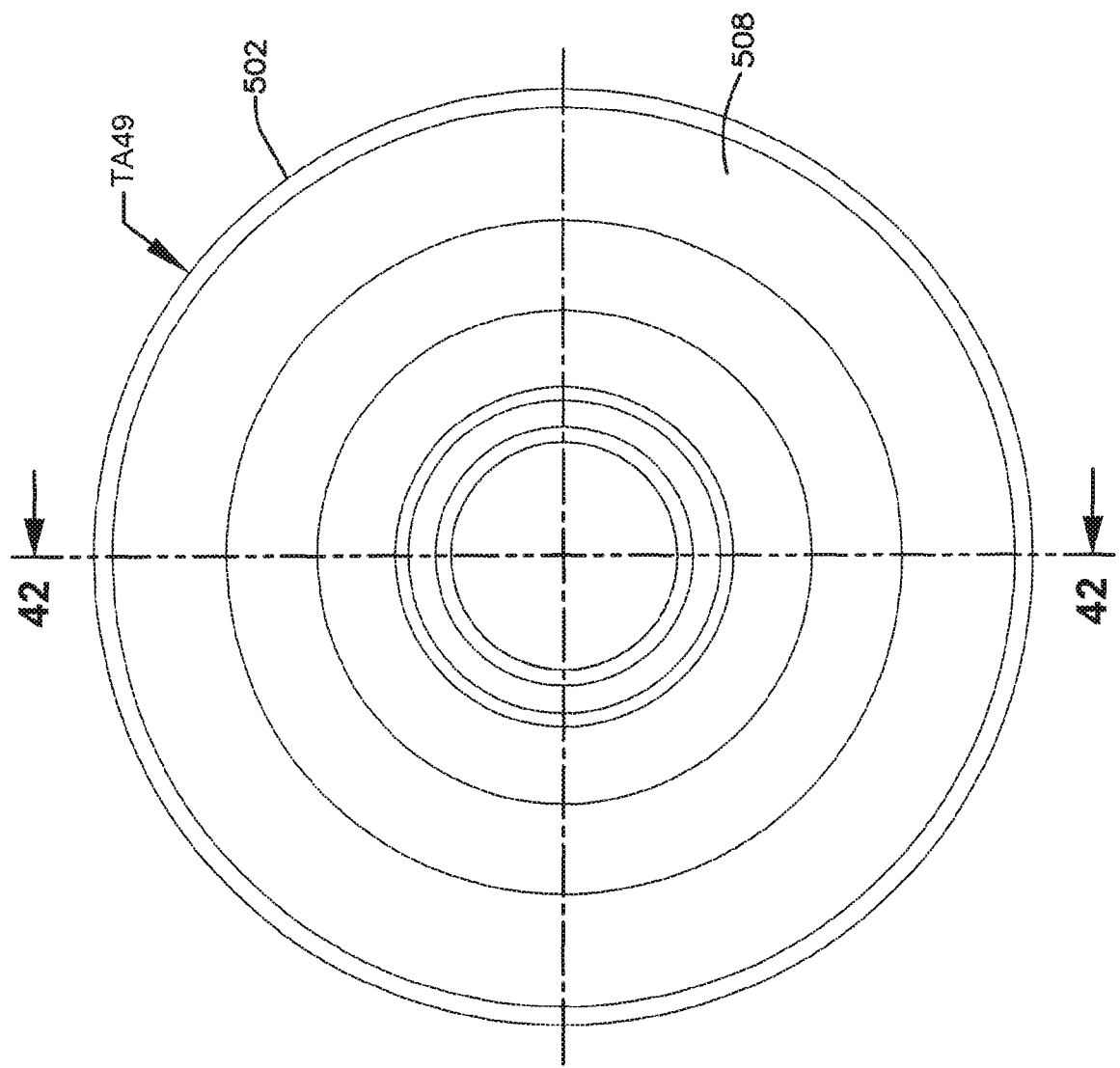

FIG. 43 is a schematic open end plan view of the component of FIG. 42.

Figure 44:
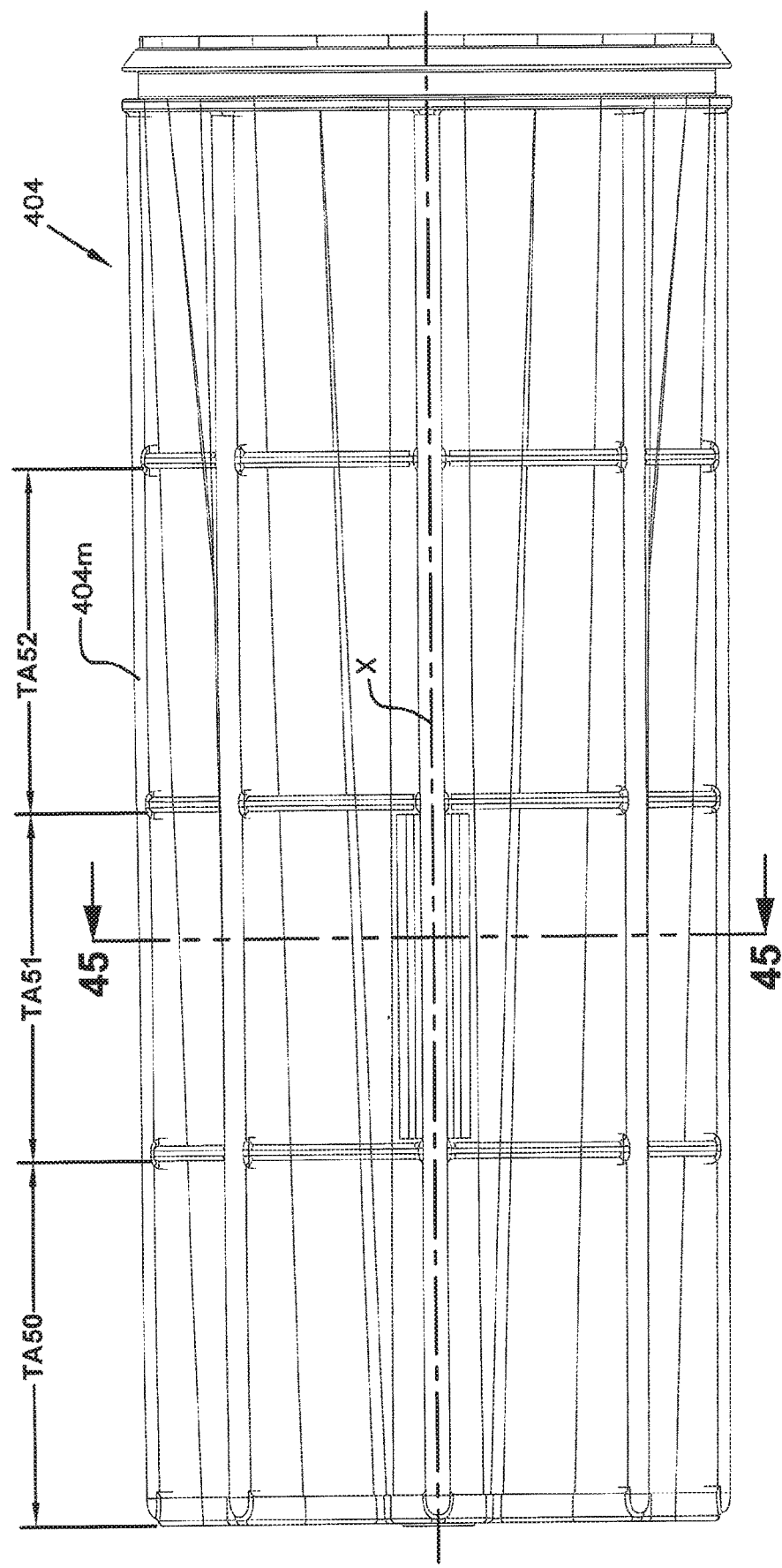

FIG. 44 is a schematic side elevational view of the secondary or safety filter cartridge component of FIG. 37.

Figure 45A:
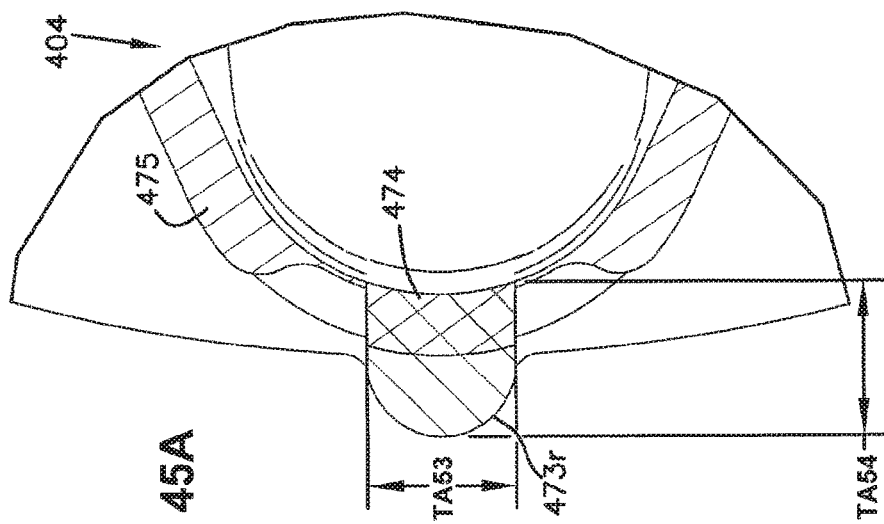
Figure 45:
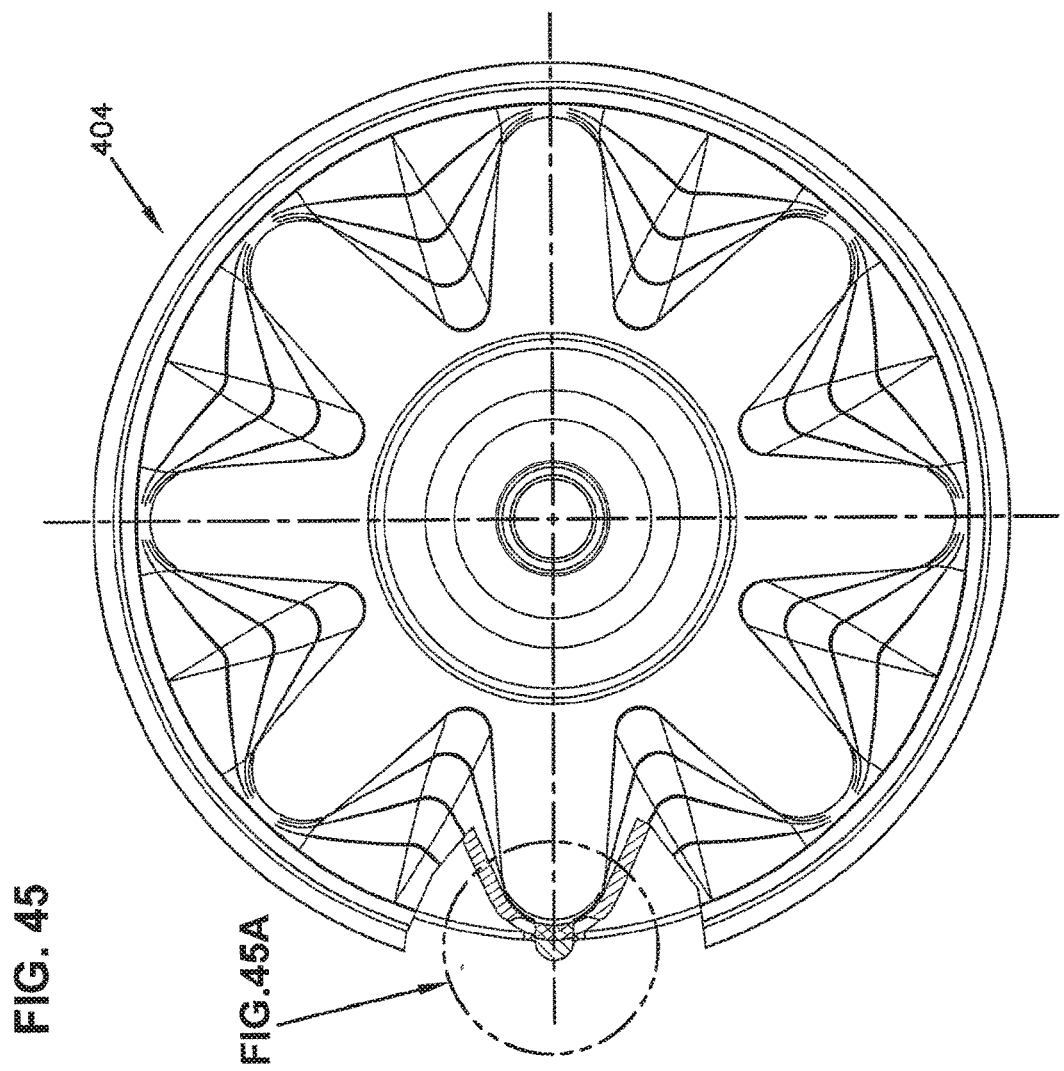

FIG. 45 is a schematic closed end partially cross-sectional view of the cartridge of FIG. 44 with portions broken away.

FIG. 45A is an enlarged fragmentary schematic cross-sectional view of an identified portion of FIG. 45.

Figure 46:
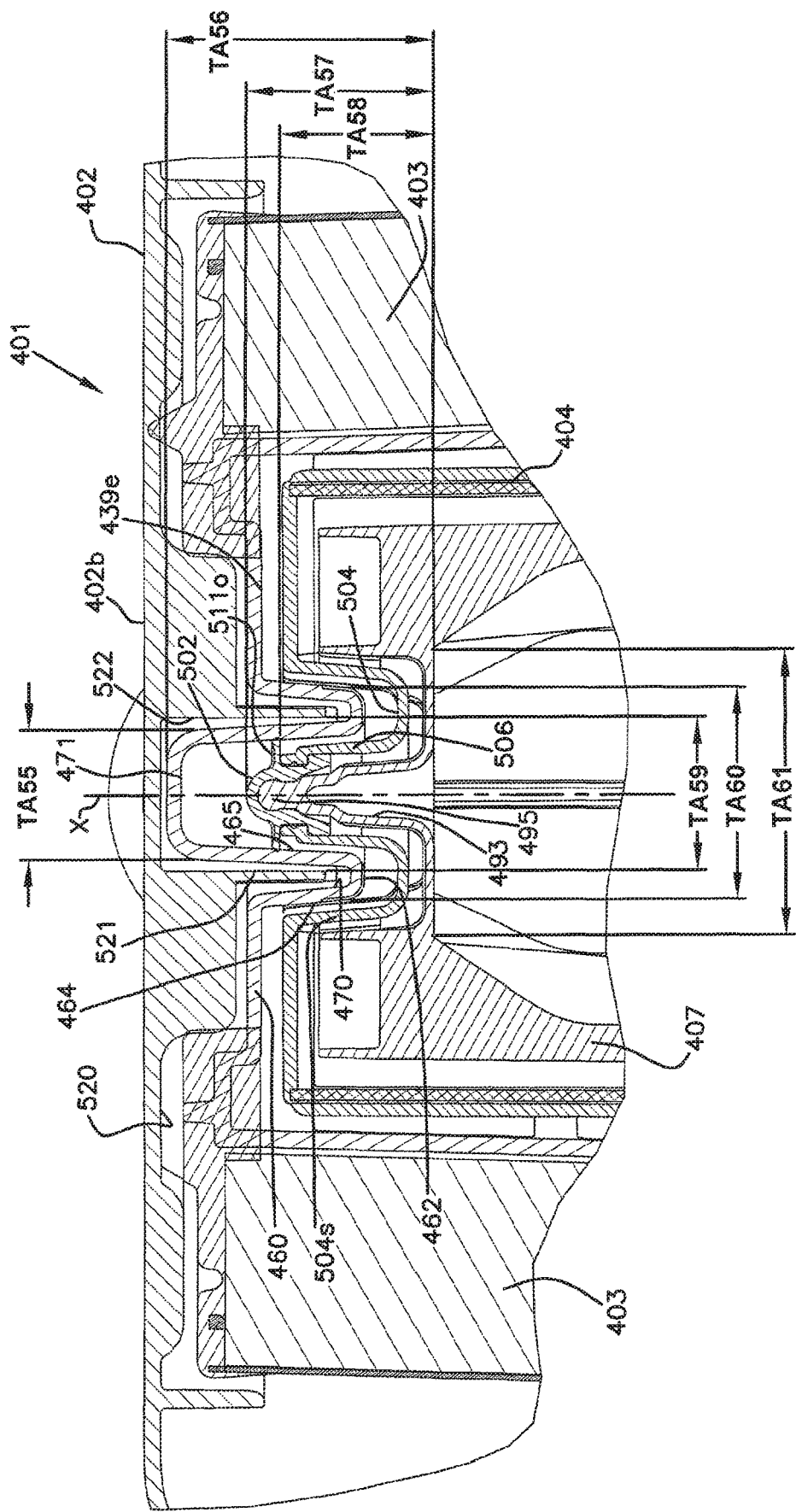

FIG. 46 is an enlarged fragmentary schematic cross-sectional view of a selected portion of an air cleaner assembly in accord with FIGS. 16-20.

Figure 47:
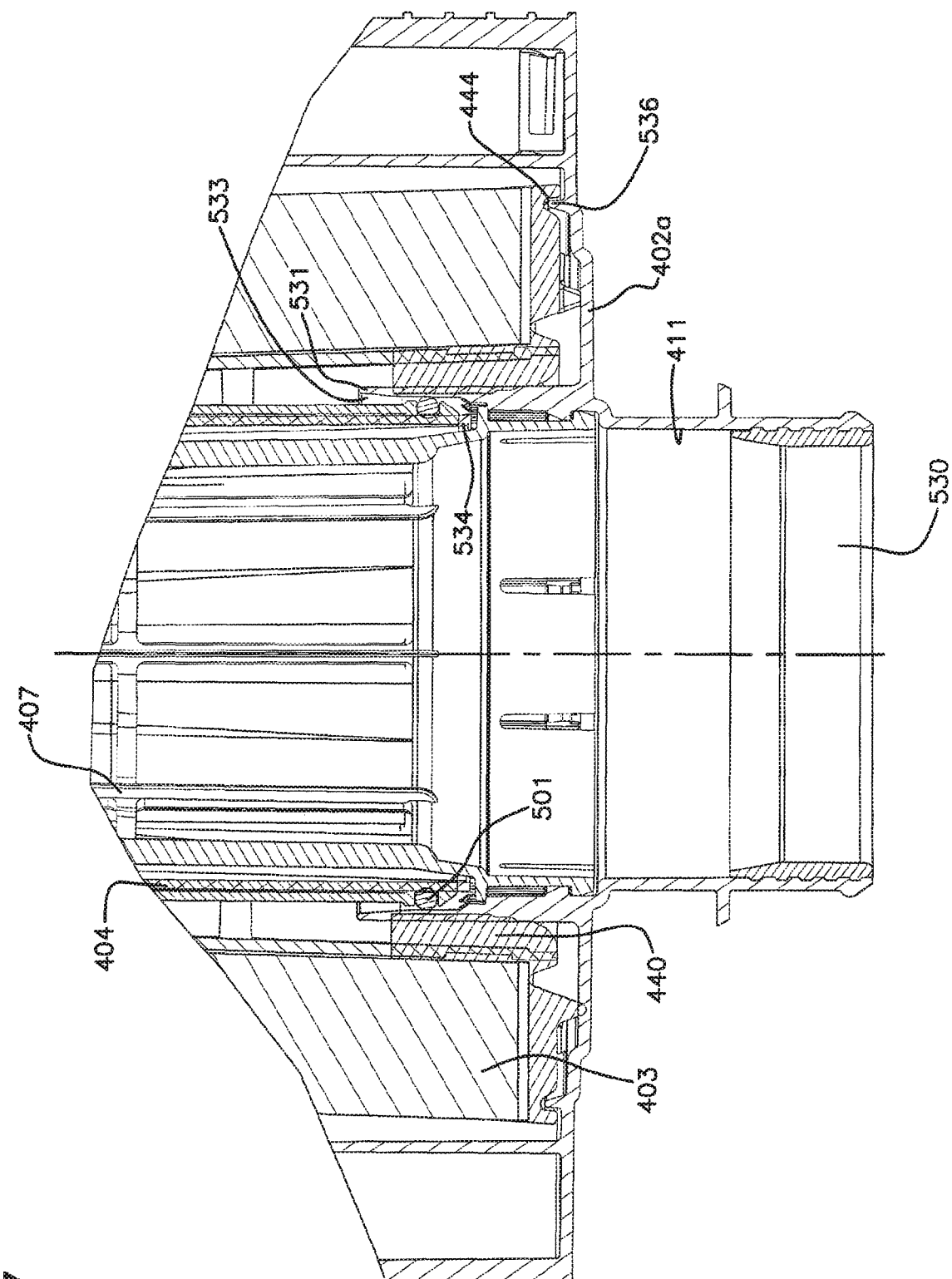

FIG. 47 is an enlarged fragmentary schematic cross-sectional view of a portion of an air cleaner assembly in accord with FIGS. 16-20.

Figure 48:
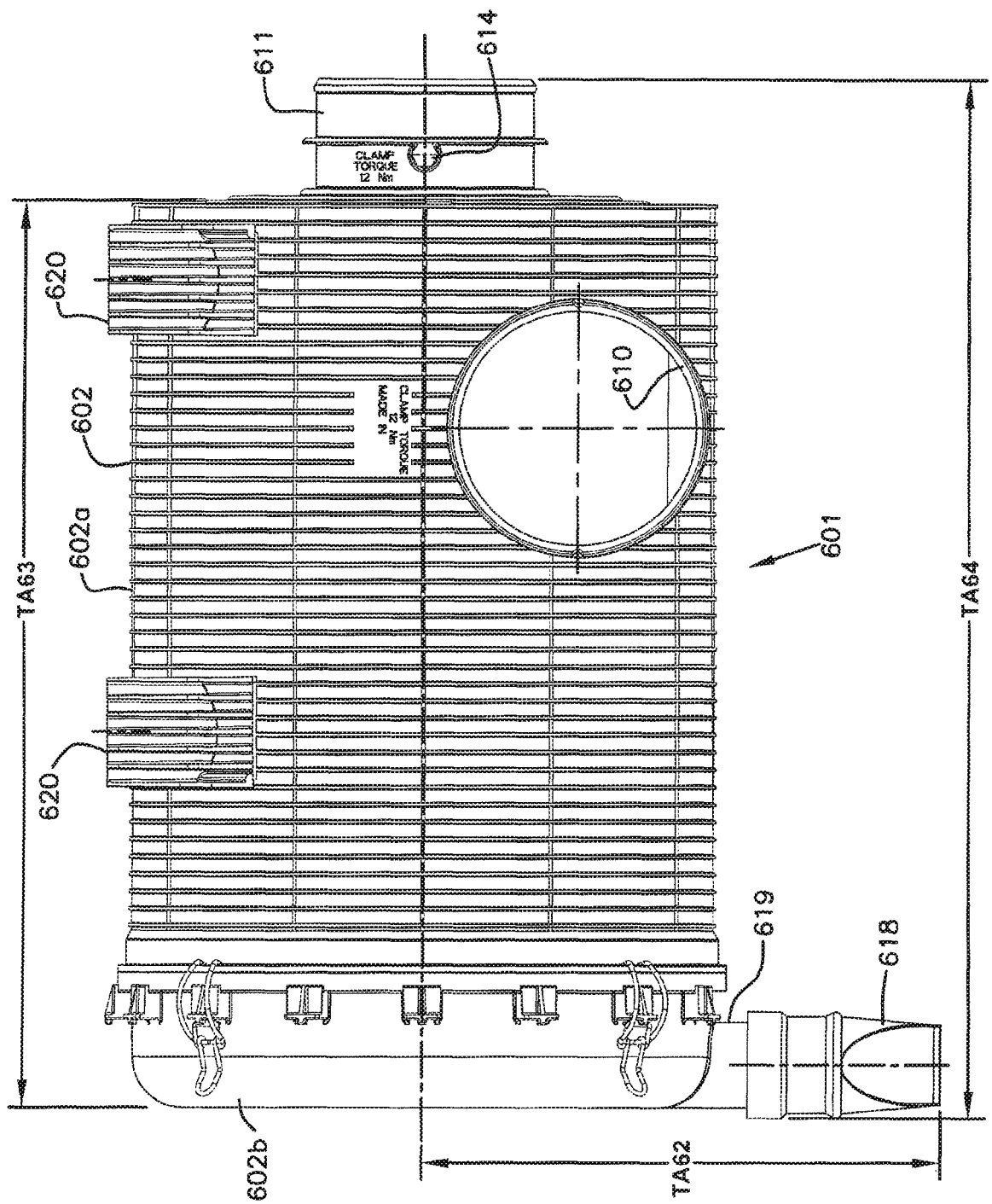

FIG. 48 is a schematic side elevational view of an additional air cleaner assembly according to the present disclosure.

Figure 49:
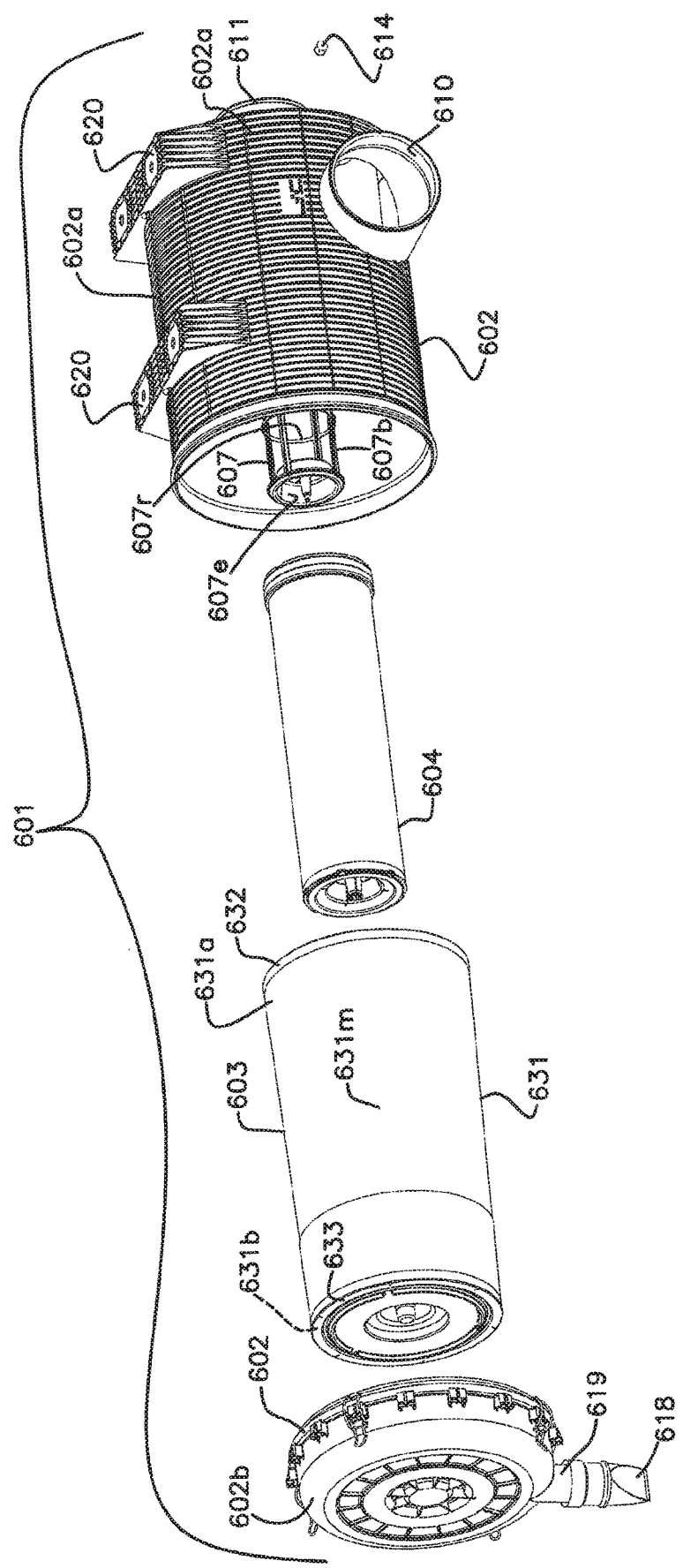

FIG. 49 is a schematic exploded perspective view of the air cleaner assembly of FIG. 48.

Figure 50:
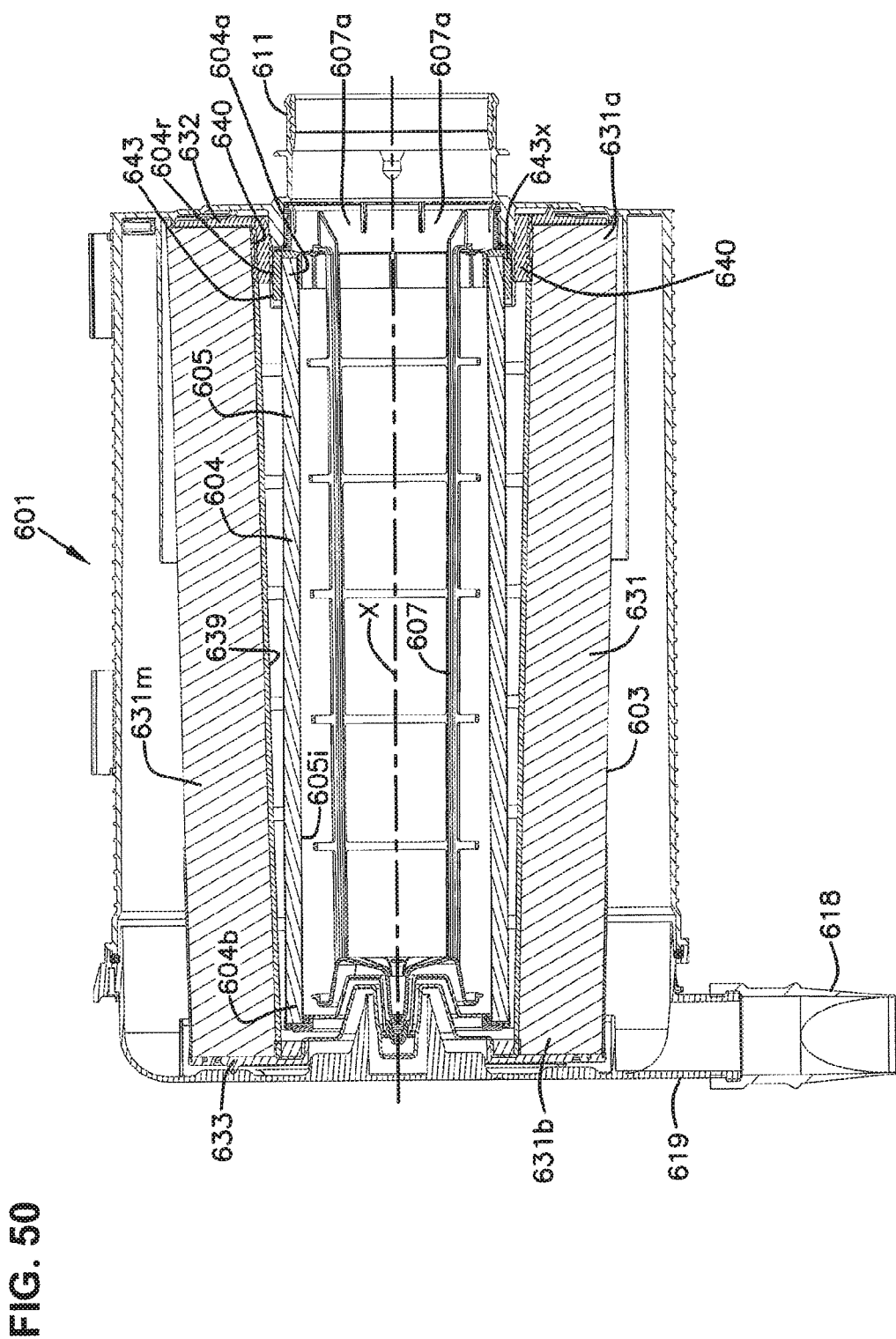

FIG. 50 is a schematic cross-sectional view of the air cleaner assembly of FIG. 48.

Figure 51:
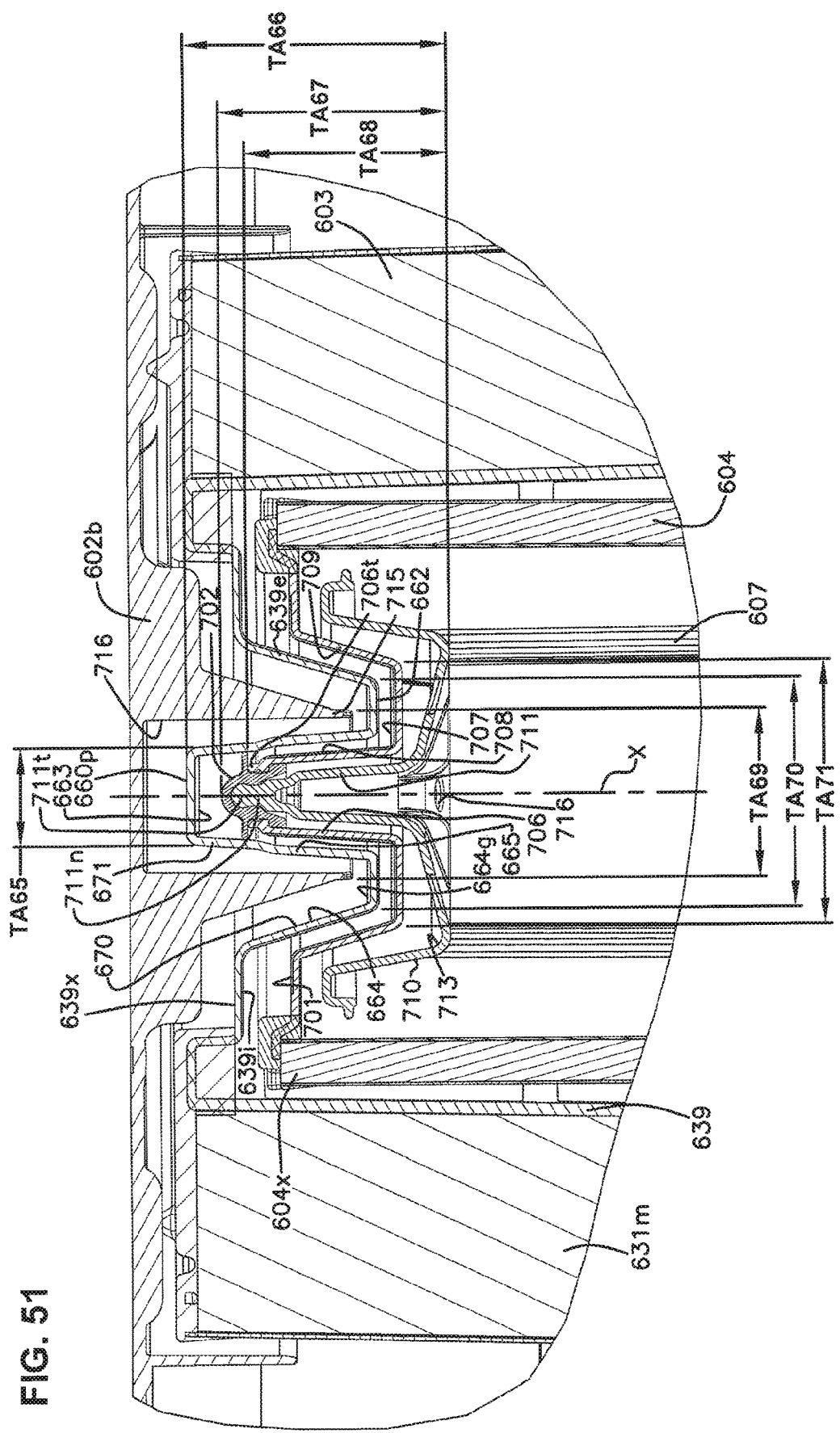

FIG. 51 is an enlarged fragmentary schematic cross-sectional view of an identified portion of FIG. 50.

Figure 52:
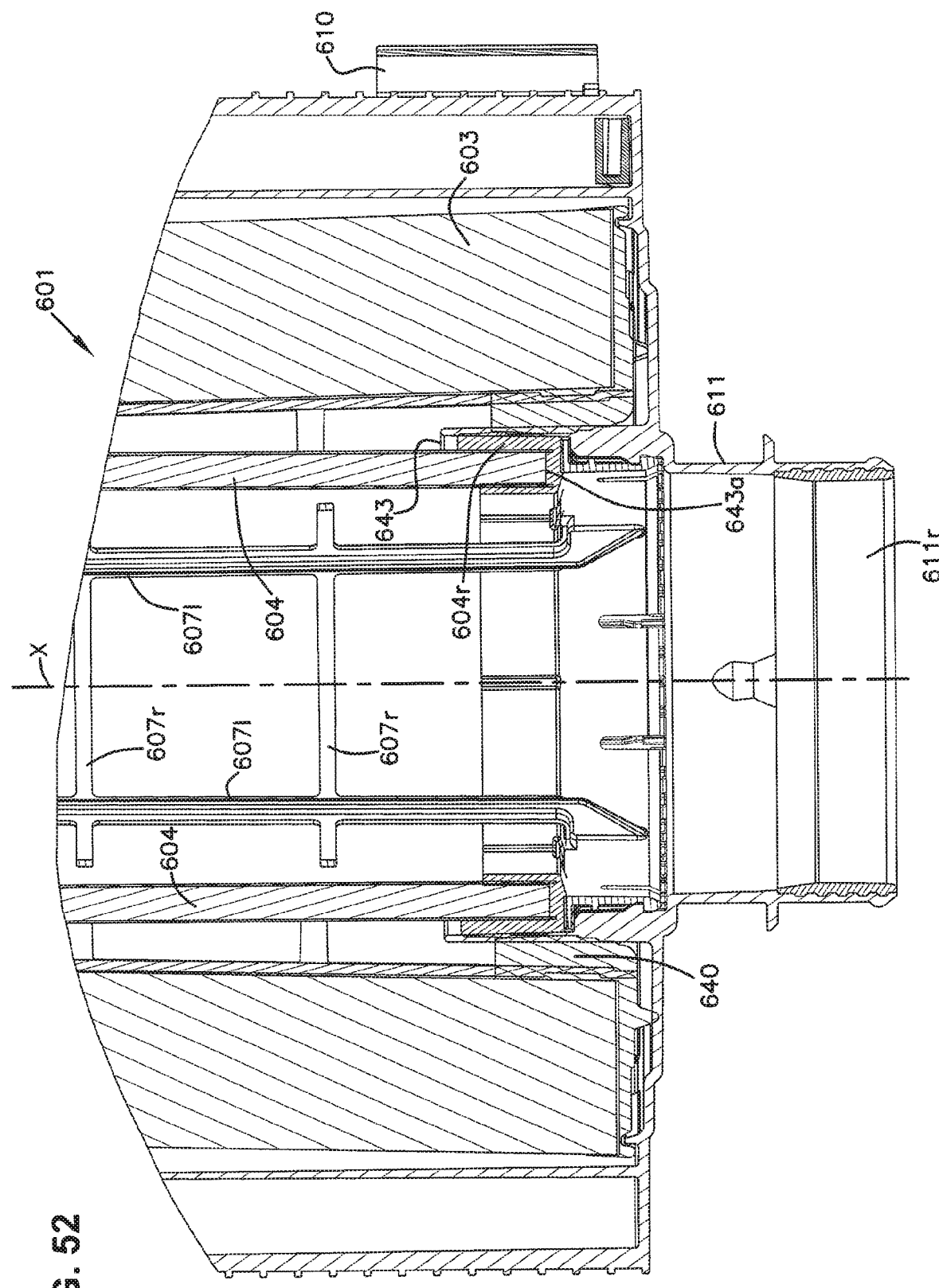

FIG. 52 is an enlarged fragmentary schematic cross-sectional view of an identified portion of FIG. 50.

Figure 53:
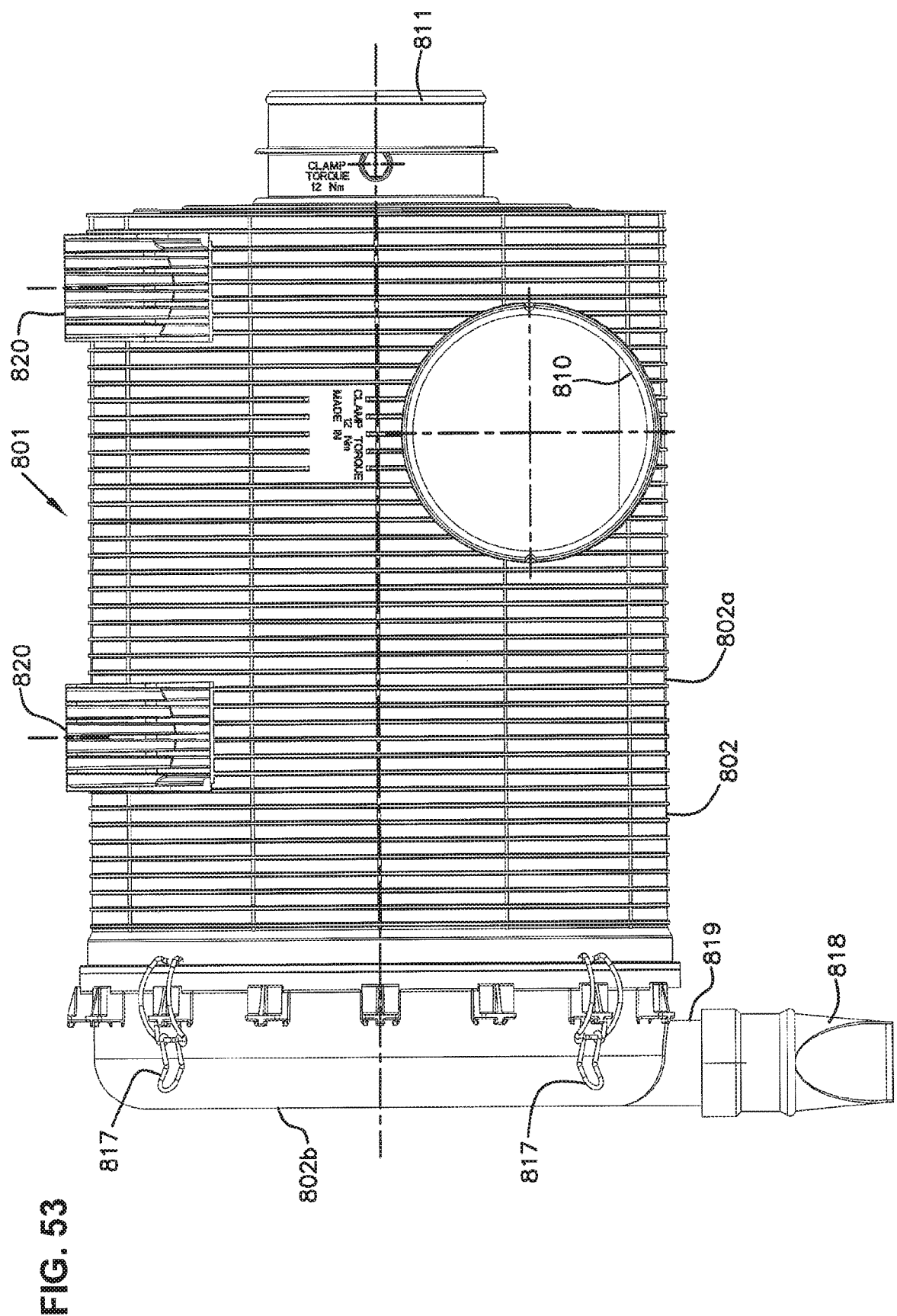

FIG. 53 is a schematic side elevational view of an additional air cleaner assembly according to the present disclosure.

Figure 54:
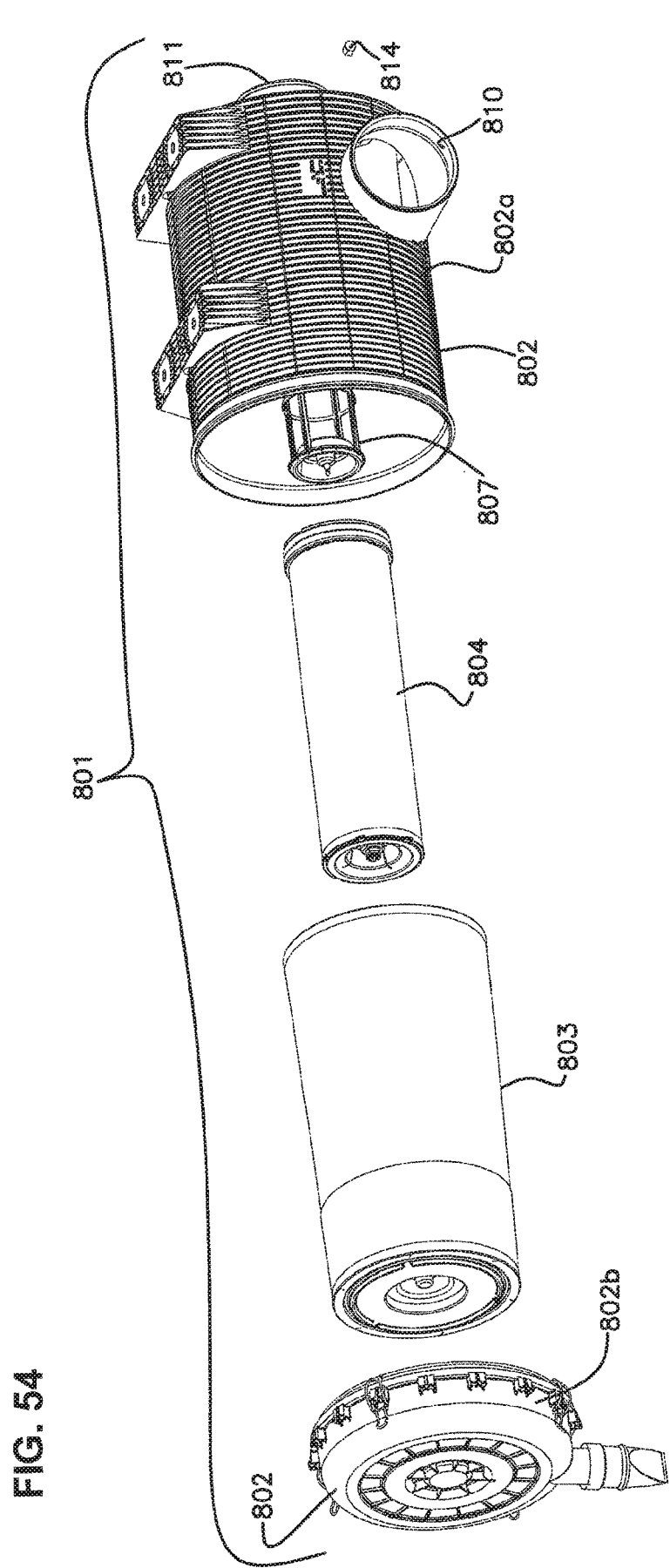

FIG. 54 is a schematic exploded perspective view of the air cleaner assembly of FIG. 53.

Figure 55:
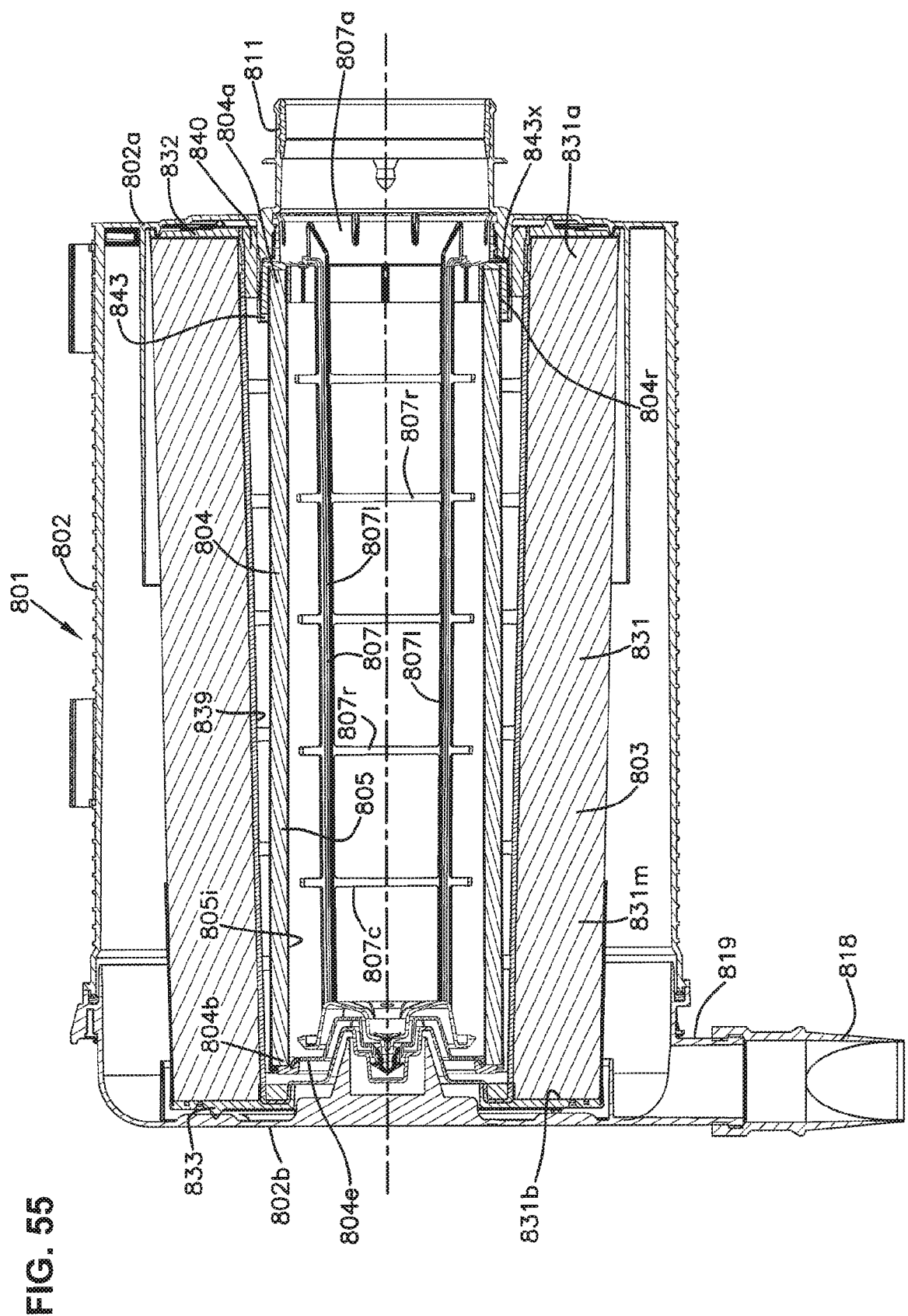

FIG. 55 is a schematic cross-sectional view of the air cleaner assembly of FIGS. 53 and 54.

Figure 56:
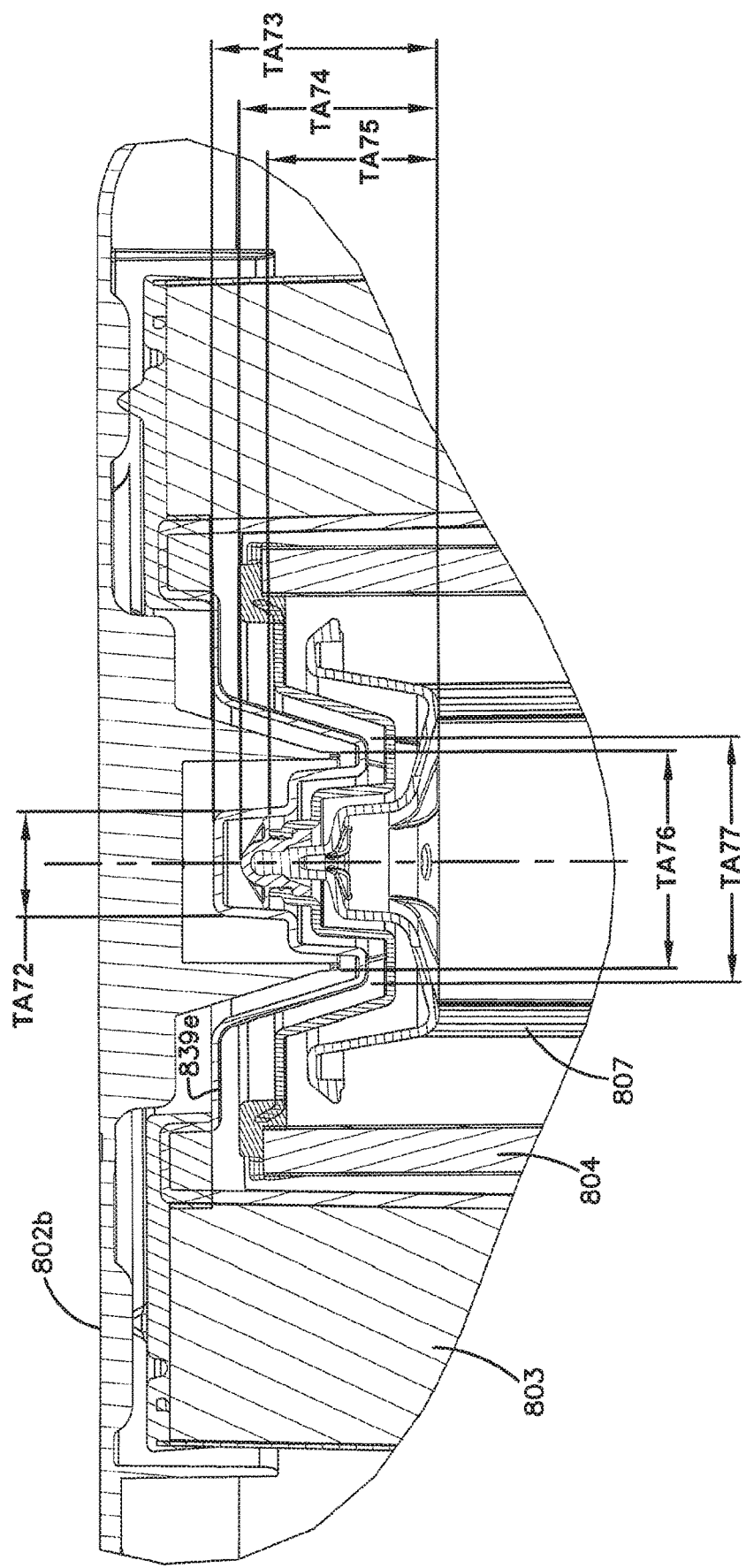

FIG. 56 is an enlarged fragmentary schematic cross-sectional view of a portion of FIG. 55.

Figure 57:
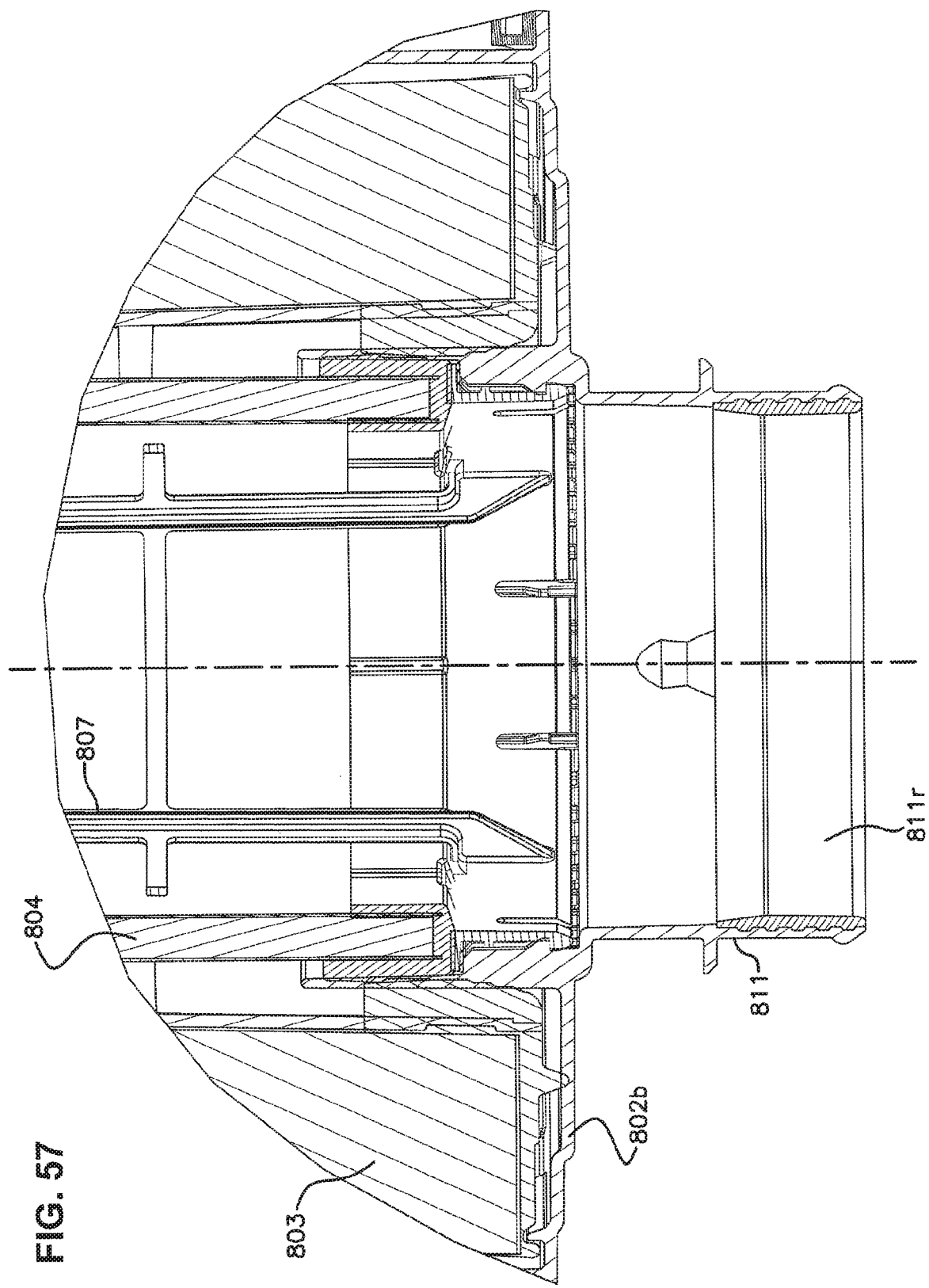

FIG. 57 is an enlarged fragmentary schematic cross-sectional view of a portion of FIG. 55.

DETAILED DESCRIPTION

I. An Improved Secondary or Safety Filter Cartridge Generally, FIGS. 1-10

A. Further Regarding Safety or Secondary Cartridge use in Filter Assemblies Generally; Some Selected Issues of Concern As indicated previously, in general portions of the present disclosure relate to features and techniques that are specifically adapted for advantageous use in secondary or safety filter cartridge arrangements and assemblies; although the techniques can be applied in other applications. The techniques are understandable, for example, in the context of use in an air cleaner assembly, such as ones having features as generally described in WO 2009/014986A1 or WO 2012/116314 A1, incorporated herein by reference.

In general, such filter assemblies comprise an air cleaner housing and a primary or main filter cartridge. The main filter cartridge typically comprises media surrounding an open filter interior. The assembly is typically configured for "out-to-in" flow during filtering, with respect to gas (air) flow direction through the media of the main filter cartridge. By the term "out-to-in" flow in this context, it is meant that the flow during filtering through the media of the main filter cartridge is generally: from a region outside of the cartridge, through the main cartridge media, to the open filter interior of the main cartridge surrounded by media. Thus, the open filter interior of the main filter cartridge is a clean air region.

The main filter cartridge is positioned to be loaded with contaminant thereon during use, and is, as a result, typically constructed as a serviceable component. Thus, the housing is typically configured with a main housing body or base section and an access cover; the access cover comprising a serviceable cover removable for internal servicing. The main filter cartridge is typically configured to be removably installed within the housing interior. To accomplish this, the main filter cartridge has a releasable housing seal. By "releasable", in this context, it is meant that the seal is established by the main cartridge engaging a selected portion of the housing (or assembly) when the cartridge is installed, and the seal is readily removed and released when the cartridge is removed from the housing. Such "releasable" seals are capable of being separated or removed without damage to either the main filter cartridge or the housing.

Many features concerning main filter cartridge configuration, relate to: ensuring a desirable amount of filter media surface area available for load, given limitations on volume, etc.; ensuring that the housing seal is configured so that the seal is properly established and maintained; and, ensuring that the cartridge cannot be misinstalled and/or that an alternate, inappropriate, cartridge cannot be inadvertently installed in the system. A variety of constructions have been developed to address these issues, including the general ones described in WO 2009/014986 A1 and/or WO 2012/116314 A1.

A housing, for example of an air cleaner assembly, is typically provided with an outlet air (gas) conduit or tube, in communication with open interior of the main filter cartridge. Thus, the housing seal on the main filter cartridge is typically either sealed to the outlet flow tube, or to a portion of the housing that surrounds a volume with which the outlet flow conduit or tube communicates. Herein, the portion of the air cleaner assembly to which the seal of the main cartridge releaseably engages, will be referred to as a portion of the housing, whether it is an outlet separable from a remainder of the housing structure, or some structure integral with other portions of the housing structure.

In many systems, it is desirable to provide the air cleaner assembly with a serviceable safety or secondary filter cartridge. The safety or secondary cartridge is typically positioned in the air (gas) flow path between the main filter cartridge, and the outlet flow exit of filtered air (gas) from the filter assembly (housing). When the main filter cartridge is configured for "out-to-in flow" during filtering, this means that the safety or secondary cartridge is typically positioned with at least a portion thereof oriented within the main filter cartridge interior.

Herein, the terms "secondary" or "safety" when used in reference to a filter cartridge positioned with media downstream of the main filter cartridge, are meant to be used interchangeably and without differentiated meaning.

Preferably, the safety filter cartridge is an optional serviceable component independent of the main filter cartridge. This means: that the main filter cartridge can be installed in, and be removed from, the housing, without removing (and preferably without dislodging from proper mounting) the optional safety cartridge; and, that servicing the main filter cartridge does not necessarily require servicing the optional safety filter cartridge.

Independent main and safety cartridges are advantageous for a number of reasons. An advantage, is that when the main cartridge is serviced, the safety cartridge can be left in place so as to avoid dirt and dust from entering the clean gas (air) plenum of the gas (air) cleaner system, for example as an interior of the housing is cleaned. Other advantages relate to convenience of installation and assembly, as well as convenience of component manufacture. In addition, separate construction allows for efficient material usage and disposition, especially since the main filter cartridge may need to be serviced, or be removed for inspection, more often than the safety cartridge.

There are a number of issues relating to safety or secondary filter cartridge configuration and assembly. For example, in many air cleaner assemblies, there is little option available for location of sealing between the housing and the safety filter cartridge. One region sometimes available, is an interior (or exterior) of a flange or tubular surface that surrounds a gas exit flow from the housing. This could, for example, comprise a surface of an outlet flow tube, or it could comprise a surface of a flange that projects into the housing at a location surrounding, but spaced from, the outlet flow tube.

When a cartridge seals to such a flange or tube, the seal is sometimes referenced as "radially" directed. By this, it is meant that the seal forces are generally directed around a central axis, with the forces of sealing being generally directed toward or away from that central axis. Typically, the central axis referenced, is an axis through an air flow exit from the associated cartridge, typically an axis also surrounded by the media. A seal may be referred to as "radially outwardly directed" and by similar terms, if the seal engages a housing component that surrounds the seal during use; and, the seal may be generally characterized as "radially inwardly directed" or by similar terms, when the seal is configured to surround and engage the housing component in use.

An issue with radially directed seals, is that they can take-up radial dimension within the housing. This reduces the cross-sectional area available for gas flow exiting the cartridge and/or housing, and can undesirably add to restriction.

Of course, the housing in which the safety cartridge is used can be made sufficiently large to minimize this problem, but there are limitations imposed on this by: a preference for the main filter cartridge to have as much surface area and media volume as reasonably possible; a preference that the air cleaner be as small and light as reasonably possible; cost and material issues; and, issues with handling and shipping components.

The restriction issue presented by reduction in cross-sectional area defined by the safety cartridge for air flow, as characterized in this section, relates to the dimension of radial direction (width) of the secondary or safety filter cartridge toward a central axis, from the seal surface, i.e. the part of the radial seal positioned to sealingly engage the housing. In general, it is desired that this amount of radial width or extension of the safety cartridge structure be maintained as small as reasonably possible, so as to ensure that the outlet flow cross-sectional size, through an end of the safety filter cartridge and to the outlet from the housing, remains as large as reasonably possible.

A variety of techniques have been implemented to manage this issue with the safety cartridge. An example depicted in WO 2012/116314, includes configuring the safety cartridge from non-pleated media, so as to limit the amount of radial dimension taken up by the media. Such techniques have been applied in a wide variety of safety filter or secondary filter element configurations.

However, there are issues presented from using non-pleated media. In particular, it limits the amount of media surface area in a safety filter available for filtering. In general terms, the surface area of media available in the filter cartridge is preferably as large as reasonable for the volume available. This renders advantageous media face velocities. Media face velocity is generally the gas flow rate through the media divided by upstream surface area of the media.

Smaller media surfaces lead to higher face velocities. Higher face velocities are typically less desirable than lower face velocities for a number of reasons. For example, higher face velocities generally result in a greater restriction placed on air flow through the air cleaner assembly, which is undesirable with respect to equipment operation and filter lifetime. Also, the higher the face velocity, the more likely a particle can penetrate through the media and reach the clean air (gas) plenum.

It can be understood that non-pleated media of a given outer perimeter size has a higher face velocity than pleated media which defines the same outer perimeter size (i.e., outer perimeter size disregarding pleat presence). However, introduction of pleats into the media has generally been undesired for certain secondary filters, as pleats introduce radial width dimension to the cartridge, which leads to increase in restriction to gas flow outwardly from the cartridge and assembly. Herein in the next section, selected filter cartridge features are described, which can be applied to balance these issues to advantage.

In addition, especially with a safety cartridge that projects into the open interior of the main cartridge during use, gas flow exiting the main cartridge and being directed toward the gas flow outlet can be affected by the shape features of the secondary cartridge. Advantageous shape features are discussed in the next section, which can lead to more desirable flow characteristics. This can help limit restriction increase and provide more desired filter assembly operation.

The issues of limited surface area available for secondary or safety filter systems are exacerbated, when the main filter cartridge tapers downwardly in extension from an exit end toward a remote end of the cartridge. This is because the inward tapering of the main filter cartridge reduces cross-sectional area into which the safety filter can project, adjacent an end of the main filter cartridge remote from the air flow exit. Techniques described herein can be applied advantageously to manage such issues, in a variety of systems.

B. An Example Filter Media Configuration FIGS. 1-10.

Figure 1:
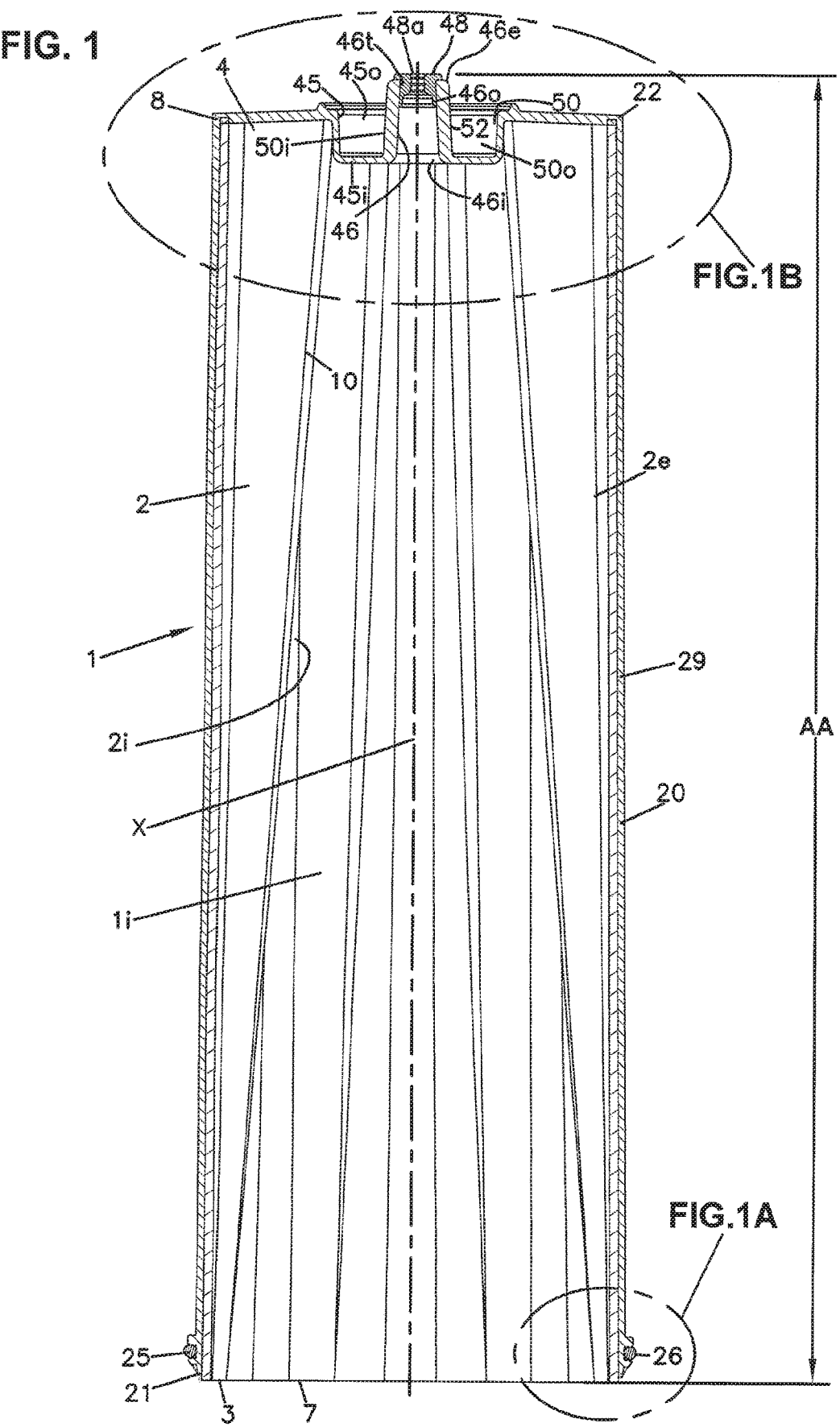
FIG. 1 is a schematic cross-sectional view of a filter cartridge according to the present disclosure; the view being taken generally along line 1-1, FIG. 2.

The reference numeral 1, FIG. 1, generally depicts an example filter cartridge in accord with selected, optional, improvement according to the present disclosure. The example filter cartridge 1 depicted, is configured with features advantageous for use in a safety or secondary filter cartridge, for example to be used in an assembly configured for out-to-in flow through a main filter cartridge during operation; and, in which the secondary filter cartridge is configured to be sealed radially to a surface of a housing component tube or (flange), with a media of the safety filter cartridge projecting into an open filter interior of a main cartridge. It will be understood that the selected advantageous features described herein, however, can be applied in a variety of alternate applications/configurations.

Referring to FIG. 1, the filter cartridge 1 depicted comprises an extension 2e of media 2 extending between first and second media ends 3, 4. In general terms, the media 2 surrounds a central axis X and defines an open interior 2i, which corresponds to a clean gas (air) side of the media 2.

The first media end 3 is positioned at an exit end for filter and gases, from the filter cartridge 1. That is, end 3 of the media corresponds to an open exit flow end 7 of the filter cartridge 1, for filtered gases flow during use. It is in regions adjacent end 7 that it is most desirable that the filter cartridge 1 maintain a relatively small radial (width) dimension, so as to avoid increasing restriction to gas flow exit, to an extent reasonable.

To provide for the advantageous opening 7, preferably media 2, at end 3, is non-pleated or minimally pleated. By "minimally pleated" in its context, it is meant that if there is any pleat definition at end 3 at all, it is no more than 3 mm in pleat depth. Preferably, any such pleat definition is with a pleat depth of no more than 2 mm and more preferably no more than 1 mm. By "pleat depth" in its context, reference is meant to a dimension of a pleat radially inwardly from an outermost perimeter, in a direction toward central axis X. Most preferably at end 3, the media 2 is not pleated at all, i.e. it has no pleat depth.

However, as explained above, it is desirable to provide the media 2 with a surface velocity as low as reasonable. Thus, it is desired for the media 2 to have a pleated configuration in spite of the fact that it is desirable to have minimal or no pleat depth at end 3. To accommodate this, the media 2 is provided with a pleat definition adjacent second end 4. Preferably the pleat definition is one that decreases in pleat depth in a direction of pleat extension from end 4 toward end 3. Such a pleat is shown in FIG. 1, for example, at 10, with a pleat depth at end 4 being at least 5 mm, preferably at least 10 mm, often at least 15 mm, and in many instances 20 mm or more. Indeed, for a typical application, a pleat depth at end 4, (i.e. at the second end of the media), on the order of 15-40 mm is typical, although alternatives are possible. This can be used to provide a media area at least 10%, typically at least 20%, and often 25% or more, greater than a media area if non-pleated media of the some outer perimeter size, is used.

In general terms, adjacent the second end 4, the media 2 is pleated, comprising a plurality of pleats having a pleat depth of at least 5 mm and preferably as defined. Herein, when it is said that a "plurality of pleats" has this definition, it is not meant that every pleat adjacent the end 4 must have this definition, but merely that there be a set or plurality of them of that does. In a typical example as depicted, however, every pleat adjacent end 4 has a pleat depth in accord with the characterizations of the previous paragraph, to achieve preferable media area increase.

Figure 8:
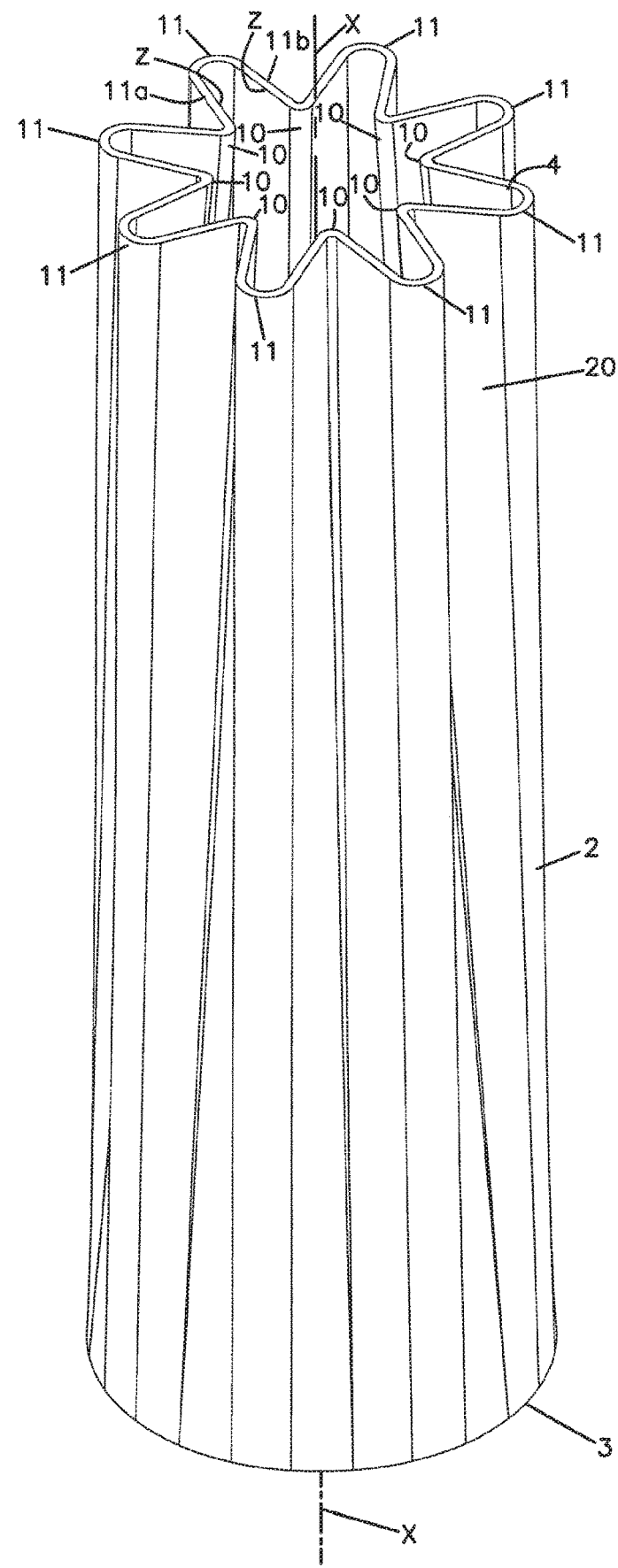
FIG. 8 is a schematic perspective view of a filter media component of the filter cartridge of FIG. 1.

An example media configuration depicted to provide for this definition, can be understood by reference to FIG. 8. Referring to FIG. 8, the media 2 is depicted surrounding axis X and in extension between first, in the example non-pleated (or minimally pleated) end 3, and, opposite, second, end 4. The second end 4 comprises a plurality of inwardly directed (inner) pleats 10 and a plurality of outwardly directed (outer) pleats 11; the inner pleats 10 and outer pleats 11, alternating. In a typical application of the principles according to the present disclosure, media 2 will comprise at least 5 each of inner pleats 10 and at least 5 such outer pleats 11, and typically not more than about 15 of each. A typical number will be within the range of about 6-12 inclusive, although alternatives are possible.

The techniques described herein can be applied with an alternate number of pleats, and the number of pleats is not critical to obtain some advantage. However, relatively few pleats (12 or less) that have relatively wide pleat definitions facing radially outwardly, i.e. along the outer perimeter, can be advantageous for desirable gas flow characteristics and avoidance of undesirable gas flow restriction.

Figure 9:
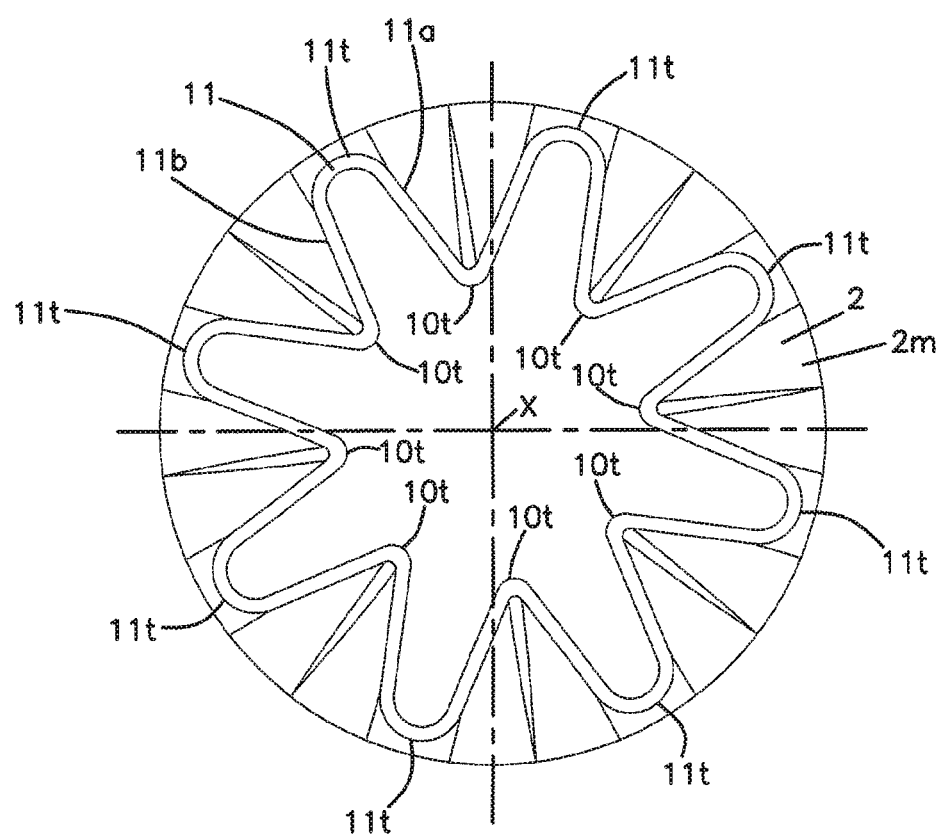
FIG. 9 is a schematic end view of the filter media component of FIG. 8; the view of FIG. 9 being taken toward the top end of the view/orientation of FIG. 8.
Figure 9A:
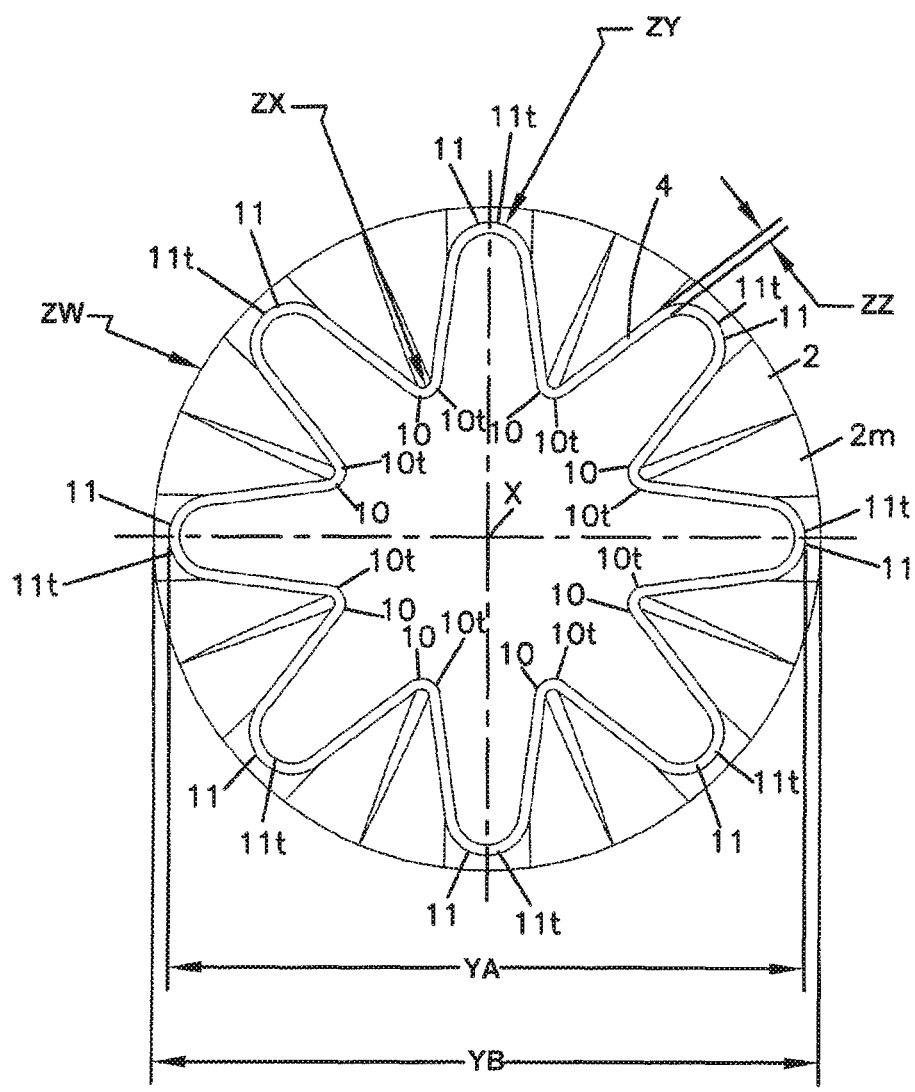
FIG. 9A is a view generally analogous to FIG. 9, with selected dimensions indicated.

Referring to FIGS. 9 and 9A, views taken toward media end 4, typically the outer pleats 11 will have a generally wide, rounded, as opposed to sharp, pleat tip definition, for example, defining a radius at end 4 for each pleat 11 of at least 3 mm, typically at least 4 mm, for example typically 4-11 mm, inclusive. This will be advantageous with respect to formation of the configuration, although alternatives are possible. The inner pleats 10, however, will typically be formed more sharp and to a smaller radius of curvature. A typical radius for the inner pleat tips would be no larger than 3 mm and often no larger than 2 mm.

As indicated, the outer pleats 11 are typically and preferably relatively wide. By this, it is meant that the opposite sides 11a, 11b, FIG. 9, of the pleats 11, adjacent end 4, generally diverge from one another at an angle of at least 10°, typically at least 15°, for example in the order of 15-30°, inclusive; and/or the pleat sides 11a, 11b reach a distance apart from one another of at least 8 mm, usually at least 10 mm and often 10-20 mm, within a selected distance from the outermost pleat tip 11t of no greater than about 15 mm.

The relatively wide, rounded, outer tips 11t of the outer pleats 11 provide for a large outside surface area for engagement with support structure, as discussed below. It is desirable to avoid a sharp point at pleat tips 11t, at least for that reason. The relatively sharp internal pleats 10t provide for convenient assembly and manufacturing, as well as desirable media characteristics and flow characteristics.

Referring to FIG. 9, it is noted that the outer pleat tips 11t, adjacent end 4, are angularly spaced rather widely, with spacing (on center) being on the order of at least 30°, typically 30-50°, inclusive, (usually 35°-50°, inclusive) around central axis X. The dimension of this spacing (outer pleat tip 11t to outer pleat tip 11t) is typically at least 20 mm, usually at least 30 mm, for example 35 mm to 55 mm, inclusive. Also, the inner pleat tips, adjacent end 4, are spaced rather widely, typically at least 30° often at least 35° and usually in the order of 35°-50°, inclusive. This creates long, wide flow channels on the exterior 11c and on the interior 10c, along which gases can flow toward the outlet end 3. This provides an arrangement that is desirable with respect to management of gas flow restriction issues, and is a reason why it is desired to not have an excessive number of pleats (greater than 12, and typically 10 or less) in spite of the advantages from increased surface area and lower face velocity.

In FIG. 9A, some example dimensions are provided as follows: ZX=1.5 mm radius; ZY=8 mm radius; ZW=124.7 mm diameter; ZC=2 mm; YA=119 mm; and, YB=124.7 mm.

Figure 10:
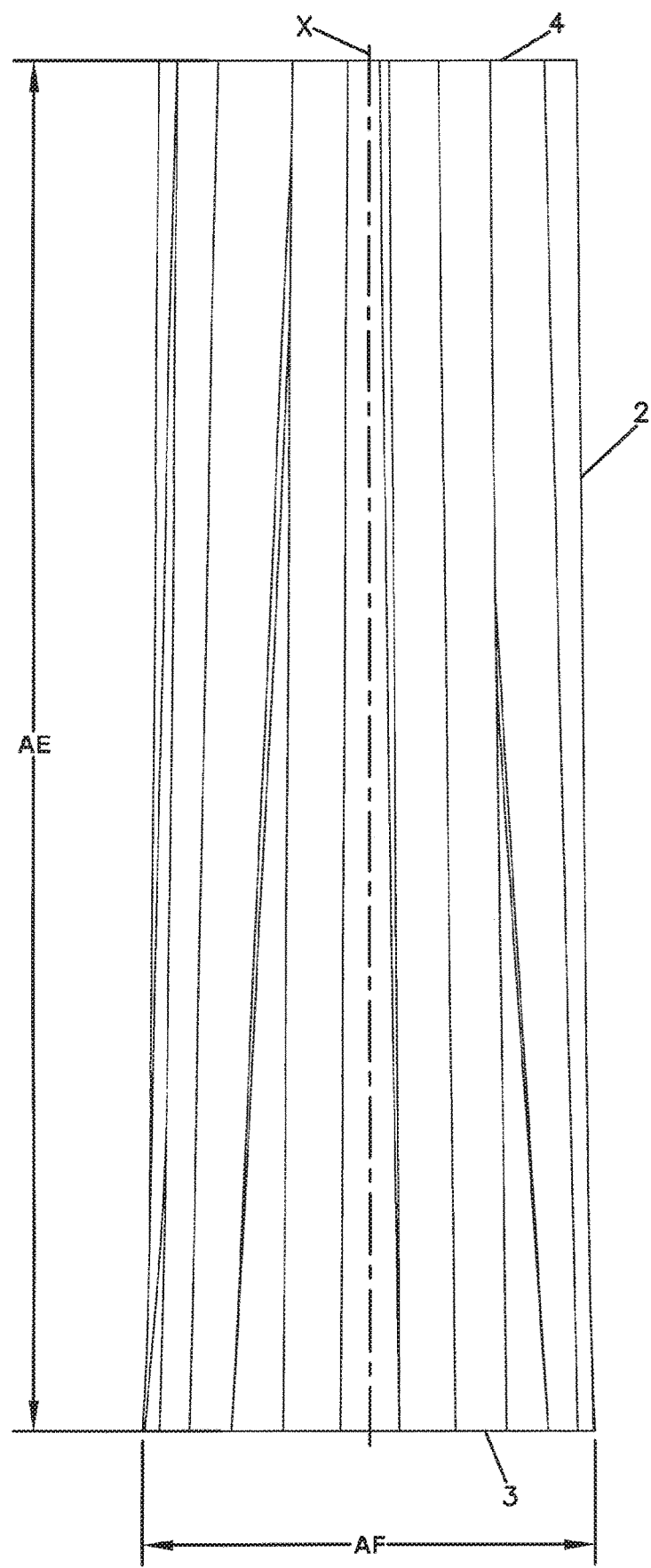
FIG. 10 is a schematic side elevational view of the media component of FIG. 8.

In FIG. 10, example dimensions are as follows: AE=379 mm; AF=124.7 mm.

C. Media Support and Filter Cartridge Features; FIGS. 1-7

Typically, the outermost tips 11t of outer pleats 11 and innermost tips 10t of a plurality of the pleats 10 will extend generally straight, in extension from end 4 in a direction toward end 3. Typically, the outer pleat tips 11t will either extend parallel to central axis X, or at an acute angle of no less than 88° and typically no less than 89° with respect to a plane perpendicular to central axis X. Typically, the pleat tips 11t of a plurality of pleats 11 extend at an angle relative to a plane perpendicular central axis X of about 88-90°, inclusive.

A plurality of inner pleat tips 10t, typically extend radially outwardly from central axis X substantially, and extend at an acute angle of no greater than 88°, typically no greater than 87° and often within the range of 75°-86°, inclusive, relative to a plane perpendicular to central axis X; with the extension being radially outward in extension from adjacent end 4 in a direction toward end 3.

Typically, an angle (acute angle) of extension of the plurality of outer pleat tips 11t (relative to a plane perpendicular to central cartridge axis X in a direction of extension from end 4 toward end 3) is at least 1° larger, typically at least 2° larger and often at least 4° larger, than an analogous acute angle of extension of the plurality of inner pleat tips 10t relative to the same plane perpendicular to the central cartridge axis X and also in extension from adjacent end 4 in a direction toward end 3. Typically, end 22 is an end of the media support 20 engaged by end 4 of the media. End 21 is an end remote from end 22, in the direction of cartridge end 7 and media end 3. The end 21 will typically be positioned closer to media end 3 than to media end 4, and typically within 50 mm of end 3, usually within 40 mm of end 3, most often within 20 mm of end 3 and in many instances, within 10 mm of end 3. In some instances, end 21 may be positioned at media end 3, but in the example depicted, end 21 is recessed toward media end 4, slightly, from media end 3, as discussed below.

In FIG. 10, a side view of the media 2 in the configuration of FIG. 8 is shown. In FIG. 10, example dimensions are indicated as follows: AE=379 mm; AF=124.7 mm. Of course the principles can be implemented in a variety of different sizes and different arrangements.

In the particular cartridge 1 depicted, FIG. 1, the media 2 is supported by a frame arrangement 20, referenced generally as a media support. The media support 20 generally extends between media support first and second ends 21 and 22. Preferably, the media support adds relatively minimally to the radial thickness or dimension of cartridge 1, near end 7. Near end 7 (and support end 21) the cartridge 1 is depicted with a housing seal member 25 thereon. In the example depicted, the housing seal member 25 comprises an o-ring 26 configured to form a radially (outwardly) directed, seal with a (surrounding) housing component, during installation.

Figure 1A:
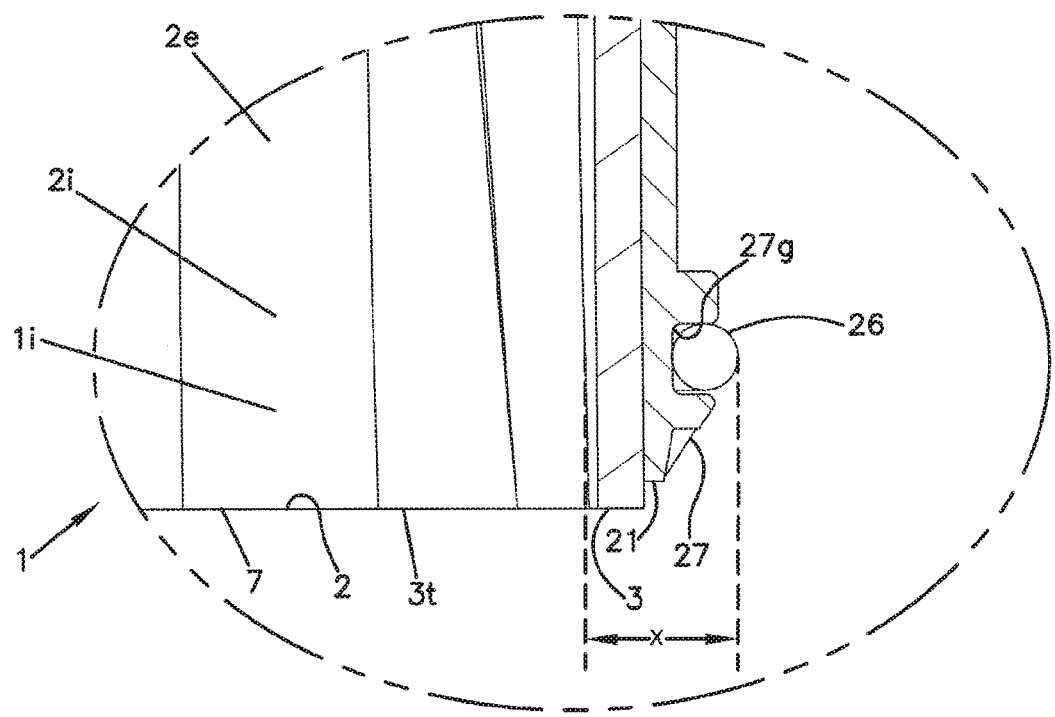
FIG. 1A is an enlarged, fragmentary, schematic view of a first identified portion of FIG. 1.

Typically, a largest radial dimension of width, indicated generally or by dimension X, FIG. 1A, of the cartridge 1, at a selected location within 50 mm of media end 3 and cartridge end 7, is a radial dimension adjacent a largest radial reach of the seal member 25. Typically, this location is within 40 mm of media end 3 and cartridge end 7, usually within 30 mm of media end 3, and cartridge end 7 and most preferably within 15 mm of cartridge end 7.

Referring to FIG. 1A, it is noted that for the example depicted, at end 3 a portion of the media 2 extends axially beyond end 21 of the support 20. This optional extension, which is usually no more than 10 mm typically no more than 5 mm, sometimes no more than 3 mm, and which can be 2 mm less, for example 1 mm or less, but usually at least 0.5 mm, is an optional extension that can provide advantage. In particular, it creates a flexible media tail region that can assist in providing a secondary seal adjacent the end of a support on which the cartridge 1 can be mounted during typical use and also potentially against an adjacent end of the housing. Thus, referring to FIG. 1A, typically at end 3, the media 2 has an end tip 3t that is not directly radially engaged by any portion of support 20 and is not embedded with any end cap material or similar material, but rather is a "free end tip 3t."

Typically, the widest portion of the cartridge 1, in a radial direction, adjacent, but typically spaced from tip 3t, by no more than 20 mm, at end 3, and at a location of the seal 26, has an overall width dimension of no greater than 20 mm, typically no greater than 15 mm and often no greater than 12 mm. This, again, is the dimension indicated in FIG. 1A at X, and is meant to refer to a dimension without distortion of seal 25 by sealing engagement with structure. It may be referred to as the undistorted cartridge radial width dimension adjacent the housing seal. This dimension X, FIG. 1A, is usually at least 5 mm less than the pleat depth adjacent end 14, typically at least 10 mm less, sometimes at least 15 mm less.

The inner pleats 10 are characterized herein as relatively sharp. This is because the pleat tips 10t adjacent end 4 are typically quite sharp in definition, not widely rounded. The inner pleats 10 may be relatively wide themselves, for example, with sides 10a, 10b diverging at an angle of at least 30° typically at least 40° for example 40°-70° in extension from the inner pleat tips 10t at a location adjacent end 4.

Referring to FIG. 1A, the support 20 includes a seal support ring, end ring (seal end ring) or seal support member 27 adjacent end 21; the seal support member 27 defining a groove 27g for receipt of seal such as o-ring 26, therein. It will typically be the portion of the end member 27 that defines the groove 27g that provides for the widest depth dimension X, FIG. 1A, in combination with the seal 26, adjacent end 7 of the cartridge.

Referring again to FIG. 1, the support 20 preferably not only provides for seal support, at region 27, but also provides for radial support of the media 2. Thus, the support 20 includes a longitudinally extending media support region 29 that extends between support ends 21, 22.

Figure 5:
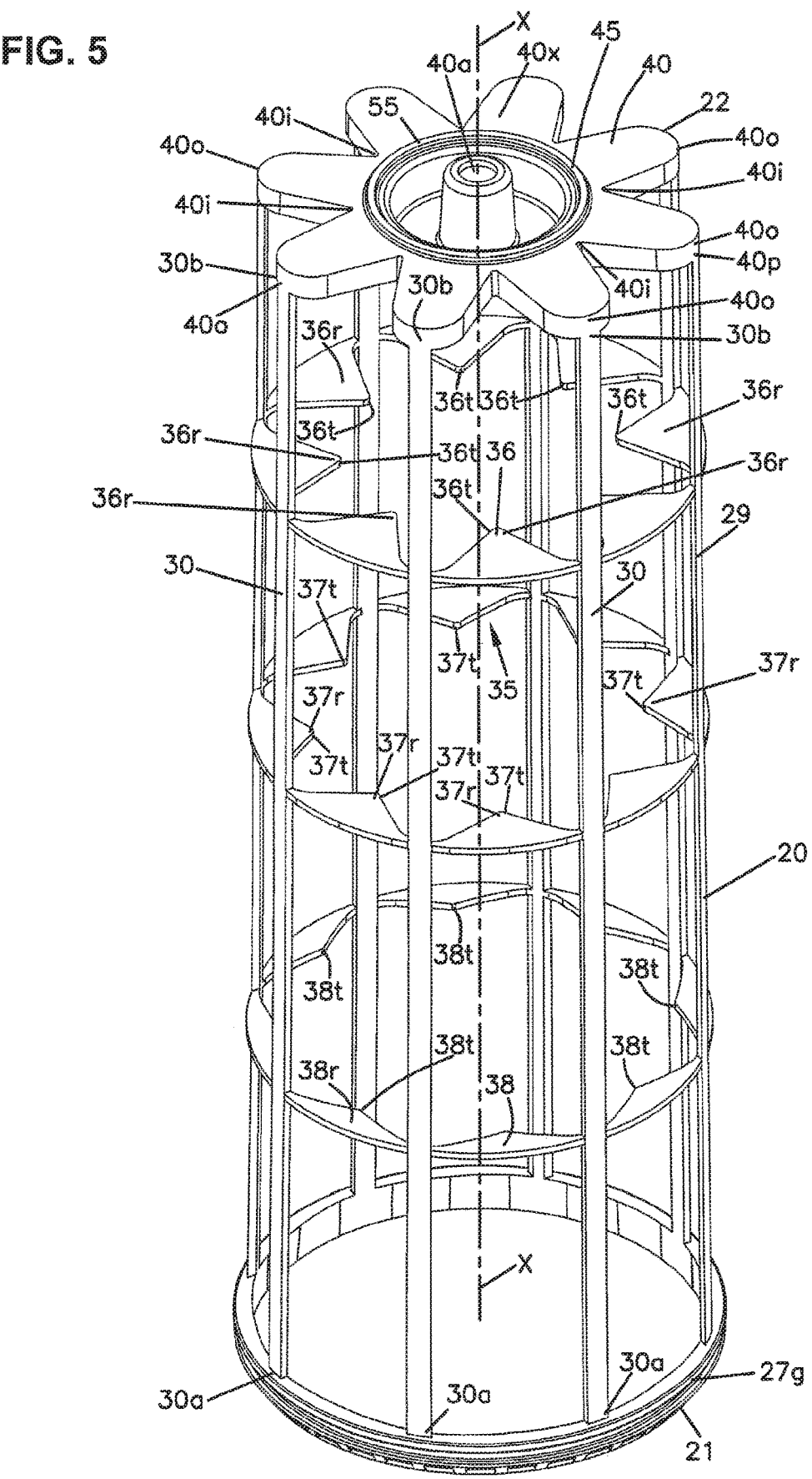
FIG. 5 is a schematic perspective view of a frame piece component of the cartridge of FIG. 1.
Figure 6:
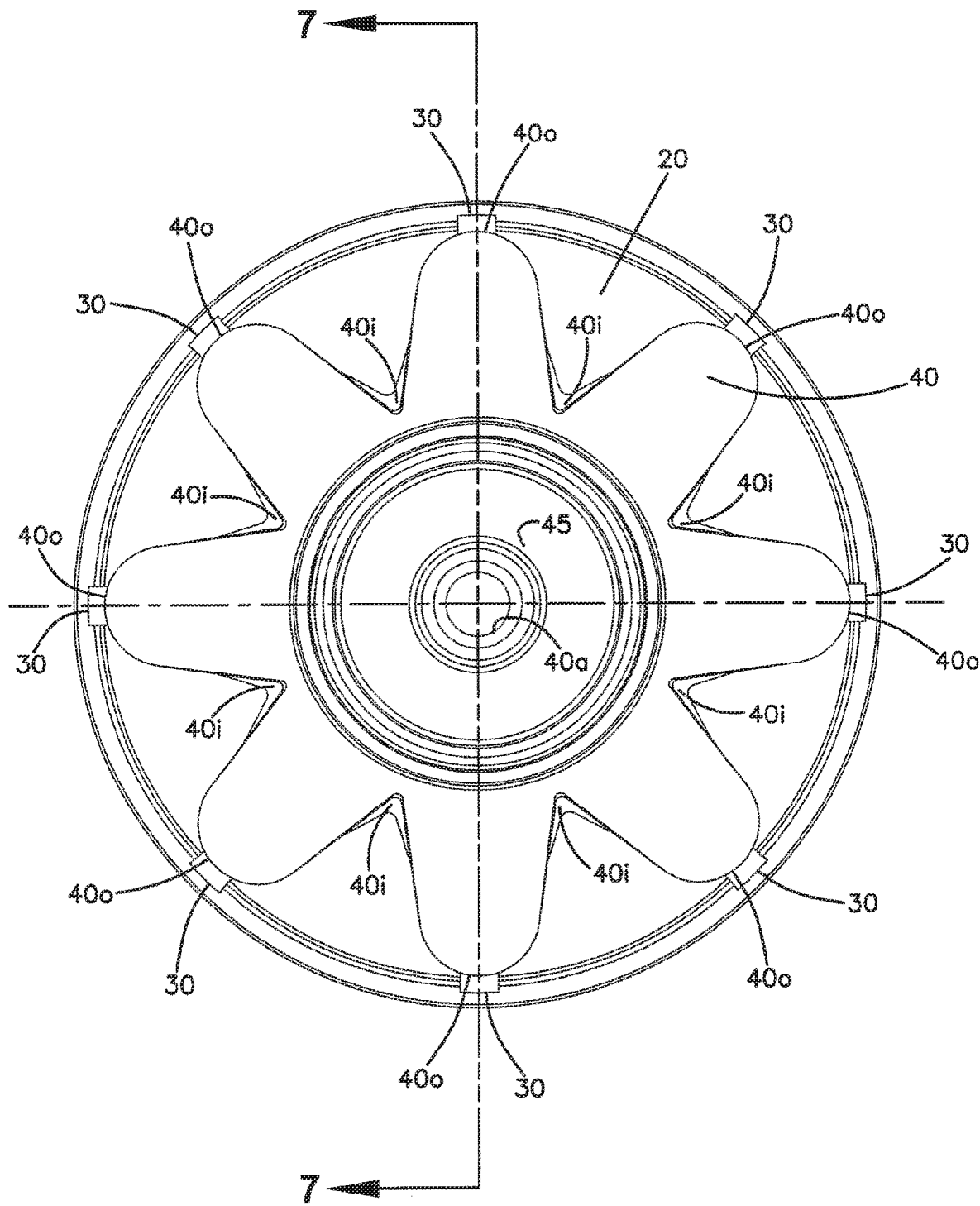
FIG. 6 is a schematic end view of the frame piece of FIG. 5; the view of FIG. 6 being taken toward the top end of the view/orientation of FIG. 5.

With respect to detail concerning the example media support 20 depicted, attention is directed to FIG. 5. Of course variations in structure can be made, as will be understood from the following.

In FIG. 5, the example support 20 is depicted independently of the media 2 and seal member 25. With respect to FIG. 5, it is noted that in a typical approach to assembly in cartridge 1, discussed below, the support 20 is not made independently of the cartridge 1. That is, typically, the support 20 is injected molded onto the media 2, for a typical approach to manufacture of cartridge 1. Such a support 20 will sometimes be characterized herein as "molded-in-place" or by similar terms. The view of FIG. 5, which shows features of the support 20 independently of the media 2, allows for an understanding of certain, selected, preferred support 20 features. It is also noted that some of the techniques and advantages described herein can be obtained in an arrangement in which the support is not molded-in-place on the media 2, but rather is separately formed and then is attached to the media 2 to form a cartridge.

Referring to FIG. 5, the support 20 can be seen as including a longitudinal support section 29 comprising a plurality of longitudinal ribs 30 in extension between ends 30a, 30b. The ribs 30 are spaced, radially, around a central axis X, FIG. 1. Typically, the ribs 30 extend from adjacent end 4 of the media to a location at least 50% of a distance toward the first end 3 of the media, usually at least 75%, typically at least 80% and often at least 90% of this distance.

Referring to FIG. 5, ends 30a of the ribs 30 are generally positioned adjacent end or end region 21 of support 20. The opposite ends 30b are generally positioned adjacent end 22. In the example depicted, the ribs 30 are straight in extension between the ends 30a, 30b, because preferably they are configured to engage and extend along outer pleat tips 11t. When this is the case, the number of ribs 30 will typically correspond to the number of outer pleats 11, although alternatives are possible. Also, typically the ribs 30 will be radially evenly spaced around central axis X, since typically the pleats 11 will also be similarly spaced. Alternatives are possible. Engagement of the ribs 30 with the pleats 11 and pleat tips 11t (and with the ribs 30 extending generally straight in extension between end 30a, 30b, with even radial spacing around axis X) will typically be preferred as it helps secure the media 2 and the pleats 11 in a preferred configuration, of the type described. (Preferably there are no ribs 30 that are not positioned along a pleat tip 11t).

The cartridge 1, of FIG. 1, using support 20, is provided with a pleat shape or spacer arrangement not viewable in FIG. 1, but viewable in FIG. 5 at 35. In general, the pleat spacer arrangement 35 is an arrangement that comprises relatively rigid projections that extend radially toward axis X and into spaces between the various ones of the outer pleats 11 (FIG. 8), to help ensure proper pleat spacing/shape. This helps protect the media 2 against pleat collapse, etc. For the particular example depicted, the pleat spacer arrangement 35 is provided as an outside or exterior spacer arrangement, with the projections extending between the outer pleats 11, at a location around an outer perimeter of the media 2.

The terms "exterior" or "outside" when used in the context of characterizing spacer arrangement 35, is meant to indicate that the spacer arrangement is generally configured around an outside of the media 2, with pleat spacing portions positioned between outwardly extending pleats 11. The terms "exterior" and "outside", then, refer to the fact that the pleat spacer 35 is generally around an exterior of the media 2, not an interior.

Referring to FIG. 5, and in general in reference to pleat spacer arrangement 35, the assembly includes at least one intermediate pleat spacer 36. The term "intermediate" in this context, is meant to refer to a pleat spacer 36 positioned axially spaced (i.e. in the direction of axis X) from each of ends 22 and 21 of support 20, and spaced from each of ends 3, 4 (FIG. 8) of the media 2. The particular pleat spacer arrangement 35 depicted, includes three, spaced, intermediate pleat spacers 36, 37, 38. In more general terms, the pleat spacing arrangement 35 will typically include at least one, and usually a plurality of, intermediate pleat spacers (36, 37, and 38). The typical number will be at least two and usually there will not be more than 5; the number typically being related to a length of the cartridge 1 and the nature of support preferred for the media 2, for the intended use.

Referring to FIG. 5, intermediate pleat spacer 36 is configured to surround an outer (or exterior) surface 20 of the media 2; and, to have a plurality of spaced radial projections 36r that extend radially to tips 36t in a direction toward the central axis X and which extend, generally, between outer pleats 11, in the assembled cartridge 1, FIG. 1. Similarly, intermediate pleat spacer 37 comprises a plurality of spacers 37r directed, generally, radially inwardly to tips 37t, i.e., toward central axis X, and positioned between outer pleats 11. Finally, pleat spacer 38 comprises a plurality of radial extensions 38r that extend generally radially inwardly to tips 38t towards the central axis X, and which are configured to be positioned between adjacent ones of outer pleats 11.

It is noted that in the example cartridge 1 depicted, the amount of extension (or radial dimension) toward axis X inwardly of tips 38r is less than tips 37t, which is less than tips 36t. The reason for this is that for the example cartridge 1 depicted, the pleat depth of the media 2 decreases as it extends toward end 21 from 22 as discussed above in connection with FIGS. 8-10.

Still referring to FIG. 5, typically ribs 30 and pleat spacers 36, 37, 38, are molded integral with one another, for convenience. A particular, convenient, assembly approach is described further herein below.

The particular configuration of the pleat spacers 36, 37, 38 (i.e., spacer arrangement 35 generally) is generally a matter of choice for the application of concern and the methods of concern. Typically, the pattern defined by the spacers (36, 37, 38) will correspond to the pattern intended for the media 2, with respect to the definition of the perimeter configuration. Whether or not each one of the spacers (36, 37, and 38) is in a plane perpendicular to central axis X is a matter of choice, in part depending on the particular approach to manufacture used. Whether or not the upper and lower surfaces of the spacers 36, 37, 38 (upper and lower in this context referring to the extension of FIG. 5) are planar, is also a matter of choice depending on the method of manufacture chosen. The particular configuration depicted in FIG. 5 is convenient and effective, but alternatives are possible.

The spacing of the pleat spacers 36, 37, 38 from one another, and from adjacent ones of ends 21, 22, is a matter of choice for accomplishing the desired support for a given system. Typically, spacers 36, 37, 38 will be spaced relatively evenly from adjacent ones of the spacers 36, 37, 38 and relatively evenly from opposite ends 21, 22. Thus, for example, with three spacers each could be spaced from an adjacent spacer by about 20-30% of the distance between the ends 21, 22.

Still referring to FIG. 5, at end 22, which is an end of support 20 that will be positioned adjacent end 4 of the media 2, FIG. 1, the support 20 (in cartridge 1) includes an end piece 40. End piece 40 will sometimes be referred to as a media end piece or as a media support end piece or by similar terms. The end piece 40 is generally positioned to extend across an end of the media 2 at end 4, i.e., an end remote from the outlet end 7 of the cartridge.

In general, the end piece 40 interiorly closes ends of the pleats 10, 11 adjacent media end 4. When, the support 20 is molded-in-place, it is typically formed with end 4 of the media 2 embedded in material from which the end piece 4 is formed. When it is said that the end piece 40 "interiorly closes" the ends of pleats 10, 11, it is meant that the closure is at least on an inside of the media 2, i.e. at a downstream side of the media.

The end piece 40 can be an "open" end piece or a "closed" end piece. By the term "closed" in this context, it is meant that the end piece 40 would include no open central aperture therethrough, in communication with an open interior 2i of the media 2 (interior 1i of the cartridge 1), FIG. 1; i.e. there would be no aperture or any aperture present would be plugged closed in some manner. For the particular cartridge 1 depicted, the preferred end piece 40 is "open," in that there is a central aperture 40a therethrough, that communicates with the open interior 2i of the media 2 (i.e., open interior 1i of the cartridge 1), FIG. 1. When the cartridge 1 is installed for use, a portion of the housing can optionally project through aperture 40a, stabilizing the cartridge 1. Also, when the cartridge 1 is installed for use, the optional aperture 40a often be sealed closed to avoid a leak path with respect to operation of the cartridge 1.

Referring to FIG. 5, the end piece 40 for the example embodiment depicted, has an outer perimeter 40p comprising a plurality of alternating radially inwardly extending sections, gaps or recesses 40i and outwardly projecting fingers, flanges or sections 40o. The recesses 40i are typically positioned in axial overlap with end of flutes along an exterior or upstream side of the media 2. While alternate perimeter definitions are possible, this definition of alternating outward projections 40o and inwardly projecting recesses or sections 40i is desirable, because it allows for a longitudinal (axial) flow of gases (e.g., air) in a direction along the outer surface 2o (FIG. 8) of the media 2, between outer pleats 11, adjacent end 4 and between projections 40p. This provides for a convenient, less restrictive, gas flow. Alternative shapes for end piece 40 are possible, however.

Typically, the number of projections 40o and recesses 40i corresponds to the number of pleats 11.

Typically, each of the recesses 40i projects radially inwardly toward central axis X, a distance of at least 10 mm (relative to the projections 40p) usually at least 15 mm and often an amount within the range of 20-40 mm. Also typically the recesses 40r project toward central axis X, a distance of at least 25%, usually at least 30%, and often an amount within the range of 40-60%, inclusive, of the distance between outermost parts of the projections 40p and the central axis X. Typically, the projections 40p are spaced apart (at outermost tips) by at least 30 mm, usually at least 35 mm; and, by an angular definition around central axis X of at least 30°, typically at least 40°.

The depth of the recesses 40i characterized in the previous paragraph is not critical, but does provide for advantage. In particular, it ensures a good, open, area along a longitudinal (axial) flow path through end piece 40 down in between outer pleats 11 during operation, which is a favorable flow path for managing restriction issues.

Referring to FIG. 5, end piece 40 generally includes a central region 45 that extends across an otherwise open interior end of the media 2 at end 4, FIG. 1. Referring to FIG. 1, central region 45 is defined by an inner surface 45i and outer surface 45o; the inner surface 45i being the surface that faces an interior 1i the cartridge 1 (and media end 3, cartridge end 7 and support end 21); and, the exterior surface 45o being an opposite surface.

Figure 1B:
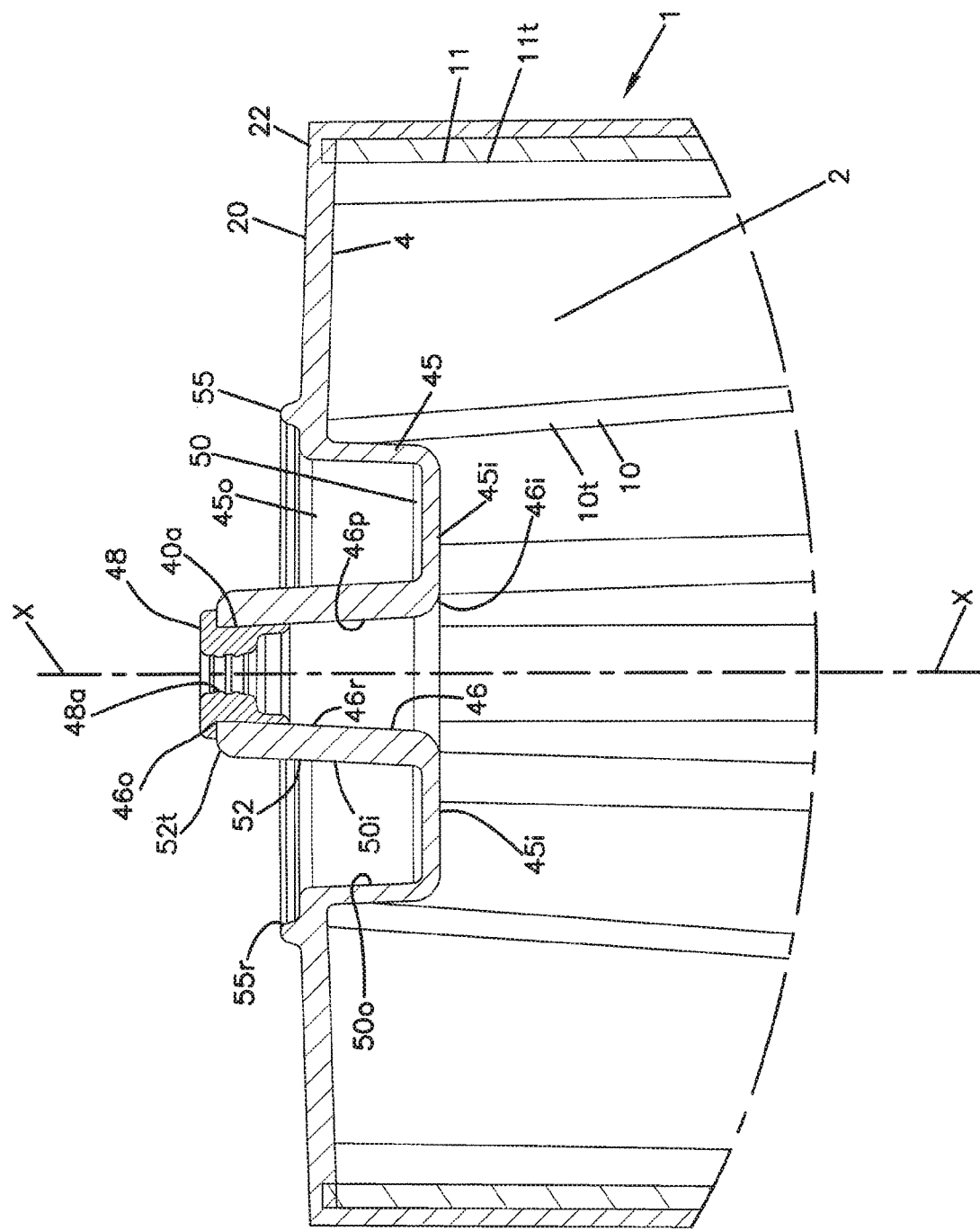
FIG. 1B is an enlarged, fragmentary, schematic view of a second identified portion of FIG. 1.

In FIG. 1B, an enlarged fragmentary view of a portion of the cartridge 1, FIG. 1, is provided, for some convenient inspection on end piece 40. In general, the aperture 40a, referenced above, extends through central region 45, in communication between inner surface 45i and outer surface 45o.

Within the interior surface 45i, end member 40 (i.e., central portion 45 of cartridge 1 generally) includes a receiver recess 46r. The receiver recess 46r generally comprises a recess in a projection 46 projecting in a direction (of extension of central axis X) away from end 7 of the cartridge 1, FIG. 1. It is not, however, meant that the projection 46 necessarily extends parallel to central axis X. Typically, the central recess 46r is defined by a wall symmetrical in extension around central axis X, although alternatives are possible. The receiver recess 46r is defined by a wall or projection 46 having surface 46p and is configured to optionally to receive, projecting therein, structure of certain preferred types of housings with which the cartridge 1 can be used, as discussed below.

It is noted that the optional aperture 40a is provided in communication with recess 46r, with central axis X passing therethrough. When the optional aperture 40a is used, this will be a typical position. In certain applications, a portion of a housing that optionally projects into recess 46r will also be configured to project completely through aperture 40a, in a preferred manner, discussed below.

Figure 11A:
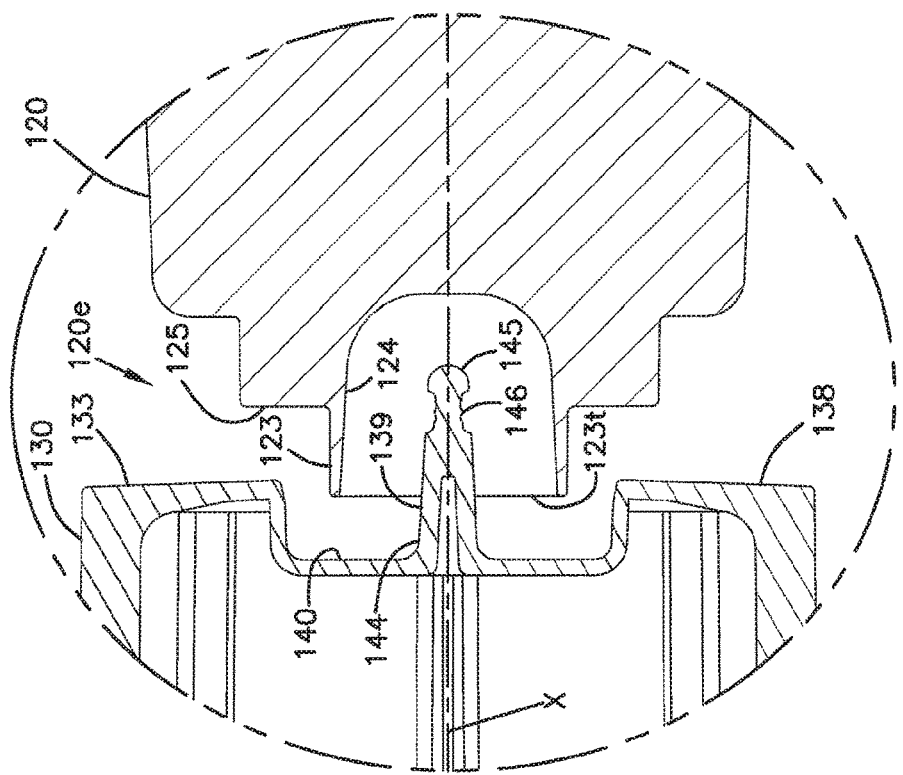
FIG. 11A is a schematic enlarged fragmentary view of a selected portion of FIG. 11.
Figure 11B:
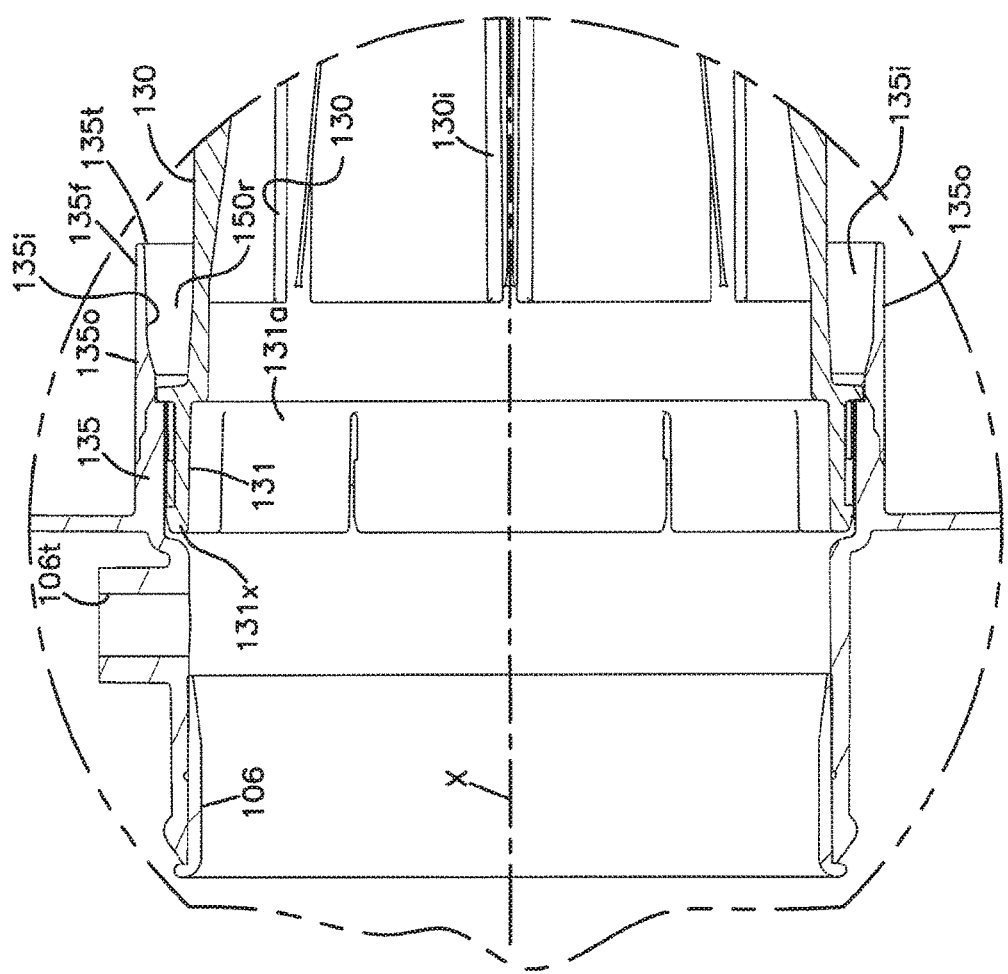
FIG. 11B is an enlarged fragmentary schematic view of a second selected portion of FIG. 11.

Referring to the wall 46p of surface 45i that defines the recess 40a, it is noted that for the example depicted, FIG. 11B, surface 46p is generally frusto-conical or truncated; reducing in inner perimeter cross-dimension definition (typically diameter) in extension in a general direction of axis X away from media end 3 and support end 21. A typical configuration will have such a slant or frusto-conical shape to it, with the side wall 46p extending, generally, radially inwardly at an angle of about 85°-99.5°, inclusive, relative to a plane perpendicular to central axis X, in extension away from media end 3 and support end 21. Alternatives are possible.

Referring to FIG. 1B, it is noted that the aperture 40a in the particular example depicted, has been fitted with (i.e. is lined with) a liner or grommet 48. The particular liner or grommet 48 depicted, includes an optional central aperture 48a therethrough, corresponding in part to aperture 40a. The grommet 48, when used, will typically comprise a resilient, seal-type, material.

Typically, the recess 46r extends, axially, a distance of at least 15 mm usually at least 20 mm, often 20-40 mm, inclusive, in extension between an innermost end 46i and on outermost end 46o, FIG. 1B. The liner or grommet 48 will typically extend, axially, at least 10% of an axial extension (extension in the direction of axis X) of recess 46, typically an amount within the range of 20-40%, inclusive, of this extension.

Referring to FIG. 1, for the particular cartridge 1 depicted, the outer surface 45o of the end piece 40, includes an optional outer receiving groove 50 therein. The outer receiving groove 50 is a groove that is open in a direction away from media end 3 and extends generally toward end 7 from regions adjacent end 8. The groove 50 is typically and preferably at least 5 mm deep in axial extension from immediately adjacent portions, typically surrounding portions, of end member 40, typically at least 8 mm deep and often 8-20 mm, inclusive, deep. Typically, the groove 50 is at least 5 mm wide, typically at least 6 mm wide and often 6-30 mm, inclusive, wide, in extension between radially inner surface 50i and radially outer surface 50o thereof. Usually it is not more than 20 mm wide. Typically the radial inner surface 50i is defined by a wall 52, which, along an interior surface thereof, defines recess 48. Typically, the wall 52 extends axially in a direction away from end 7 to a location further than an end 4 of the media, typically at least 5 mm further and often at least 10 mm further. In the example depicted, the wall 52 defines a tip 52t, which also defines aperture 40a discussed above.

The optional receiving groove 50 is typically and preferably configured to mate with portions of a main filter cartridge in an air cleaner assembly.

Attention is now directed to FIG. 5 and to optional projection arrangement 55 on outer surface 40x of end piece 40. Optional projection arrangement 55 is typically relatively narrow in maximum width (typically not more than 10 mm) and projects in a direction away from surrounding portions of surface 45o, a distance of at least 0.5 mm, usually at least 1 mm, and typically not more than 10 mm. The particular optional projection arrangement 55 depicted is a continuous ring 55r, but alternatives, such as segmented rings, are possible. The projection arrangement 55 comprises an optional contact region for engagement with the main filter cartridge, in selected uses of the cartridge 1.

Figure 7:
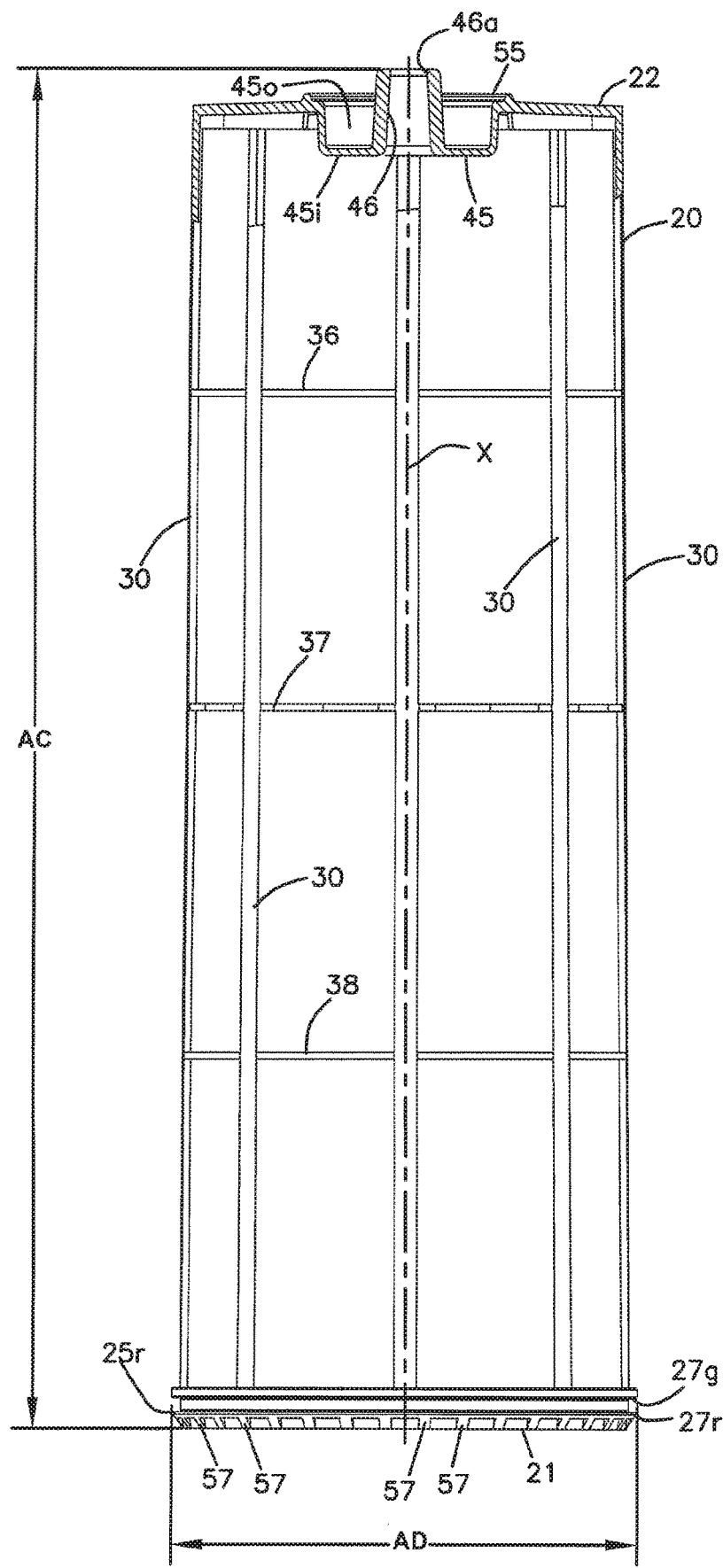
FIG. 7 is a schematic cross-sectional view of the frame piece of FIG. 5, taken generally along line 7-7, of FIG. 6.

Attention is now directed to FIG. 7, a side elevational view of support 20, with attention particularly directed at end 21. Around end 21, spaced gussets 57 are shown slanted outwardly to rim 27r of groove 27g. The gussets 57 facilitate positioning an o-ring in groove 27g. In particular, the o-ring can be pressed against the gussets 57, and then, with pressure toward end 22, the o-ring will spread and eventually snap over rim 25r and into groove 27g.

In FIG. 1, an example dimension is indicated as follows: AA=392.6 mm. Of course, alternate dimensions can be used.

Figure 2:
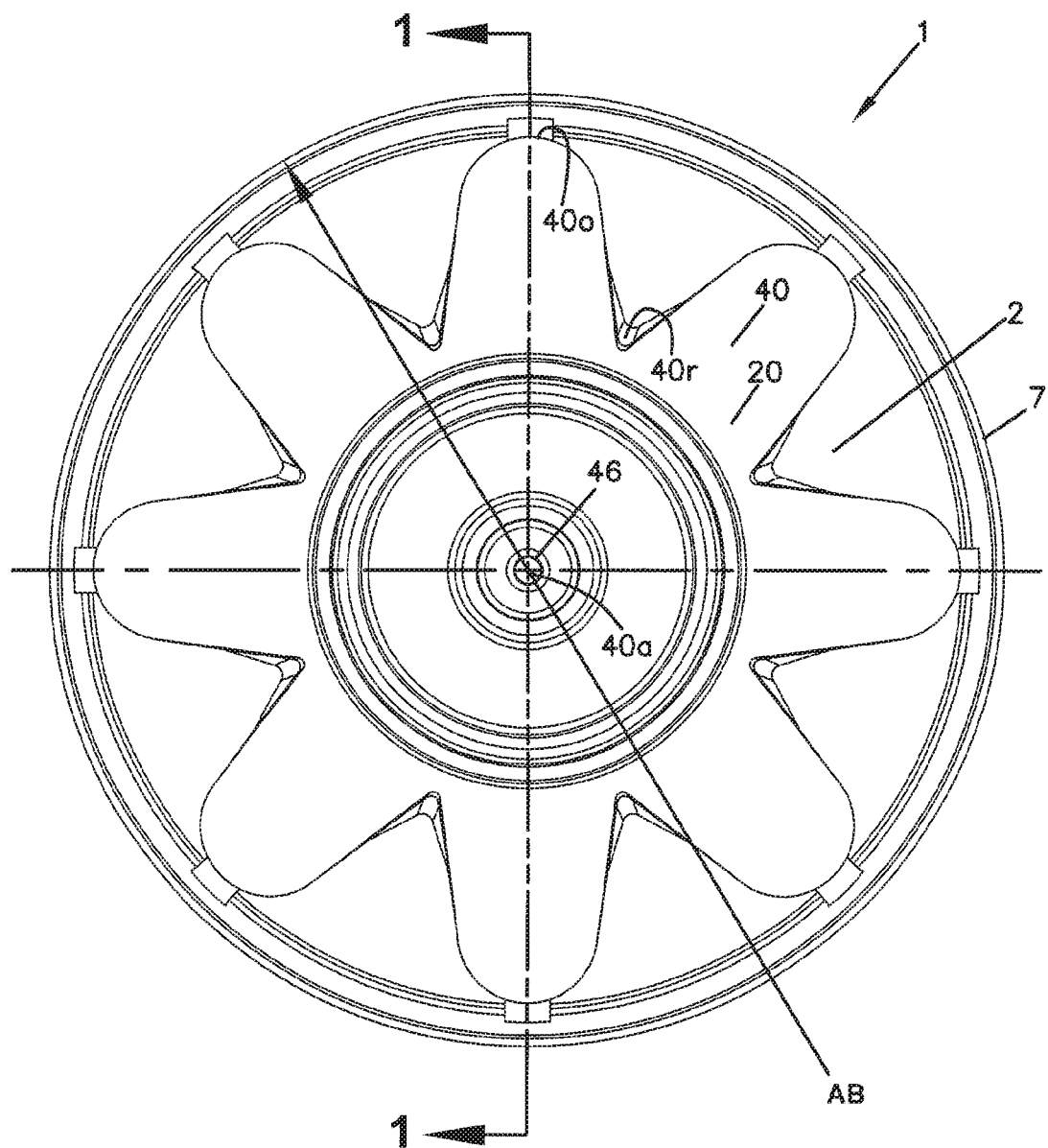
FIG. 2 is a schematic enlarged end view of the filter cartridge of FIG. 1; the view being taken toward a top end in the view/orientation of FIG. 1.

In FIG. 2, an end view of cartridge 1 is, shown, taken, generally, toward end piece 40. An example dimension is provided as follows: AB=135.3 mm diameter.

Figure 3:
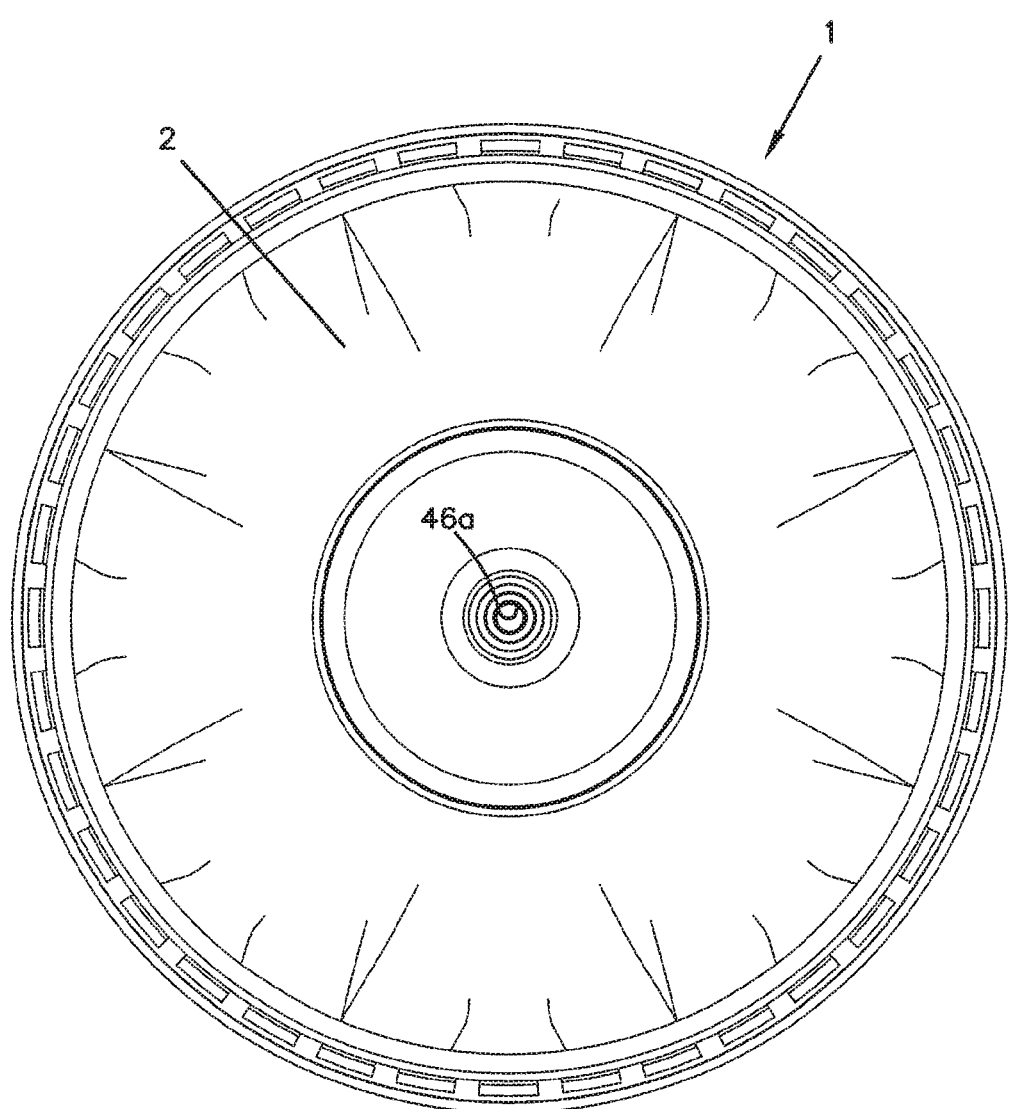
FIG. 3 is a schematic, enlarged, second end view of the filter cartridge of FIG. 1; the view of FIG. 3 being taken toward the bottom end of the view/orientation of FIG. 1.

In FIG. 3, an end view taken toward end 3 is depicted. In the schematic depiction, recess 46 can be viewed.

Figure 4:
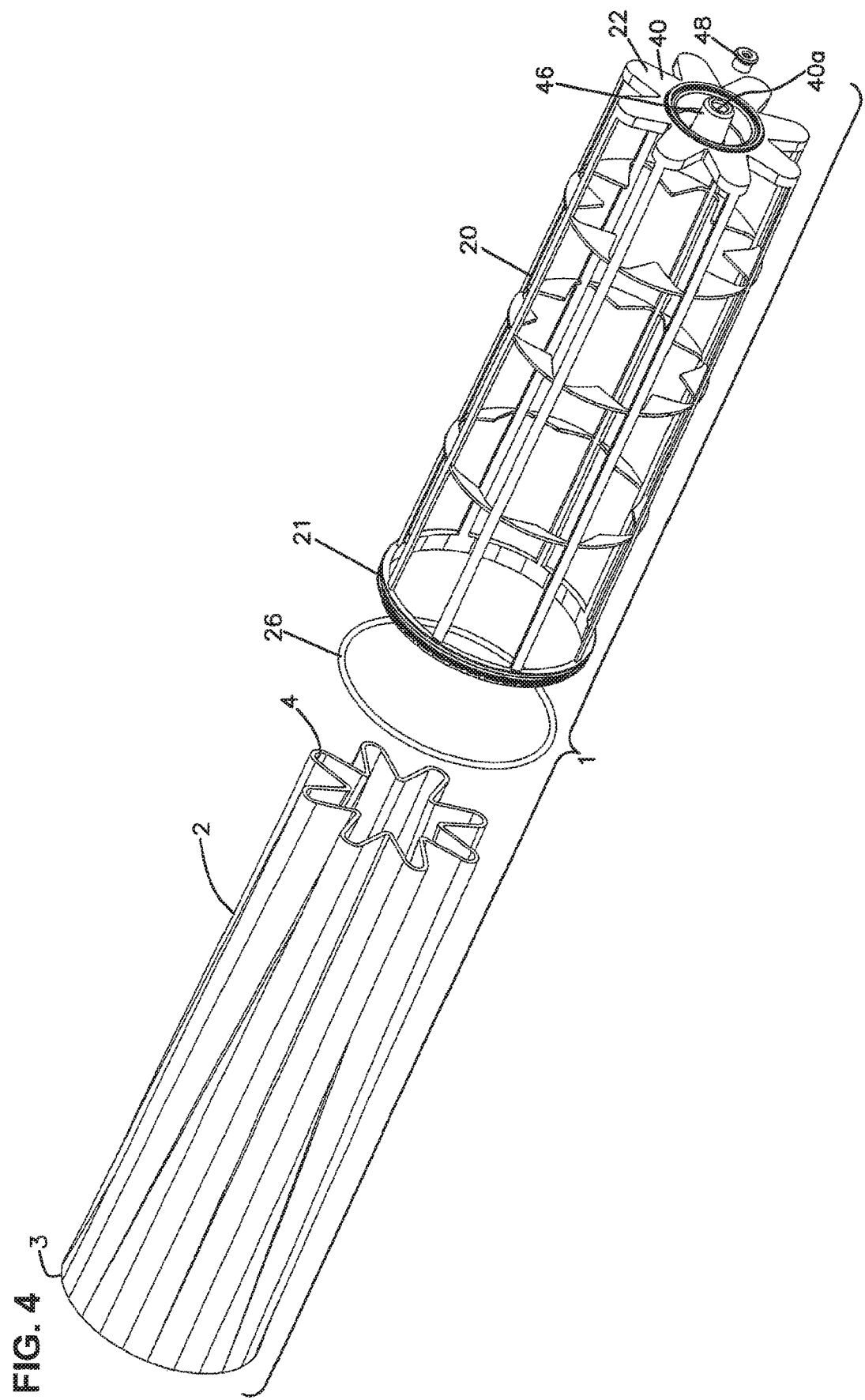
FIG. 4 is a schematic exploded view of the filter cartridge of FIG. 1.

In FIG. 4, an exploded view of the cartridge 1 is depicted. The various components as previously described and viewable include: media 2, support 20, grommet 48 and o-ring 26.

In FIG. 7, a cross sectional view of frame member 20 is shown. Example dimensions are indicated as follows: AC=389.2 mm; and, AD=133.1 mm.

From review of FIGS. 1 and 1A, again, it can be understood that in the example arrangement depicted, the media at end 3 projects axially beyond end 21 of support 20. The amount of this extension, when present, will typically be no more than 10 mm typically no more than 5 mm and often at least 0.5 mm, sometimes at least 1 mm. The portion of media end 3 that extends beyond any structural support of support 20, i.e., beyond end 21 of support 20, will sometimes be referred to as a "seal end" or "end tail" and by the designator 3t, FIG. 1A. This seal end or tail 3t can provide a number of advantages. First, being flexible, it can push down into and against structure of the housing adjacent (both axially and radially) end 3 of the media. It, thus, can help provide secondary support to sealing, in addition to the primary cartridge seal 26. Further, this seal end or tail 3t can provide a wiping effect as the cartridge 1 is installed/removed.

Figure 1C:
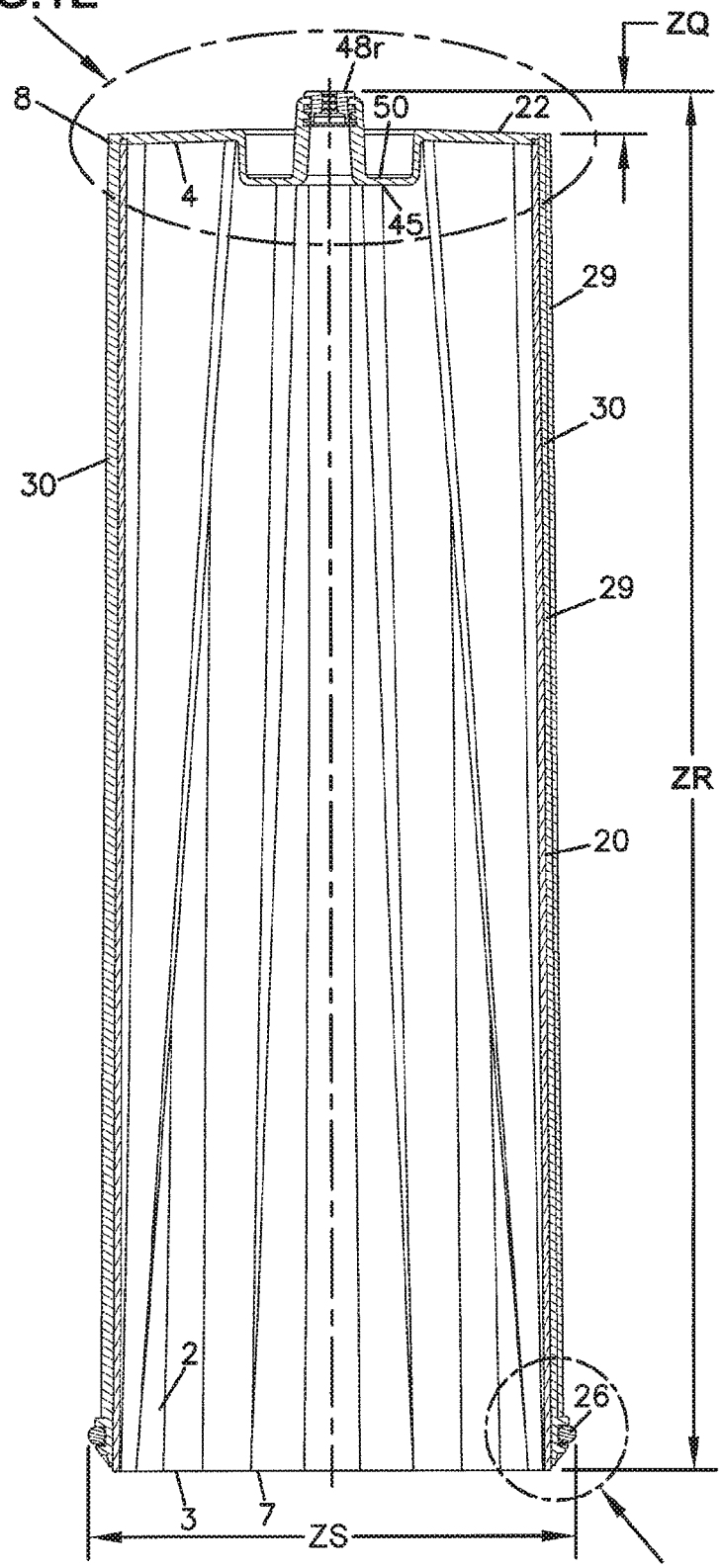
FIG. 1C is a schematic cross-sectional view analogous to FIG. 1, showing some optional variations in the filter cartridge of FIG. 1D.
Figure 1D:
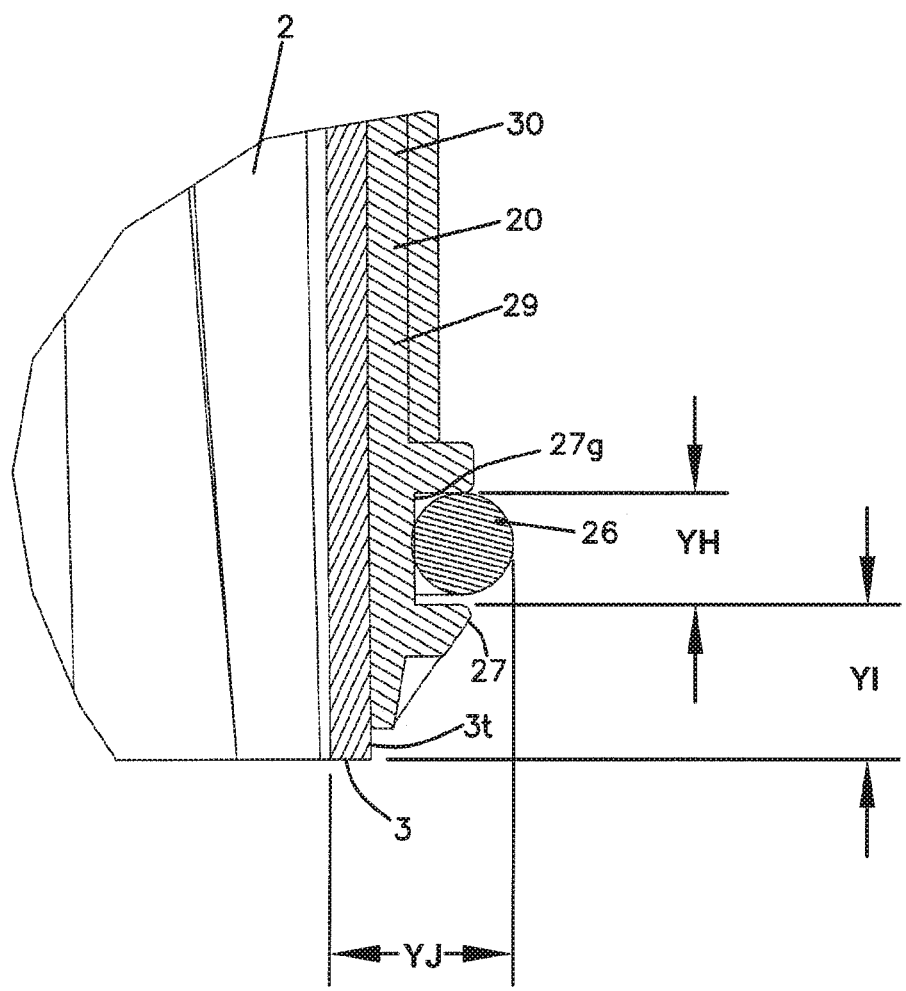
FIG. 1D is an enlarged fragmentary schematic view of an identified portion of FIG. 1C.
Figure 1E:
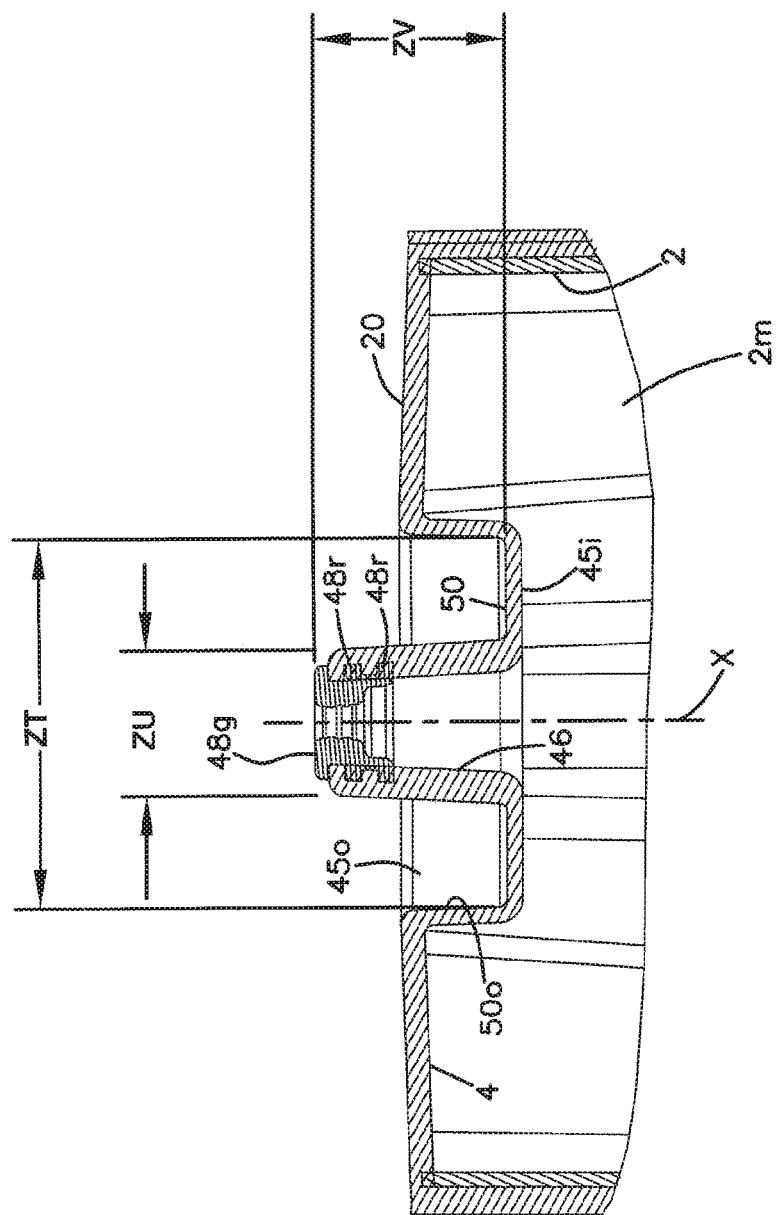
FIG. 1E is an enlarged fragmentary schematic view of an identified portion of FIG. 1C.

Possible variation in the cartridge 1 can be understood by consideration of FIGS. 1C, 1D, 1E and 2A. In FIG. 1E, the cartridge analogous to cartridge 1 is depicted, except having no optional projection 55 (FIG. 1B) thereon; and, having a variation in a grommet 48v, from grommet 48. In FIG. 1C, like reference numerals are used to FIG. 1, generally, except for designation of the grommet, which in FIG. 1C is indicated at 48v. In FIG. 1C, example dimensions are indicated as follows: ZQ=12.2 mm; ZS=138.7 mm; ZR=392.6 mm.

In FIG. 1D, an enlarged fragmentary view of an identified portion of FIG. 1C is provided. This is the region adjacent seal 26, discussed above in connection with FIG. 1A. In FIG. 1D, example dimensions are indicated as follows: YH=5.5 mm; YI=7.5 mm; YJ=9.1 mm. In FIG. 1E, an enlarged fragmentary view of an identified portion of FIG. 1C is provided. From inspection of FIG. 1E, it can be again seen that the cartridge 1 depicted does not have the optional projection 55r, FIG. 1B. It can also be seen that the alternative gusset 48v includes outer rings 48r, embedded in structure from which support 20 is formed, as a result of manufacture in accord with an approach discussed below. The optional rings 48r are not shown in the gusset 48, FIG. 1, but can be used with that embodiment. In other manners, the features of FIG. 1E are generally analogous to those discussed and described in connection with FIG. 1B. In FIG. 1E, example dimensions are indicated as follows: ZV=24.6 mm; ZT=47 mm; and, ZU=18.4 mm.

Figure 2A:
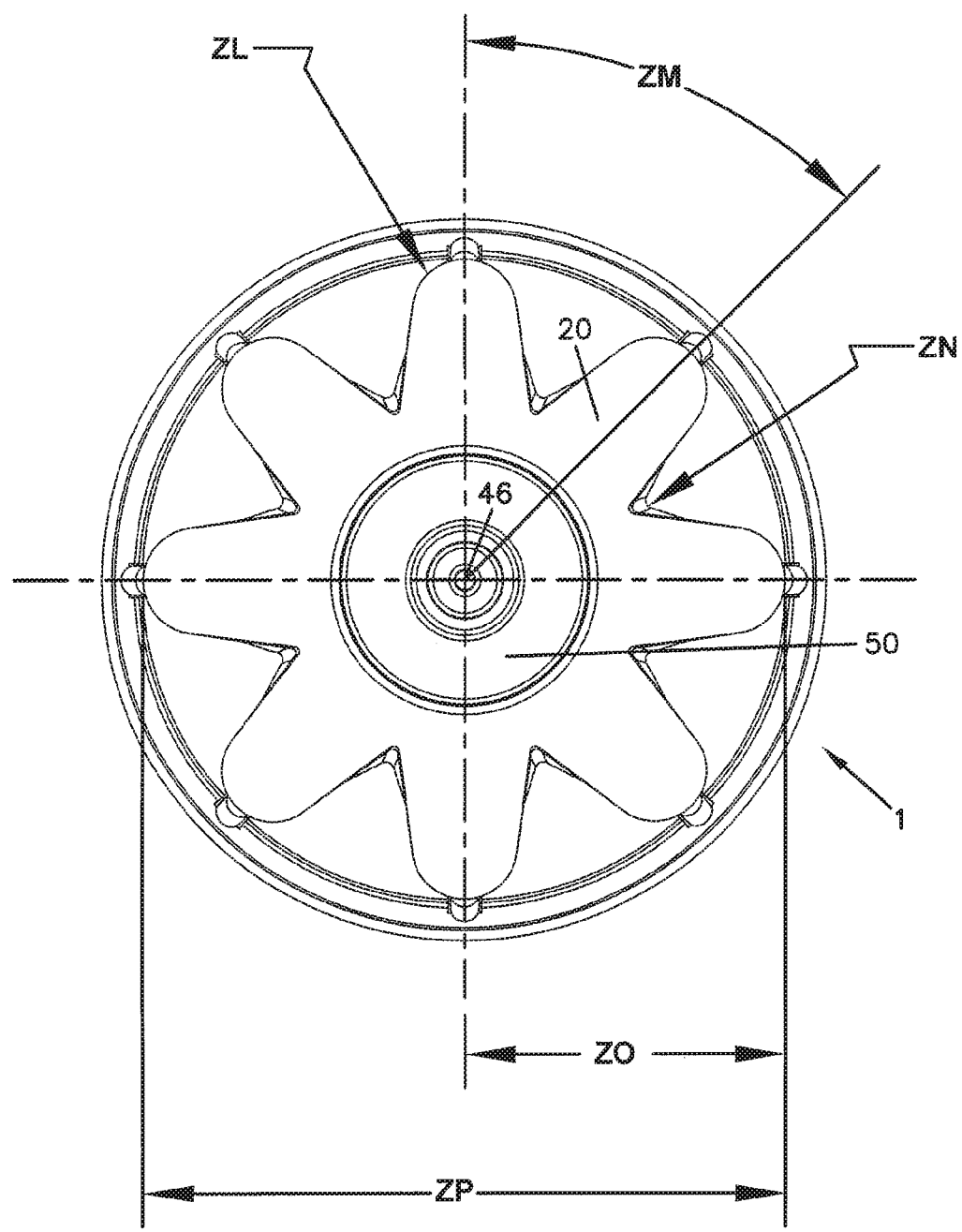
FIG. 2A is a view analogous to FIG. 2, but of the cartridge as depicted in FIG. 1C.

In FIG. 2A, an end view analogous to FIG. 2, but of the cartridge of FIG. 1C without the optional projection 55r is depicted. Other features are generally analogous to those discussed above in connection with FIG. 1, and shown in FIGS. 1C and 1D. In FIG. 2A, example dimensions provided are indicated as follows: ZL=10 mm radius; ZM=45°; ZN=1 mm radius; ZO=61.5 mm; and, ZP=123 mm.

II. Example Manufacture of the Filter Cartridge of FIGS. 1-10

A variety of techniques can be used to construct a cartridge having features in accord with the present disclosure. The preferred cartridge 1 configured as depicted in connection with FIGS. 1-10, and using a cartridge support 20 as described to support media as configured in FIGS. 8-10, will typically be made by preforming media into the shape shown described in connection with FIG. 8 and then (injection) molding the support 20 in place, onto the media. This can be done with the mold configuration that supports the media 2 in the desired configuration, while directing the polymeric material appropriately.

Typically and preferably, with techniques described herein, and in which the support 20 is molded-in-place, preferably the injected material for forming the molded-in-place support 20 is provided exteriorly of the media 2. That is, preferably at locations extending along the length of the media 2, except immediately adjacent end 4, the resin material is not injected in the interior 2i of the media 2, but only along the exterior 2o. The resin will penetrate into the media somewhat, but preferably along most of the lengths of the pleats 11 it does not extend radially completely through the media 2 enough to project radially inwardly from the media 2 except, in some instances, in the region immediately adjacent end 4, and then, as limited as reasonable while obtaining good adherence/seal.

Typically and preferably, a single shot mold approach is used, to accomplish construction of the entire support 20 in one injection step in the molding. The support configuration depicted in FIG. 5, with support features as described, is configured to allow for this.

As discussed herein above, the support 20 can be provided with a grommet 48 (or 48v) positioned at an end thereof. Typically, when the support 20 is molded-in-place, for example using an injection molding operation as described, the grommet 48 (or 48v) is prepositioned in the mold, so that as the molding occurs, the grommet 48 (48v) becomes secured in place.

The material used for the support 20 will typically be a material having sufficient strength to provide the desired support to the media 2, in use. An example would be a thermoplastic, such as a polypropylene or polyethylene. Alternatives are possible.

For the grommet 48 (or 48v), typically, a thermoplastic elastomer (tpe) will be used. A typical grommet will comprise a resilient material capable of forming a seal and may, for example, be formed from a resin to have a hardness of at least 30 Shore A, typically at least 40 Shore A, for example 50-80 Shore A. Alternatives, of course, are possible.

The material chosen for the media is a matter of choice, for the flow characteristics and filtering characteristics and filtering characteristics desired. Filter media of a type typically used in safety cartridges can be used.

The media will include a longitudinal seam therein. The seam can be formed with sonic welding, heat welding, or adhesive, or it can be configured to be sealed by the resin forming the frame structure, if desired.

III. An Example Filter Assembly Using Cartridge 1 as a Safety Filter

A. An Example Filter Assembly and General Features, FIGS. 11-13B

In FIGS. 11-13B, a filter assembly (for example an air cleaner) having advantageous features and using a secondary or safety cartridge in accord with cartridge 1, discussed above, is depicted. Many of the features are variations of those described in one or both of WO 2009/014986 and WO 2012/116314, referenced above and incorporated herein by reference. Advantageous variations, however, are provided as discussed.

Figure 13:
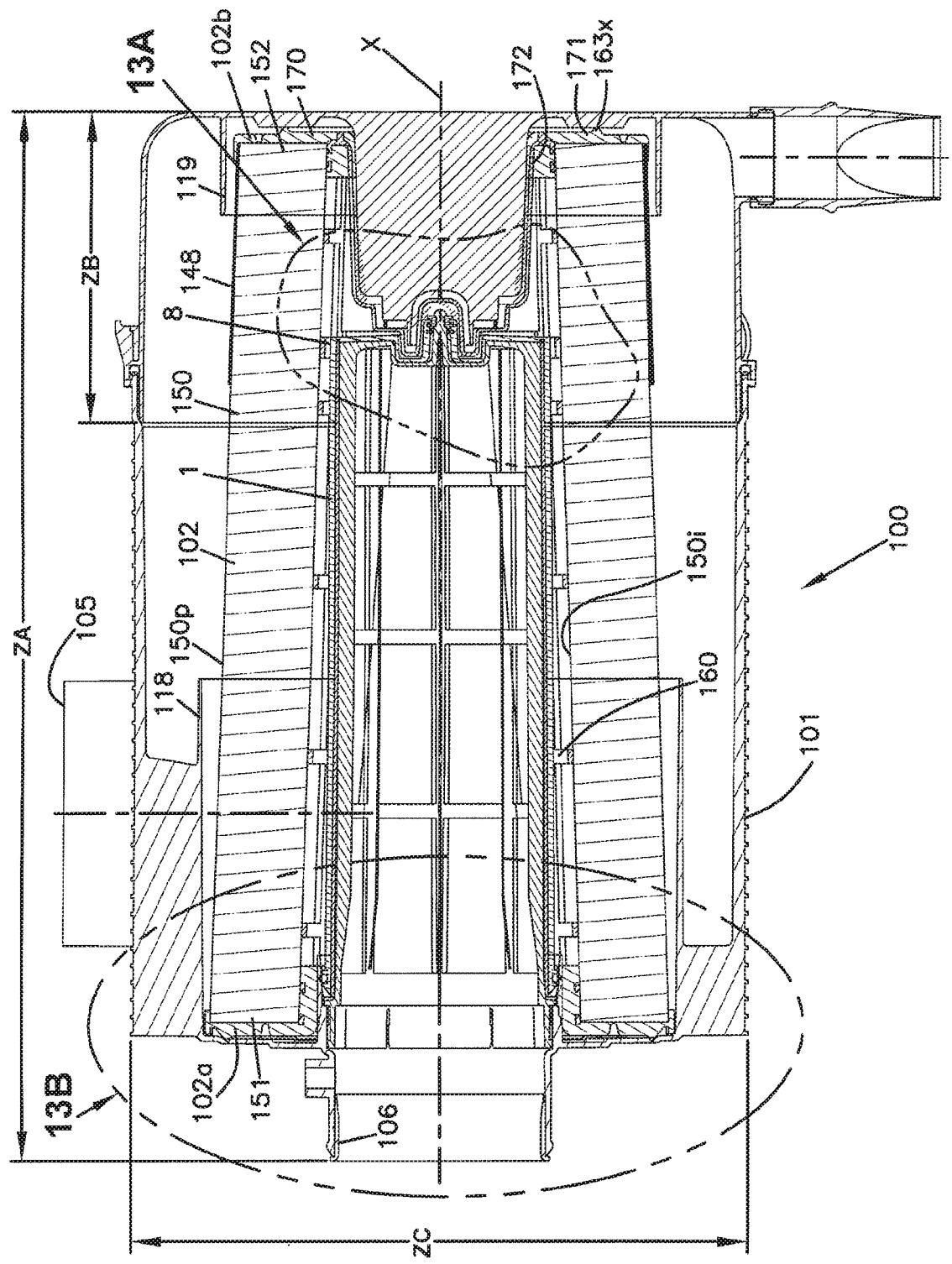
FIG. 13 is a schematic cross-sectional view of an air cleaner assembly according to the present disclosure having a main filter cartridge therein and a safety filter cartridge in accord with FIGS. 1-10 installed therein.

Attention is first directed to FIG. 13. In FIG. 13, a gas filter assembly 100 configured as an air cleaner assembly, is depicted in cross-sectional view. The filter assembly 100 comprises a housing 101 having, operably positioned therein, a main or primary filter cartridge 102 and a secondary or safety cartridge 1 in accord with the present disclosure.

In general, air to be filtered flows into housing 101 through gas (air) flow inlet arrangement 105. The air is directed through primary or main cartridge 102, with "out-to-in" flow and then through a secondary filter 1, with a "out-to-in" flow. The filtered gas (air) exits housing 100 through outlet flow arrangement 106.

Attention is now directed to FIG. 11, in which the housing 101 is depicted without the primary filter cartridge 102 and secondary or safety cartridge 1 installed. Referring to FIG. 11, the housing 101 comprises a housing body or base section 109 and an access cover 110. The housing body or base section 109, in the example depicted, defines an open end 109a and an opposite end 109b. The open end 109a is an access end, over which the access cover 110 is removably positioned. The access cover 110 is shown removably secured in place by latch arrangement 111.

In the example assembly depicted, the inlet 105 and outlet 106 are positioned on the body section 109, although alternatives are possible. Positioned on the access cover 110, is an optional evacuator outlet 114, closed by an evacuator valve arrangement 115. Some dust and water can be ejected from housing 101 through evacuator outlet 114 and valve 115, in use. Such evacuator arrangements are sometimes referred to as "precleaners" and are used in a wide variety of air cleaner systems. When an air cleaner assembly uses such an optional precleaner, it is sometimes referred to as a "two-stage" air cleaner, the first stage being the precleaner and the second stage being represented by the filter cartridge arrangement.

Still referring to FIG. 11, as gas flow (i.e. air flow) enters through inlet or inlet tube arrangement 105, it is directed into optional cyclonic ramp arrangement 117, by which it is directed into a helical or cyclonic flow around central axis X. This helps direct some of the water and/or particulate material contained within the air flow, into evacuator arrangement 114, before that material impinges on the primary filter cartridge 102, FIG. 13. To facilitate such a cyclonic movement of the air, preferably inlet arrangement 105 is configured with an air flow inlet direction represented by an axis A that is tangentially directed relative to sidewall 109s.

To facilitate precleaning, the housing 101 includes a shield section 118 projecting toward access cover 110 from end 109b, and an optional second shield section 119 projecting toward and 109b and outlet 106, from access cover 110. These optional (but preferable) shield sections 118, 119 will be positioned around opposite ends (respectively) of the main filter cartridge 102, FIG. 13, to help isolate flow of water and a portion of particulate material from inlet 105 to ejector or evacuator outlet 114, to advantage.

Still referring to FIG. 11, access cover 110 includes an end wall or end 110e, having an optional central projection 120 thereon, that projects, generally, toward end 109b and outlet 106. In the example depicted, the projection 120 is positioned with central axis X extending therethrough, which will be typical.

The central projection 120 can have a variety of specific configurations and shapes. It can be configured as a ring, be solid or hollow, or it can have a cross-sectional definition defined by fins or other structures.

With respect to selected features of projection 120, attention is directed to FIG. 11A. Attention is particularly directed to end 120e, of access cover or central projection 120; end 120e being an end remote from end wall 110e. Optional but preferable features at end 120e of interest include the following. First, the access cover 110 includes thereon, a projection 123 which, in the example depicted, comprises a ring projecting in the general direction of axis X away from end 110e and toward end 109b. The projection 123 is sized and configured to engage width cartridge features as discussed below.

The ring 123 surrounds an optional central recess or receiver 124 in projection 120. The recess 124 is preferably configured to receive, projecting therein, selected portions of the housing 101 and cartridge arrangements as discussed below. Typically, the recess 124 projects at least 10 mm usually at least 15 mm and often an amount within the range of 20-40 mm, inclusive, toward end 110e from tip 123t of projection 123.

Still referring to FIG. 11A, it is noted that ring 123 is typically at least 5 mm long in extension from a surrounding portion 125, of projection 120 to tip 123, usually at least 10 mm long and often has a length within the range of 10-25 mm.

Referring back to FIG. 11, the housing 101 includes a central cartridge support 130 therein. The central cartridge support 130 is positioned in extension from adjacent wall 109b toward access cover 110. The central cartridge support 130 generally includes a base end 131, a porous sidewall 132 and a cartridge support end 133. The base end 131 is positioned adjacent end 109b, and includes a gas flow aperture 131a therethrough providing gas flow communication with outlet 106. The cartridge support end 133 is remote from wall 109b, and is directed toward access cover 110.

The central cartridge support 130 can be formed integral with a remainder of housing section 109. For the example depicted, however, the central cartridge support 130 comprises a separately formed piece which is snap-fit in place by a snap fit arrangement 131x, FIG. 11B, in engagement with a surrounding portion 135 of housing section 109. The surrounding portion 135 includes a flange 135f, which surrounds a portion of central cartridge support 130.

It is noted that in some instances, the central cartridge support 130 can be constructed to be removable from the housing section 109 once installed. However, typically and preferably the cartridge support 130 is non-removable from housing section 109, either by having been formed integrally therewith (for example by being molded integral with other portions of the section 109) or by having been installed with a snap-fit connection not readily disconnected once established. Preferably the support 130 does not include any media, independent of a serviceable cartridge 1, 102.

Typically, the central cartridge support 130 is independent and separable from any filter cartridge positioned within the assembly 100 during use. That is, typically the central cartridge support 130 comprises a portion of the housing 101, and remains with the housing 101 during servicing of the cartridges 1, 102.

Referring to FIG. 11B, it is noted that flange 135f projects toward access cover 110, to tip 135t. The flange 135f defines a sealing flange for the system 100 depicted. In particular, the outer surface 135o of flange 135 will form a seal surface for the main filter cartridge 102; and, an inner surface 135i of flange 135 will form a seal surface 4 for the safety cartridge 1. Although alternatives are possible, this is particularly convenient for installation of the cartridges 102, 1.

The support 130 is provided with an open interior 130i surrounding axis X and positioned in air flow communication with outlet 106. Thus, after gases have been filtered by the main filter 102 and safety 1, they will pass into interior 130i and outwardly from housing 109 through outlet tube 106. It is preferred that the outlet 106 (and end 131a in support 130) have as large a cross-sectional area as reasonably possible, so as to avoid undesirable additional restriction to air flow through housing 101. Selected features of the present disclosure facilitate this, as discussed below.

At outlet 106 optional pressure tap 106t, FIG. 11B, is provided, facilitating connection of a restriction indicator or pressure monitor in a typical conventional manner.

In FIG. 11A, support end 133 of central cartridge support 130 can be seen in detail. The support end 133 is the end of support 130 remote from base 131 and sidewall 109b, and comprises an optional outer ring or shoulder 138 and a central projection 139. In the example depicted, the central projection 139 is positioned on central axis X. While this is typical, alternatives are possible.

Positioned between shoulder 138 and central projection 139 at a location surrounding the central projection 139, the cartridge support end 133 of central cartridge support 130 includes a receiving groove, recess or receiver space 140. Receiver space 140 is, typically, at least 5 mm deep, typically at least 8 mm deep, for example 8-25 mm deep, inclusive, in extension along the direction of axis X toward outlet 106 from a surrounding portion of the end 133, typically shoulder 138. The recess 140 is typically at least 5 mm wide, for example 8-20 mm wide, and not usually more than 25 mm wide, in extension thereacross, between sidewall 140w and projection 139. Typically, the outer wall 140w of recess 140 is positioned spaced radially at least 10 mm radially inwardly from an outer portion of perimeter of support 130.

Still referring to FIG. 11A, it is noted that projection 120, and in particular projection end 123 is typically, and optionally, sufficiently long to at least start to extend into recess 140, when access cover 110 is positioned on housing base 109.

Still referring to FIG. 11A, attention is now directed to central projection 139.

The central projection 139 includes, as it extends toward access cover 110, a shaft or base 144 extending to a remote end or tip 145. Between base 144 and tip 145, the projection 139 includes an optional but preferable neck section 146. The optional neck section 146 is a narrowed section in projection 139. Thus the projection 139, typically and preferably has a tip 145 of large cross-sectional dimension (typically diameter) than another portion, i.e. the neck section 146, that is positioned between the tip 145 and a base 144. This optional configuration can provide for advantage, as discussed further below.

Referring to FIG. 11B, attention is directed to recess 150r between central cartridge support 130 and flange 135f. The recess 150r is a recess into which an end of a safety filter cartridge 1, discussed below, extends during installation. It is, in particular, a recess into which an end 7 comprising media end 3, FIG. 1, projects. It is noted that the recess 150r is relatively narrow in radial dimension, typically its widest dimension being no greater than 30 mm, preferably not greater than 25 mm, usually not greater than 20 mm, sometimes 15 mm or less. A reason for this is that it is preferable that radial dimension in the region of section 131 of central cartridge support 130, of the cartridge 1 take up as little radial dimension as reasonable so as to facilitate flow through filter assembly 100 with without undue addition to restriction. This is discussed below.

The recess 150r will sometimes be referred to herein as a safety cartridge end receiving recess 150r, or by similar terms. In a typical embodiment, it will be formed between the flange 135*f* and a region of central cartridge support 130 adjacent end section 131.

Figure 12:
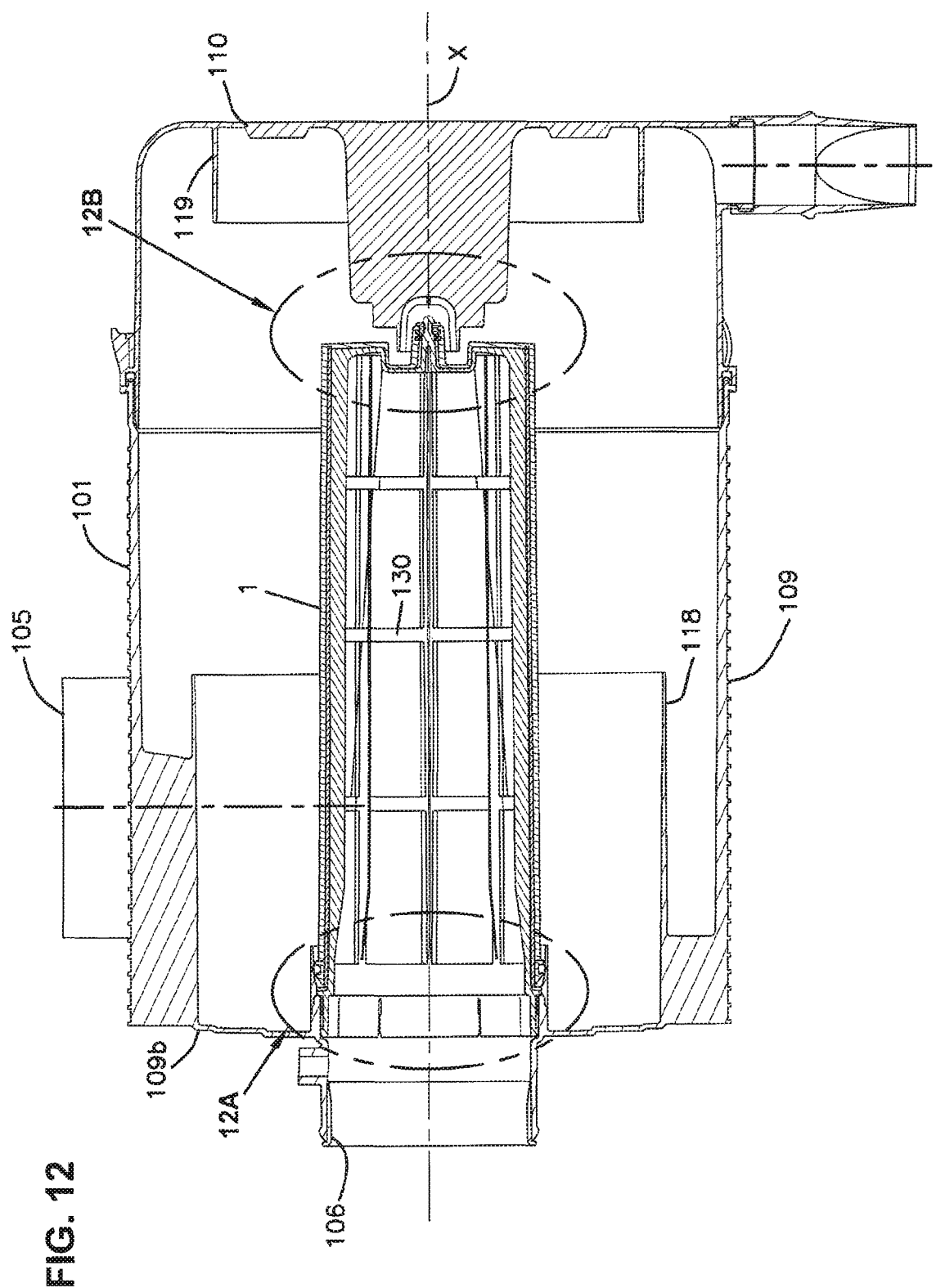
FIG. 12 is a schematic cross-sectional view of a housing of a filter assembly according to the present disclosure, having a safety cartridge in general accord with FIGS. 1-10 installed therein.

Attention is now directed to FIG. 12, in which the housing 101 is depicted with the safety cartridge 1 fully installed, but without the primary filter cartridge 102 positioned. It can be seen that the safety cartridge 1 is installed by being pushed over the central cartridge support 130. Selected portions of the interaction among the cartridge 1, central cartridge support 130 and housing 101 are discussed in connection with FIGS. 12A and 12B, each of which is an enlarged fragmentary view of a portion of FIG. 12.

Figure 12B:
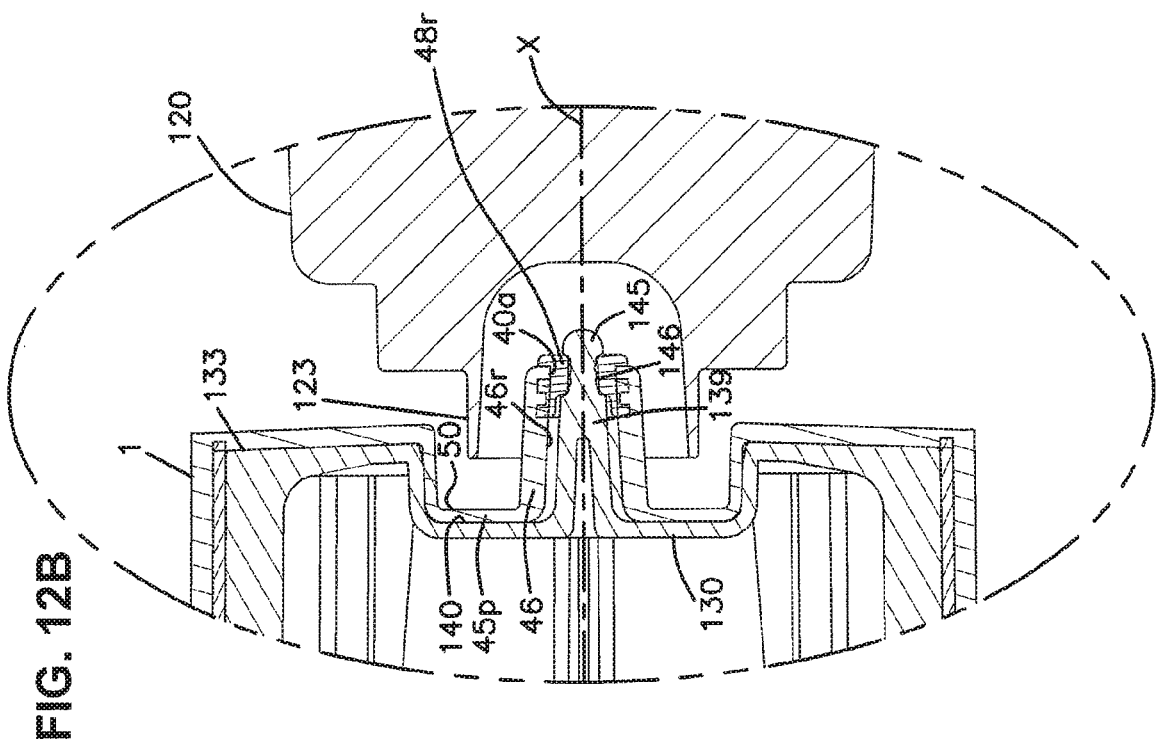
FIG. 12B is an enlarged fragmentary schematic view of a selected portion of FIG. 12.
Figure 12A:
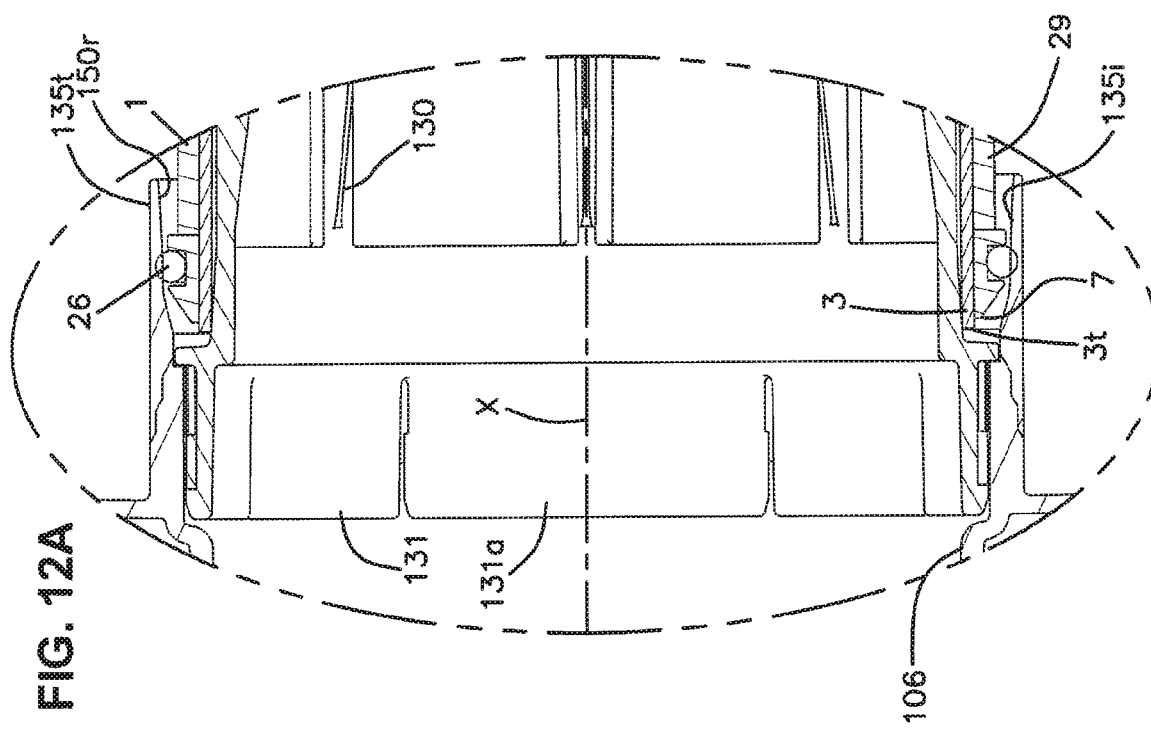
FIG. 12A is an enlarged fragmentary schematic view of a selected portion of FIG. 12.

Referring first to FIG. 12A, an interaction between end 7 (and media end 3) of safety cartridge 1 and recess 150*r* can be seen. First, it can be seen that as a result of not being pleated (i.e., being of very limited or no pleat depth) near end 3, the cartridge 1 will fit in the relatively narrow recess 130, with seal 26 engaging inner wall 135*i* of flange 135*f*, to form a radially (in the example outwardly) directed, housing seal that is releasable. Further, it can be seen that free end or tip 3*t* of the media 2, i.e. a portion of media 2 not embedded in an end cap and not surrounded by media support 29 can be pushed to, or near to, an end of recess 150*r*, and will tend to pick up and pull (wipe) out of the recess 150*r* particulate material that may migrate into this region during use and/or servicing.

It can also be seen by referring to FIG. 12A, that due to the very narrow construction of the cartridge 1 in radial dimension at seal 26, a narrow recess 150*r* can be used to advantage, to avoid undesirable addition to restriction from the size of outlet 106, and outlet end 131*a* of central cartridge support 130, while (at the same time) allowing maximal radial width within housing 109 for the main filter cartridge 102, as discussed below.

Indeed, typically the maximum radial width of recess 150*r* for insertion of end 7 of cartridge 1 therein, is at least 5 mm smaller, usually at least 10 mm smaller, and sometimes at least 15 mm smaller than a maximum pleat depth of the media 2, of cartridge 1, adjacent end 4, FIG. 1.

Attention is now directed to FIG. 12B, an enlarged fragmentary view depicting an interaction between the cartridge 1 and the central cartridge support 130 at support end 133. In particular, cartridge 1 can be seen positioned with central recess 46*r* receiving, projecting therein, central projection 139 on central cartridge support 130. For the particular example depicted, the central projection 139 projects completely through recess 46*r* (and aperture 40*a*) and optional grommet 48*v*, with tip 145 projecting through aperture 40*a*. The optional grommet 48*v* is shown engaging the central projection 139 therearound, in the particular example by engagement at least with neck region or section 146. In the example depicted, the optional grommet 48 is shown secured within end projection 46 by having been positioned in a mold and having section 46 molded thereto, with physical connection provided by grommet rings 48*r*, FIG. 1E.

Also, referring to FIG. 12B, it can be seen that projection 45*p* on end piece 20 projects into receiver 140 on the central cartridge support 130. Further, it can be seen that projection 123 on the access cover 110 projects into recess 50 on secondary or safety cartridge 1.

In the example depicted in FIGS. 12A and 12B, it is noted that the cartridge 1 does not include the optional projection 55*r*, FIG. 1B, thereon. Of course, such a projection can be used to advantage, if desired. Advantages for such an optional projection 55 are discussed below.

Figure 12C:
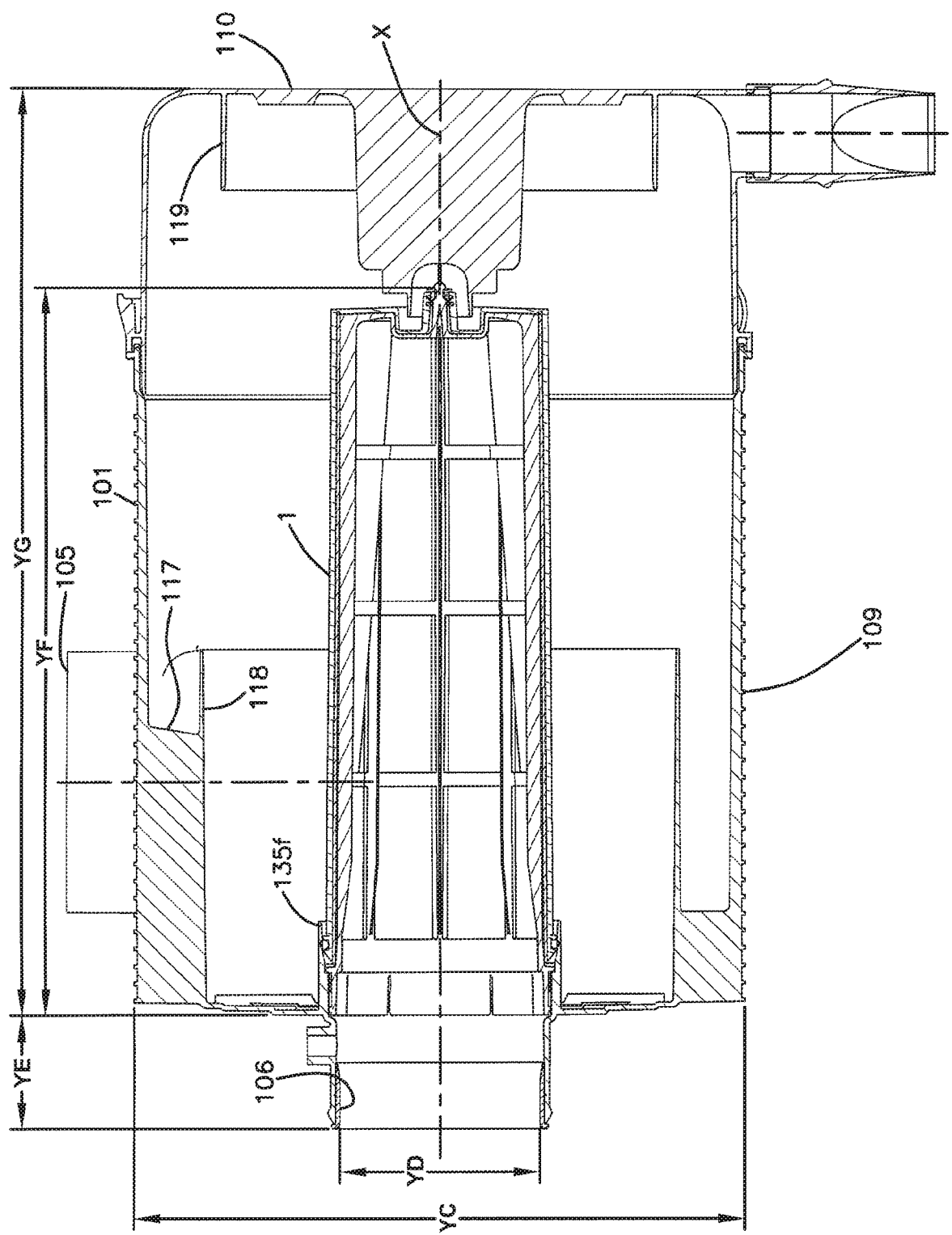
FIG. 12C is a schematic view generally analogous to FIG. 12, with selected dimensions indicated.

In FIG. 12C, a view generally analogous to FIG. 12 is depicted. In FIG. 12, some examples dimensions are indicated as follows: YC=354.6 mm; YD=115.8 mm; YE=65.6 mm; YG=539.7 mm; YF=423.3 mm.

Figure 13A:
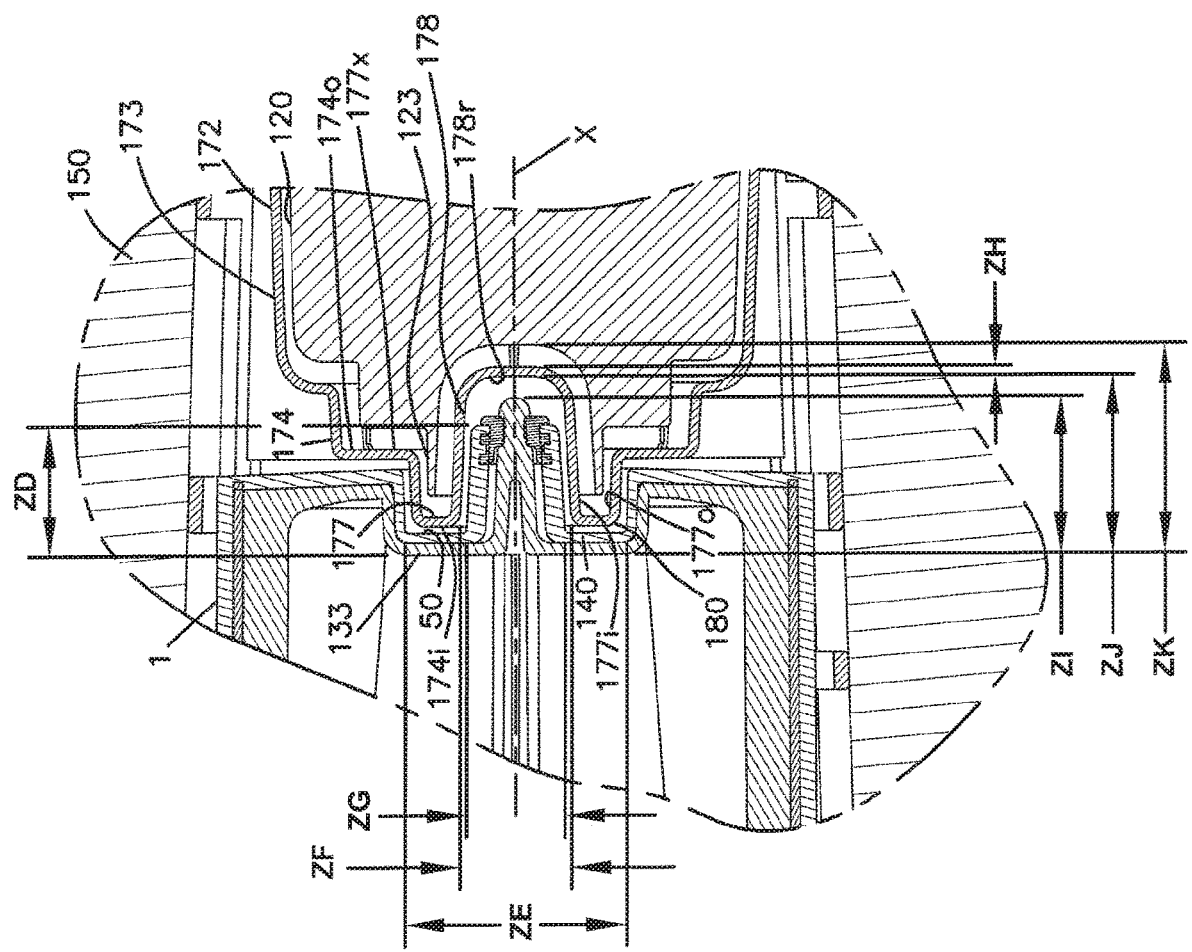
FIG. 13A is an enlarged schematic fragmentary view of an identified portion of FIG. 13
Figure 13B:
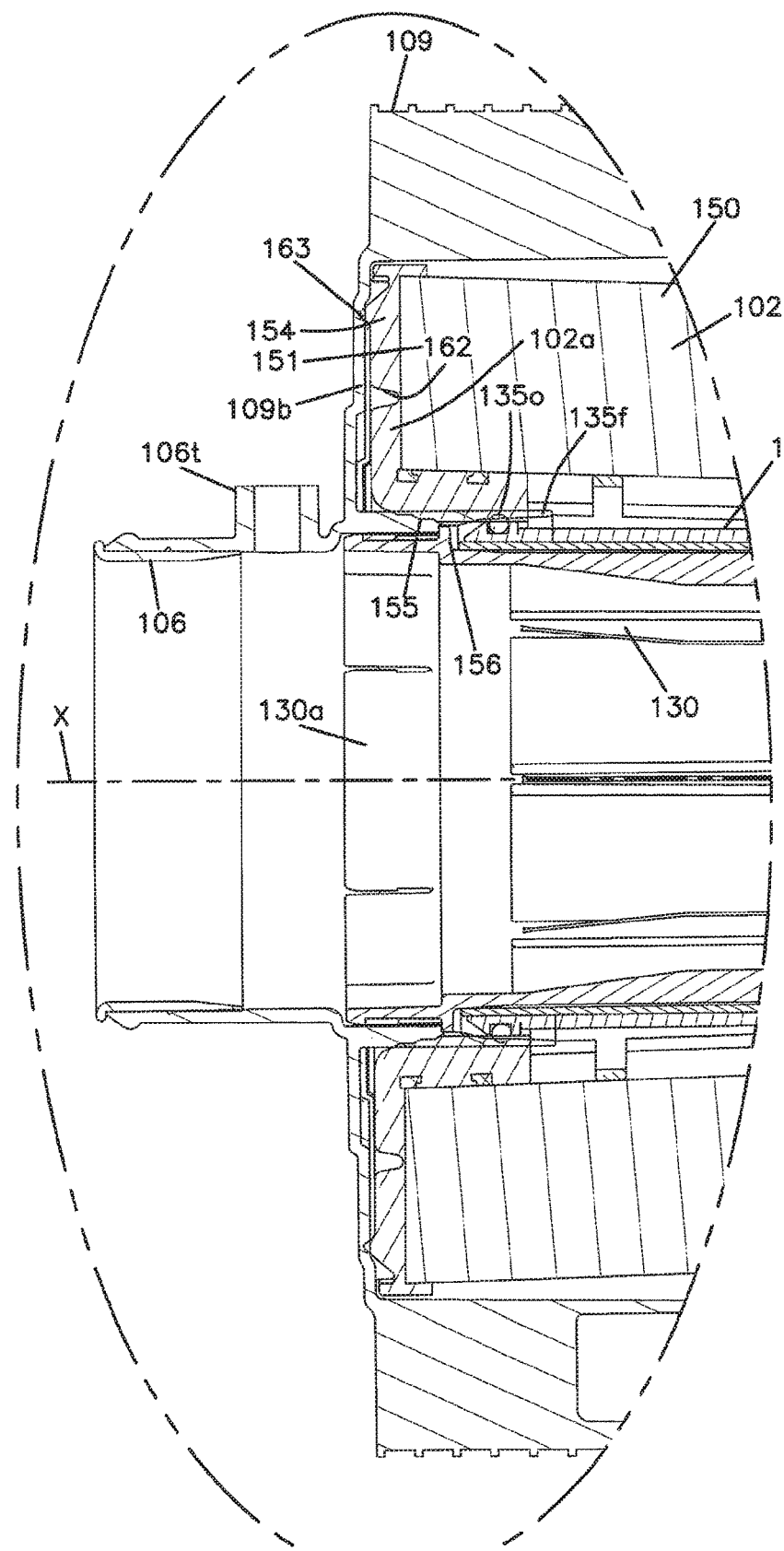
FIG. 13B is an enlarged fragmentary schematic view of a second identified portion of FIG. 13.

Attention is now directed to FIGS. 13, 13A and 13B. Here, filter assembly 100 is depicted with both the primary filter cartridge 102 and secondary filter cartridge 1 in place. Referring first to FIG. 13, the primary filter cartridge 102 can be seen as having opposite ends 102*a*, 102*b*, with media 150 extending between opposite first and second media ends, 151, 152, corresponding to cartridge ends 102*a*, 102*b* respectively. The media 150 will typically be pleated, although alternatives are possible. In the example depicted, the media 150 has a generally conical or frusto-conical outer perimeter 150*p* defined by outer pleat tips with outer perimeter 150*p* decreasing in cross-sectional size in extension from end 151 to end 152. Typically, the extension is at a conical angle, i.e. an inward taper, of at least 0.5°, typically not more than 5°, and often within the range of 1°-5°.

Referring to FIG. 13B, the cartridge 102, includes, positioned on the media 150 at end 151, and end cap or end piece 154. The particular end piece 154 depicted, is molded-in-place, although alternatives are possible. Typically, the end piece 154 when configured as shown, would be molded from a material such as foamed polyurethane, that can also operate as a seal material as discussed below. Typically, the material will be molded to an as "molded" density of no greater than 0.32 g/cc, typically no greater than 0.24 g/cc, for example 0.16 g/cc-0.24 g/cc, and, will have a hardness, Shore A, of no greater than 20, typically no greater than 18, and often within the range of 10-18, inclusive.

Referring still to FIG. 13B, end cap 154, which is at main cartridge end 102*a*, is shown with a central aperture 155 therethrough, which will serve as an "flow aperture" for main cartridge 102, in the example a gas flow exit aperture. In the example, the aperture 155 is defined by, and is surrounded by, housing seal region 156, which, in the example depicted, is a portion integral with a remainder of end cap 154. Seal region 156, in the example depicted, is positioned and configured to form an inwardly directed radial seal around central axis X, and releaseably in engagement with outer surface 135*o* of flange 135*f*.

Referring to FIG. 13, it is noted that an end 151 of media 150 is part of an end section of media that will project at least 10% usually at least 20% and typically not more than 50% from media end 151 toward media end 152, while being surrounded by flange 118. This helps provide for desirable operation of the precleaner function in housing 101. The flange 118 is preferably sufficiently large to still allow air flow to a region surrounding end section 151, for good filtering operation. The tapering of media 150 facilitates this.

Still referring to FIG. 13, it is also noted that flange 119 surrounds end section 152 of the media 150 adjacent end 150*b*. Typically, it surrounds the media 150 over a length of extension at least 5%, typically not more than 20% from end 152 toward end 151. Support 119 provides a centering function for the cartridge 102, and can provide some protection for the cartridge 1. Additional protection for the cartridge 102 is provided by end margin or wrap 148, which surrounds the media 150 adjacent end 152.

Still referring to FIG. 13, it is noted that the media 150 includes an inner perimeter 150*i*, typically defined by inner pleat tips, which tapers downwardly in extension from end 151 to end 150*b*. Typically, an angle of extension of inner perimeter 150*i* relative to axis X is the same as the angle discussed above for perimeter 150*p*. It is further noted that, for the example depicted, the cartridge 102 includes a porous inner liner arrangement 160 around which the media 150 is positioned. This is typical, but optional.

Referring to FIG. 13B, attention is directed to recess 162 in end piece 154. The recess 162 can be an artifact, from a mold stand-off for the media 150, during manufacture of end piece 154. It also can be used as a receiver recess for an optional projection member (not shown) within the housing end 109b. Both functions can be provided by the recess 162, or, in some, systems two different recesses can be provided.

Referring still to FIG. 13B, projection arrangement 163 (on end piece 154) is shown engaging end wall 109b of the housing section 109. The projection 163 can, for example, be a continuous ring, segmented ring, or a plurality of bumpers, to provide for cushion engagement with end wall 109b to advantage.

Referring again to FIG. 13, attention is directed toward end 152 of media 150. At end 152, the cartridge 102 includes a second end cap or end piece 170. End piece 170 generally comprises: an outer ring section 171, which is in axial overlap with end 152 of the media 150; and, central section 172, which projects inwardly into an open filter interior 102i of cartridge 102, from end 152 of the media 150 toward end 150a. Typically, end piece or end cap 170 is closed, i.e. it has no central aperture therethrough, although in some applications, alternatives are possible. Typically, section 171 is molded-in-place, for example, from a material similar to, or in some instances harder than, that used for end piece 154; with central section 172 preformed, for example from a rigid plastic and then secured in place during the molding of section 171. Alternatives are possible. The seal section 171 can, optionally, include a projection 163x, analogous to projection 163 but positioned to engage access cover 110.

Attention is directed to FIG. 13A, with respect to selected features of projection 172. Projection 172 generally includes an outer sidewall 173 and an end section 174. The end section 174 is defined by: an inner surface 174i that faces toward the opposite end piece 154 from end piece 170; and, an opposite, outer, surface 174o.

In the outer surface 174o, end 174 forms a receiving groove 177 that surrounds a central projection 178. The receiving groove 177 is typically at least 6 mm deep, usually at least 8 mm deep in deepest extension, from nearest surrounding portions 177x of end 174. The projection 178 generally extends at least 10 mm, typically at least 15 mm and often an amount within the range of 15-35 mm, inclusive, from an immediately surrounding portion of groove 177.

Typically, the projection 178 on the central section 172 comprises a central projection directed away from the first end piece and which terminates at an end remote from the media first end at a location that is spaced from the media second end at least 15% of a distance from the media second end to the media first end.

The groove 177 is typically at least 4 mm wide and usually not more than 25 mm wide, between inner and outer sidewalls 177i, 177o.

Along the inner surface 174i, the projection 178 defines a receiver recess 178r into which the central projection 139 (of the central cartridge support 130) and the central projection 46 of the secondary cartridge 1 project.

Also, along the inner surface 174i, end 174 defines a projecting ring 180 that projects into receiving groove 50 of safety cartridge 1 and receiving groove 140 of central cartridge support 130.

Also referring to FIG. 13A, it is noted that the access cover projection 123 projects into receiving groove 177 of the primary cartridge 102.

In the next sections, some advantages from the various features characterized herein above will be discussed. Before turning to those, it is noted that there are some example dimensions provided in FIGS. 13 and 13A. As with other example dimensions herein, these are meant to be example of dimensions are workable in a system, but alternatives are possible.

The example dimensions are as follows: ZA=605.2 mm; ZB=179.5 mm; ZC=354.6 mm; ZD=27.2 mm; ZE=47 mm; ZF=23.6 mm; ZG=20.8 mm; ZH=2 mm; ZI=33.2 mm; ZJ=37.7 mm; and, ZK=44.42 mm.

B. Advantages Relating from Preferred Features Characterized Herein Above

1. Advantageous Safety Filter Cartridge Characteristics for Use with a Tapering Main Filter Cartridge Referring to FIG. 13, as indicated above, in a typical, preferred, application of features as characterized herein, the main filter cartridge 102 tapers in both outer perimeter 150p and inner perimeter 150i definition, in extension from media end 151 to media end 152. This means that the internal cross-dimension surrounded by media inner perimeter 150i tapers downwardly along the same extension.

This can restrict the space available for safety 1, within interior 102i. As a result, in a typical application, the safety cartridge 1 is configured to project no further than a location of at least 90% of a distance between end 150a and end 150b of surrounding media 150, typically no greater than 85% of this distance and usually an amount within a range of 65-85% of this distance, in the direction of extension from end 150a toward end 1. This allows the tapering of inner perimeter 102i, to extend a definition quite narrow at end 150b. Indeed, the media 150, of the main cartridge 102, may in some instances, only clear end 8 of cartridge 1, by a radial dimension of 8 mm or less.

However, this means the safety cartridge 1 is of somewhat limited length, with respect to safety media 2. To avoid undesirable restriction, the safety cartridge 1 is provided with pleated media adjacent end 4, to increase surface area available, and decrease face velocity. This is an advantageous improvement, with a safety cartridge used with a main cartridge that tapers downwardly, especially if the main cartridge tapers downwardly to a width too narrow to accommodate, conveniently, a substantially longer safety cartridge.

It can also now be understood how the relatively wide outer pleats 11 of the safety cartridge 1 adjacent end 4, can provide for advantageous flow. This is because the outer pleats 11 define spaces therebetween, along which the air can flow after it passes through the main filter cartridge 102 and as it is directed into the safety 1, to be directed to the outlet 106. This too is advantageous for controlling restriction increase from the presence of the safety cartridge 1.

Referring to FIG. 13, to accommodate the relatively short safety cartridge 1, the main cartridge 102 includes a central projection 172 that projects (a maximum amount in extension in a direction from end 152 of the media toward end 151) at least 70 mm, typically at least 80 mm and often an amount within the range of 100-140 mm; and typically an amount of a distance between the ends 152,151 of at least 15%, typically at least 20% and sometimes an amount within the range of 24%-40% of this distance of extension.

2. Advantages from the Configuration of the Media Adjacent Media End 3

Advantages are also provided by the lack of pleats (or minimal pleat depth) adjacent end 3 of the media 2 and safety 1 as discussed above. The advantages from this are that adjacent end 3, the media 2 and cartridge 1 take up relatively little radial dimension. Thus, the overall cartridge 1 has relatively little radial dimension adjacent seal 26 so it can fit into a narrow recess 150r, FIG. 12A. This means the radial projection of the cartridge 1 around the air flow exit, does not contribute, to an undesirable extent, to restriction to air flow to the outlet 106, to advantage.

3. Advantages at the Interaction between the Safety Cartridge 1 and Central Cartridge Support 130

The central cartridge support 130 provides support to the safety cartridge 1 ensuring proper orientation within the assembly 100. A engagement of particular advantage between the safety cartridge 1 and the central cartridge support 130 occurs in the region of central projection 139.

First, to advantage, an optional cushion engagement is provided between the central projection 139 and the safety cartridge 1, by grommet 48 (48v) when grommet 48 (48v) is resilient. This helps avoid a hard plastic to hard plastic engagement at this location. The cushioning effect is provided by constructing grommet 48 (48v) from an appropriately cushioned or flexible, i.e. resilient, material as discussed previously.

Also, in the particular example depicted, the central projection 139 extends completely through aperture 40a in the safety cartridge 1. When this is the case, it is desired to provide a seal closing aperture 40a. The optional grommet 48 (48v) also provides for this by comprising a resilient material that releaseably, sealingly, engages projection 139.

In the example depicted, the central projection 139 includes an optional head or tip 145, i.e. wider portion, and a narrow neck section or portion 146. This also is advantageous in combination with the optional grommet 48 (48v). In particular, as the safety cartridge 1 is pushed over central cartridge support 120, eventually head or tip 145 will engage grommet 48 (48v). It will push through, expanding the aperture in the grommet 48 (48v). Eventually it will project outwardly from the grommet 48 (48v) providing an interference fit as shown in FIG. 12B, by the tip 145, being wider than the aperture in the grommet 48 (48v), when the grommet 48 (48v) surrounds the neck section 146. This interference fit will help keep the cartridge 1 in place on the central cartridge support 130 as the main cartridge 102 is installed and removed, and as servicing occurs when the cartridge 102 is removed. The amount of interference is preferably not so much that it can't be overcome by a service provider pulling on the safety 1, but is also preferably adequate to help secure the safety in position against undesired movement, and thus provides advantageous effect.

4. Advantages from Projection/Receiver Interaction Among the Safety Cartridge 1, the Central Cartridge Support 130, the Main Cartridge 102 and the Access Cover 110

In the system 101 depicted, as discussed, the central cartridge support 130 and the safety cartridge 1 are relatively short, by comparison to the length of extension of the main cartridge 102, and for that matter, the housing 101 in extension along the central axis X (i.e. in an axial direction). The interaction described among the safety cartridge 1 at end piece 20; the central cartridge support 130 and cartridge support end 132; the main cartridge 102 at end piece 170 and in particular section 172 at end 174; and, the access cover 110, especially in connection with projection 123 and recess 124, provide for a number of advantages. For example, the main cartridge 102 and the safety cartridge 1 are well stabilized in their respective positions. Also, they are secured in a desired orientation for proper operation and easy installation and removal. Further, the interaction helps ensure that the main cartridge 102 and the safety 1, are proper ones for the system 101 of interest, and cannot be improperly installed; i.e. installed without appropriate and proper sealing.

5. Advantages from the Optional Projection Arrangement 55r, FIG. 1B

The optional projection 55r, FIG. 1B, can also provide advantage. In particular, it can form a bumper against which a portion of main cartridge 102, can press if the safety 1 is not fully installed before the main cartridge 102 is installed. This will help push the safety 1 into a proper sealing position over central cartridge support 130. In some instances, it may be desirable to form projection 155r from a relatively resilient material, so as to facilitate this type of engagement. This can be done with a molding operation that provides a resilient material at region 155r if desired.

6. Advantages from a Free End of the Media at Tip 3t

As explained above, preferably the media 2 is provided with a tip 3t that is free, i.e. is not embedded in an end cap, and is not surrounded by any portion of cartridge support 29. This is advantageous, in that it provides not only for a narrow width dimension of the cartridge 1 at this region, for insertion in the recess 150r, but it also leaves the tip 3t free to provide for a secondary sealing effect within recess 150r and also some cleaning effect as it is removed during servicing of the cartridge 1.

IV. Some Selected Variations, FIGS. 14 and 15

Figure 14:
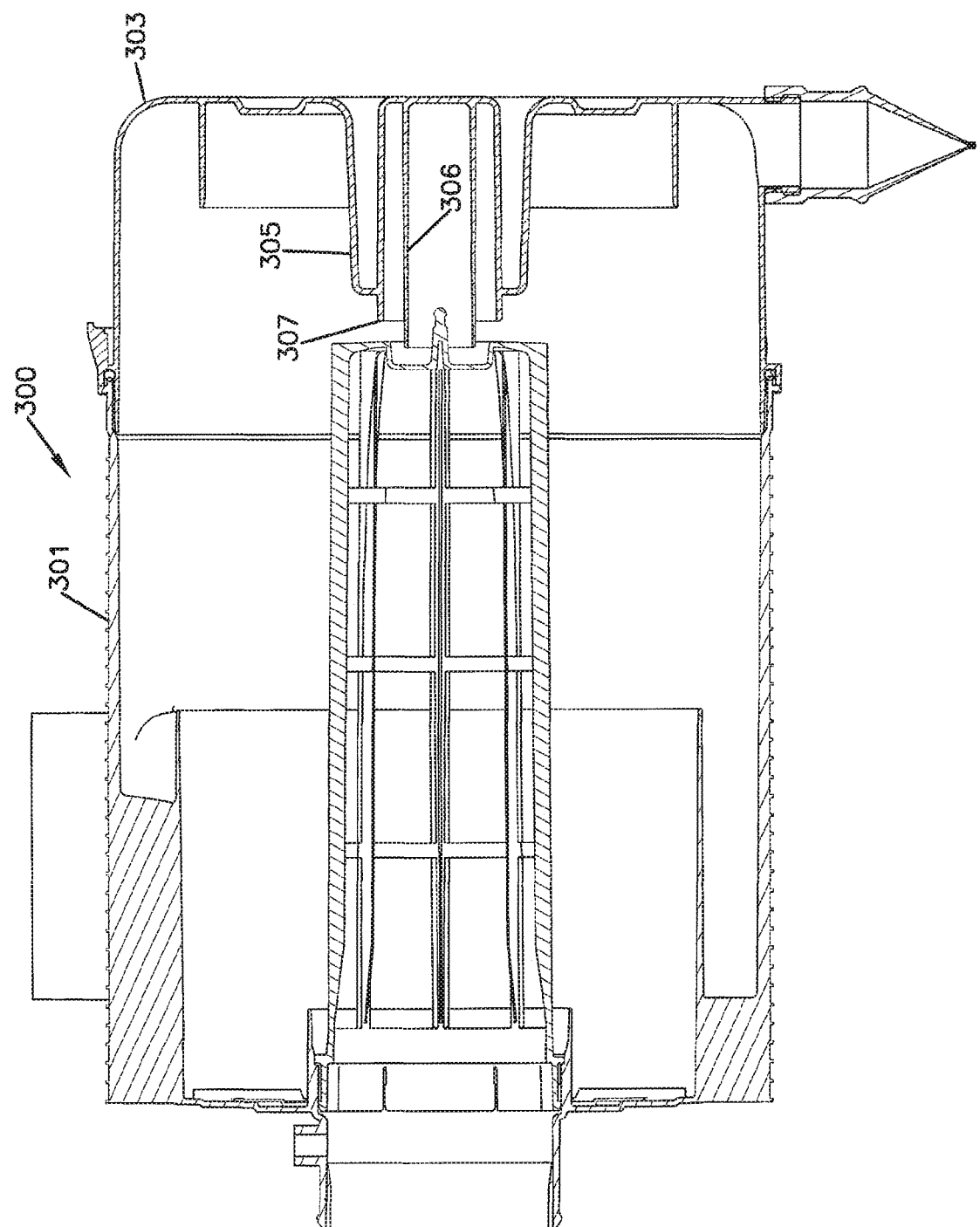
FIG. 14 is a schematic cross-sectional view of an alternate housing to the housing depicted in FIG. 11, usable in accord with the principles of the present disclosure.

In FIG. 14, a schematic cross-sectional view of a housing analogous to the view of FIG. 11 is depicted. The depiction of FIG. 14 is meant to indicate an example of a usable variation. Like features would have a like operation.

Referring to FIG. 14, the housing 300 depicted includes a main housing part 301 having an access cover 303 thereon. The main housing part 301 may be generally analogous to part 109, FIG. 11. The access cover 302 may be generally analogous to access cover 110, FIG. 11. The particular access cover 302 is varied somewhat in the region of projection 305 in that central recess receiver 306 is deeper than receiver 124, FIG. 11A. Also, it is surrounded by a second projection 307. However, it can be used in general in a manner analogous to access cover 109, FIG. 11.

Figure 15:
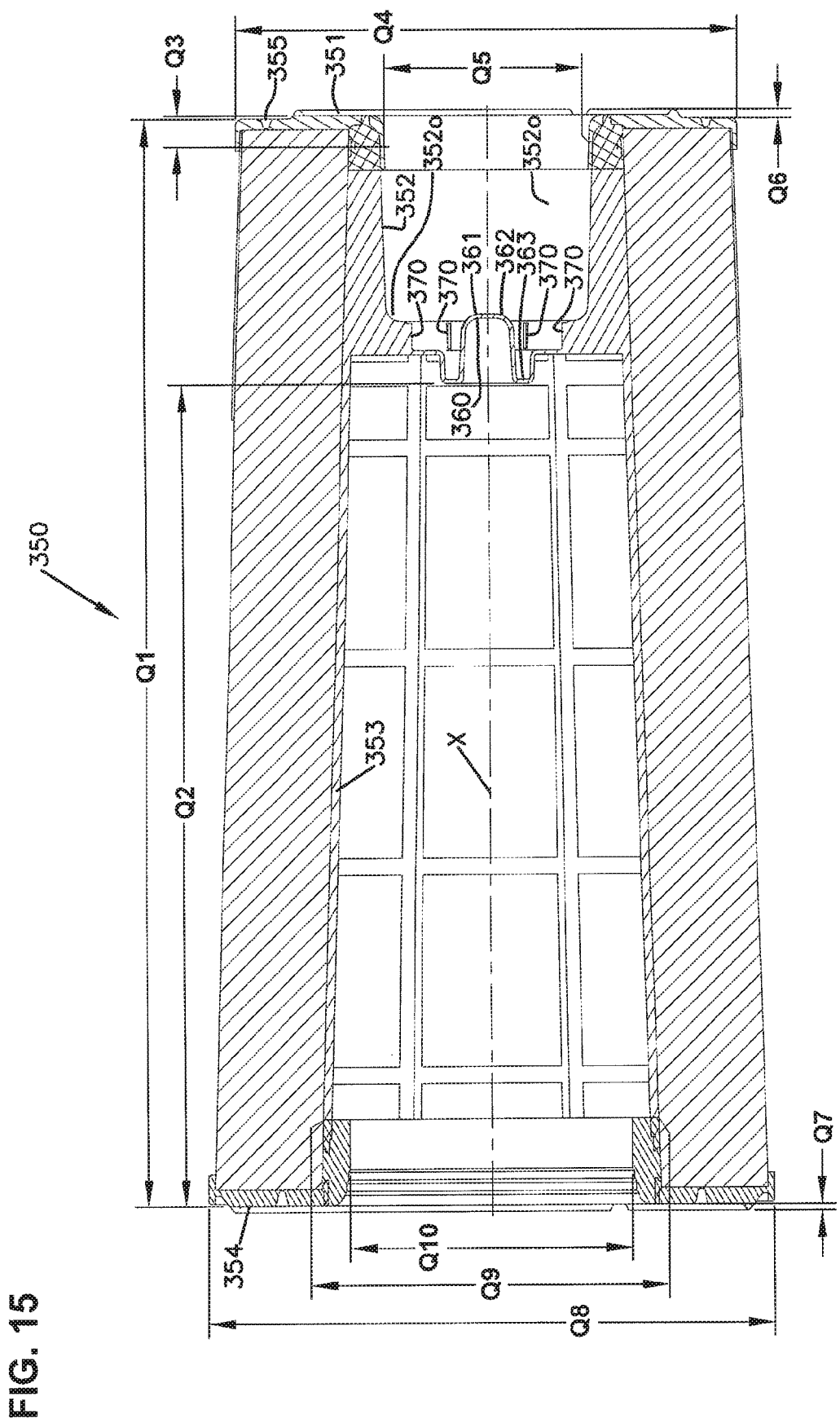
FIG. 15 is a schematic cross-sectional view of an alternate main filter cartridge, to the cartridge depicted in FIG. 13 and usable in arrangements according to the present disclosure.

In FIG. 15, a cross-sectional view of an alternate cartridge 350 to main cartridge 102 is depicted. Like features have like operation. It is noted that a closed end 351, a projection 352 is shown comprising a portion of a liner 353 that extends completely between opposite end caps 354, 355. The projection 352 can operate similarly to projection 172, FIGS. 13 and 13A. It is also noted that projection 352 includes an end having a recess 360 analogous to recess 178r, and outer surface 361 with a projection 362 thereon surrounded by a recess 363. These features can operate analogously to analogously described and depicted features for the embodiment of FIG. 13A. Also, spaced centering fins 370 are viewable on outer surface 352o. They are directed toward central axis X and projection 362. The centering fins 370 will fit around ring 307, FIG. 14. The fins 370 preferably surround a portion of projection 362. There are preferably 3-8 such fins 370.

In FIG. 15, example dimensions are indicated as follows: Q1=520 mm; Q2=392.5 mm; Q3=14.5 mm; Q4=239.3 mm; Q5=98.5 mm; Q6=4 mm; Q7=3 mm; Q8=269.6 mm;

Q9=160 mm; and, Q10=135 mm. Of course, the arrangement can be implemented with alternate dimensions.

V. Additional Example Arrangements; Components; Features; Techniques and Methods, FIGS. 16-57

In FIGS. 16-57, some additional examples of assemblies, components, features, techniques and methods usable in applications of the present techniques are shown and described. The features and components characterized in this section demonstrate some variations that can be practiced, to advantage; and, each can be implemented using various ones of the methods, systems, components, and techniques, previously described, There is no specific requirement that an assembly, component, feature, technique or method involve all of the detail characterized herein, or be practiced to achieve all advantage possible, in order to obtain at least some benefit according to the present disclosure.

A. A First Additional Example Filter Assembly, FIGS. 16-47

1. The Overall Assembly, FIGS. 16-20

The reference numeral 401, FIG. 16, generally references an air cleaner assembly including components according to an additional example of the present disclosure. The air cleaner assembly 401 generally comprises: a housing 402; a main filter cartridge 403; and, a safety filter cartridge 404. The housing 402 comprises a housing body section or body 402a; and, a removable access cover 402b that allows for access to an interior 402i of the housing 402, for example for service access to the main filter cartridge 403 and safety cartridge 404.

Still referring to FIG. 16, the housing 402 includes, positioned in the housing body 402a, a central support 407. The operation, function and example structure of the support 407 are described in more detail below. In general, it provides the support function with respect to internally received filter cartridges 403, 404, analogously to previously described such supports herein.

Still referring to FIG. 16, the housing 402 includes a flow inlet (or inlet flow) arrangement 410 and a flow outlet (or outlet flow) arrangement 411. At 414, an optional cap is depicted, that can be positioned over structure on outlet 411.

In a typical application, the assembly 401 would be an air cleaner assembly, for example, as used for an internal combustion on a vehicle or other equipment. Air to be filtered would enter the housing 402 through flow inlet arrangement 410, would be passed, consecutively, through media of the main filter cartridge 403, and then through media of the safety cartridge 404 (if used). The filtered gas would then pass in an outwardly direction from the housing through outlet arrangement 411 to be directed to downstream equipment as appropriate for the system.

In FIG. 17, a side elevational view of assembly 401 is depicted. Features previously characterized include: housing 402, comprising body section 402a and access cover 402b; inlet arrangement 410, outlet arrangement 411; and, optional cap 414.

In FIG. 18, the assembly 401 is depicted, in plan view directed toward access cover 402b. The access cover 402b is depicted with mounting latches 417 thereon, to secure it to the housing body 402a. Also, evacuator valve 418 is shown positioned over evacuator tube 419, allowing for water and/or some dust egress from interior 401 during operation.

In FIG. 19, the bottom plan view of the air cleaner assembly 401 is provided. A mounting pad arrangement 420 is viewable, for securing assembly 401 to equipment in use. Mounting pad arrangement 420 can be molded integral with a remainder of the housing body 402a, or it can be separately made and attached.

In FIG. 20, a plan view taken toward outlet 411 is provided.

2. The Main Filter Cartridge Generally, FIGS. 21-30

In FIGS. 21-30, general features of the main filter cartridge 403, FIG. 16, and features of selected componentry thereof are shown. Referring to FIG. 21, a perspective view of main filter cartridge 403 is depicted. The main filter cartridge 403 comprises a media pack 431 positioned surrounding an interior volume. The media pack 431 extends between first and second opposite end pieces 432, 433 (and comprises media 431m extending between media ends 431a, 431b). For the example depicted, end piece 432 is an open end piece having an open central aperture therethrough for flow of material between the exterior region and a region surrounded by the media pack 431. For the example depicted, end piece 433 is closed, and is configured with selected features to advantage discussed further below.

The media pack 431 can comprise a variety of materials. It may include an inner liner, an outer liner, or both. Typically, it will include at least an inner liner as discussed below.

A variety of materials can be used for the media 431m of media pack 431 generally as intended or desired for the application of use. Typically, the media 431m will comprise pleated media but alternatives are possible.

The particular media pack 431 depicted generally has a circular cross-section, although alternatives, such as oval, can be applied in some arrangements according to the present disclosure. The particular media pack 431 depicted also tapers downwardly in shape or cross-dimension, in extension from adjacent the open end since 432 to adjacent the closed end piece 433. While this if typical, preferred and advantageous, alternatives are possible with application of some of principles described herein.

Still referring to FIG. 21, the particular cartridge 403 depicted, includes, surrounding the media pack 431 and media 431m thereof, adjacent the closed end 433, an optional dust ejector outlet shield or margin arrangement 435. This margin arrangement 435 provides an optional impermeable shield around the media 431m at a location that overlaps the housing evacuator tube 419, FIG. 16.

In FIG. 22, a plan view taken toward end piece 432 is viewable. An interior 403i of the cartridge 403 is viewable, through to adjacent end piece 433.

Referring now to FIG. 23, a side elevational view, with a portion shown in cross-section, of the cartridge 403 is provided. Selected features of end piece 432 can be seen in cross-section. For example, a central flow aperture 438 can be seen, providing communicating flow with interior 403i of the cartridge 403, surrounded by the media pack 431. Portions of an inner liner 439 discussed further below can be seen. Also, a housing seal arrangement 440 on end piece 432 can be seen. The particular housing seal arrangement 440 depicted, comprises a radially directed housing seal member 441. In this instance, the radially directed housing seal member 441 is configured as a radially inwardly directed housing seal arrangement 441i; i.e. it is directed toward axis X. As will be seen, as a radially inwardly directed arrangement it is configured to form a releasable housing seal between the cartridge and a portion 402 when pushed thereover.

Also, still referring to FIG. 23, selected external features of the end piece 432 can be seen. In particular, attention is directed to optional cushion or bumper arrangement 443 and to optional groove 444. The bumper arrangement 443 is configured to be pressed against a housing and wall section or housing portion axially, when the cartridge 403 is installed, to help cushion and stabilize the cartridge 403 in position. The grove 444 can be a remnant from a mold stand-off ring during molding of the end piece 432. It can also be oriented and used as a receiver ring, to receive a portion of housing projecting therein, when the cartridge 403 is installed. The groove 444, when used, will typically be continuous, in extension around a central axis X, but alternatives are possible. The end piece 432 will typically be molded-in-place from material such as a foamed polyurethane having a hardness, Shore A, of the type characterized previously herein. Alternatives, of course, are possible.

Groove 445, positioned radially outwardly from liner 439 and radially inwardly from groove 444, is an optional groove. It can be an artifact from certain types of molding operations, but can be left off if desired in some instances.

In FIG. 24, a cross-sectional view of the filter cartridge 403 is provided. In FIG. 24, the liner 439 can be seen in greater detail, extending between opposite ends 432x, 433x (where the end pieces 432, 433, respectively are positioned). The liner 439 can thus be seen as having opposite ends 439a, 439b, with sidewall structure 439s extending therebetween. For the example depicted, the sidewall structure 439s is a lattice structure of longitudinal (axial) supports 439t and circumferential ribs 439r, to provide a porous structure that also supports media 431m of media pack 431 along an interior 431i thereof.

For the particular example arrangement depicted, the sidewall 439s is tapering, because it is configured to support a tapering media pack 431 (and media 431m) in extension between the end pieces 432, 433. Typically, an angle of taper along outer pleat tips, or media surface, and will be at least 0.3°, usually at least 0.5°, typically not more than 5°, and often within the range of 0.3-3°, inclusive, although alternatives are possible. The angle of taper reference is meant to be an angle relative to central axis X.

Still referring to FIG. 24, support end 439a is shown positioned embedded in and adjacent end piece 432. It is generally an open end, allowing for positioning around, and in supporting relation to, housing seal arrangement 441.

Still referring to FIG. 24, end 439b, on the other hand, surrounds a closed central end structure 439e positioned on liner 439 and closing a central region across the media interior 431i. Selected features of the closed end structure 439e are discussed herein, in connection with other figures. In general terms, the closed "central end structure" as the term is used in this context, is structure which extends across, and closes, an interior 431i of the cartridge 403 at a location remote from liner open end 438 (i.e. remote from cartridge end piece 432).

In FIG. 25, a schematic exploded view of the cartridge 403 is depicted. Components discussed are characterized by like reference numerals. It is noted that the exploded view of FIG. 25 is schematic, and the parts would not typically be separable in the manner shown. For example, typically the portions of the end pieces 432, 433 shown at opposite ends of the figure, would be molded-in-place on media 431m and would not be separable therefrom.

Attention is now directed to FIG. 26. FIG. 26 is an enlarged cross-sectional view of the liner 439. Referring to FIG. 26, adjacent end 439a is provided an end ring 450 with a plurality of flow apertures 451 therethrough. During molding of end piece 432, resin can flow through the apertures 451, facilitating connection between the molded-in-place portion of the end piece 432 and the liner 439 while also ensuring the structural back-up support to the seal 441r. Spaced projections 452 can be housed as mold stand offs.

FIG. 27 is an end view taken generally toward end 439a. FIG. 28 is an end view taken generally toward end 439b.

In FIG. 29, a perspective view of liner 439 is provided. Apertures 439q allow for resin flow, during molding of molded-in-place portions of end piece 433, FIG. 25.

In FIG. 30, an enlarged fragmentary cross-sectional view is taken of a portion of FIG. 26, i.e. of liner 439, in particular in the region of closed end 439e. The closed end 439e can be seen as defining, in a resulting cartridge 403, FIG. 21, a closed central region 460 extending across a cartridge interior 403i. Referring again to FIG. 30, central region 460 has an inner surface 460i and an opposite outer surface 460x. The inner surface 460i is the surface that faces interior 403i of a resulting cartridge 403, FIG. 21, i.e. faces toward the end piece 432. Surface 460x is an outer exterior surface, and faces away from interior 403i and generally away from end piece 432.

Some selected features of the liner 439 and the resulting filter cartridge 403, viewable in FIG. 30, include the following. Along an interior 460i, the end member 460 includes a projection 462 that projects toward interior 403i and the opposite end 432 of the resulting cartridge 403. Further, the projection 462 surrounds a receiver recess 463 that projects away from interior 403i and the opposite end 432, in the resulting cartridge. The receiver recess 463 is closed by central portion 460p of the closed end 460.

For the particular assembly depicted, the projection 462 is a continuous central ring surrounding (and in the example centered on) central axis X. The ring 462 is defined by spaced outer and inner walls 464, 465, joined at end ring 466.

An outer surface 460x, the two sidewalls 464, 465 and end portion 466 define a receiving groove 470 surrounding a central projection 471, an end of which is defined by central projection 460p. The groove 470, it will be understood, is sized, positioned and located to receive projecting therein, a portion of an on the access cover, discussed below. Further, the projection 471 is sized to project into central receiver on an access cover surrounded by a portion that projects into groove 470 in the access cover. It can be seen that, for the example, inner sidewall 465 is a sidewall portion of the projection 471.

3. General Features of the Housing 402 and Body Section 402a, FIGS. 31-36

In FIG. 31, an exploded perspective view of certain features of the housing body section 402a is depicted. Referring to FIG. 31, it can be seen that the housing body section 402a includes a sidewall 480 with inlet 410 therein, and an end wall or region 402x with outlet 411 therein. Mounting pad or foot pad arrangement 420 is shown positioned on the sidewall 480 at appropriate locations for mounting of the body section 402a and indeed the overall assembly 401, FIG. 16, as desired for use. Again, regions 420 can be molded-in-place or they can be preformed and then be secured in place.

Referring in general to FIG. 31, additional, internal, structure is depicted. In particular, central support 407, if depicted which, for the example shown can be preformed and then be secured, or positioned, in housing section 402a. Another feature is optional and preferred ramp member 485, which can be preformed and then be secured within end section 402a.

In general, the support 407 can provide, in use, for desired support to internally positioned structure such as one or both of filter cartridges 403, 404. This is discussed further below.

The ramp 485 can be preformed and then secured within the assembly, appropriate so that air entering inlet 410 is directed into a cyclonic pattern.

In FIGS. 32-36, the support 407 is depicted in greater detail.

Referring to FIG. 32, support 407 is shown in perspective. The support 407 comprises first and second ends 490, 491, with side or sidewall structure 492 extending therebetween. For the particular example depicted, the side structure 492 is a lattice structure, allowing for flow of material being filtered, for example, air, therethrough in use. Operation with respect to this is discussed further below.

End member 490 generally surrounds an open end 490x allowing for fluid flow communication with an interior region surrounded by lattice 492. End 491 is typically configured with features for interacting with support components such as a safety element and/or main filter element as discussed below.

End 491 is a support end, and includes a number of preferred features. For example, it includes radially outwardly projecting, spaced, projection sections 491r that become positioned between projections on an end of the safety or secondary filter cartridge in use. End 491 also includes central projection 490 or receiver recess 504 and central projection 506.

In FIG. 33, a cross-sectional view of central support 407 is provided. At end 490, around aperture 490x, a plurality of spaced, flexible members 490p are provided. These are configured to engage, in a snap-fit manner, structure in or at housing end 402x, FIG. 31, during installation. Often, a hook or ratchet engagement is used, in a typical application, so that once the support 407 is positioned within the housing 402, it is not readily removable. This does not mean that it must be configured to never be removable, only that it typically would not be desired to have it removed. It is noted that in some instances, the support 407 can be configured to be integral with a remainder of the housing 402, but in typical preferred applications, it will be a separately made piece that is pushed in place during assembly.

In FIG. 35, and end view taken toward end 491 is provided. In FIG. 36, and end view taken toward end 490 is provided.

In FIG. 34, an enlarged fragmentary cross-sectional view of an identified portion of FIG. 33 is shown. Here, some selected features of the support 407 can be viewed.

Referring to FIG. 34, end 491, which can be viewed as a cartridge engagement end of support 407, includes a central projection 493 that projects, generally, in a direction away from end 490, FIG. 33, and thus in use toward the access cover 402b. Projection 493 is surrounded by recess or receiving groove 494. Projection 493 extends, in the example depicted, to a tip 495 positioned on a narrow neck 496; the tip 495 having a slightly larger cross-dimension then the net 496. Operation of the tip 495 and neck 496 during engagement with cartridge structure, is discussed further below.

4. Features of the Example Safety Filter 404, FIGS. 37-45

In FIGS. 37-45, safety filter 404 and its components are depicted. Referring to FIG. 37, safety or secondary filter 404 is depicted in an exploded view as comprising: safety cartridge section 404a, seal ring 501, and cushion member or grommet 502.

In general, the safety filter region 404a comprises a media pack 404m extending between opposite ends 404a, 404b. It may be generally as previously described herein for FIGS. 1-15.

A depicted grommet or cushion member 502 differs in detail from previously described such grommets or cushion member, but generally is positionable within an aperture 505 on a central projection 506 positioned in end 404b. The grommet or cushion member 502 can be formed and then pushed into the aperture 505; or, it can be preformed and put into a mold of when end 404b is molded. It would typically be preformed and then be pushed into a preformed projection 506 and aperture 505. It will be typically be formed from a resilient thermoplastic elastomer such as a silicone rubber or similar material, with a hardness as characterized for a similar part previously herein, as its function is greatly operated as a cushion member as discussed below. Still referring to FIG. 37, the seal ring 501 is an o-ring positionable within receiving groove 404g. Alternately, the seal 501 can be a molded-in-place seal member.

In FIG. 38, cartridge 404 is depicted in side view, with selected portions shown broken away and in cross-section. Referring to FIG. 38, cartridge 404 can be seen as comprising media extending between ends 404a, 404b. Except as detailed below with respect to grommet 502, in general, the cartridge 404 can be analogous to similar cartridges discussed previously, including with respect to alternatives and variations thereof characterized previously.

In FIG. 39, a plan view taken toward end 404b is viewable. Cushion member or grommet 202 can be viewed.

In FIG. 40, an enlarged fragmentary cross-sectional view of an identified portion of FIG. 38 is shown. Here central projection 506 can be viewed: as being surrounded by groove or receiver 504; and, as having a tip 506t, remote from end 404a, FIG. 37. The tip 506t surrounds defines an aperture 505. Cushion member or grommet 502 is positioned in the aperture 507.

More specifically, cushion member or grommet 502 extends through the aperture 505, and in the example depicted, fully closes it. Cushion member or grommet 502 includes and defines an interior receiver region 508. Receiver region 508 is positioned at least partly surrounded by projection 506. The particular region 508 depicted, narrows to a neck 509 and an end portion 510 positioned along axis X on an opposite side of neck 509 from end 404a, FIG. 38. The interior 502i of the cushion member or grommet 502 is defined to receive snuggly therein (and preferably in an interference manner) a portion of projection 493, FIG. 34 on central support 407. In particular, tip 495 would be received within region 510 and narrowed neck 496 would be engaged by neck 509, in a manner analogous to providing described cushion members.

In the example of FIG. 40, however, it is noted that region 510 is closed by an end section 502x of cushion member 505 positioned exteriorly of projection 506 and beyond tip 506t.

Still referring to FIG. 40, cushion member or grommet 502 includes thereon, an engagement arrangement 511. It is sized to project across tip 506t to terminate at an outer region 511o positioned extending radially outwardly from axis X beyond projection 506 at tip 506t. Preferably it extends at least 0.5 mm, usually at least 1 mm radially beyond tip 506t. In a typical arrangement, outer region 511a is circular, as can be seen in FIG. 39. However, alternatives are possible. Region 511o is configured to engage a filter cartridge in a preferred manner, as discussed below.

In FIG. 41, cushion member or grommet 505 is viewable in perspective view.

In FIG. 41, gusset 502g can be seen supporting outer region 511o.

In FIG. 42, an enlarged cross-sectional view of member 505 is viewable.

In FIG. 43, an end view of member 502, taken toward the interior and end 508, FIG. 40 is provided.

In FIG. 44, a side elevational view of cartridge 404, minus seal ring 501, FIG. 37, is provided. The media 404m can be pleated media analogous to that described previously for the arrangements of FIGS. 1-15. Thus, it may have outer pleat tips and inner pleat tips with different angles of extension relative to central axis X.

FIG. 45, a partial cross-sectional view taken of cartridge 404, in accord with line 45-45, FIG. 44 is provided. Only a portion is shown broken away an in cross-section. In FIG. 45A, an enlarged fragmentary view of that portion is shown, and one can see outer support rib 473r extending along a tip 474, of a media pleat 475.

5. Selected Features of the Component in Interaction, FIGS. 46-47

In FIGS. 46 and 47, selected features of interaction among components for air cleaner 401, FIGS. 16-20, are shown.

In FIG. 46, an enlarged fragmentary schematic cross-sectional view taken adjacent access cover 402b is shown. Referring to FIG. 46, the access cover 402b can be viewed as having an end or interior surface 520 with a central housing or access cover projection 521 thereon, projecting in a direction from end surface 520 toward: interiorly received cartridges 403, 404; support 407; and, housing base 402a, not shown.

The central projection 521 surrounds and defines a central receiver recess 522. For the particular example depicted, the projection 521 is centered on and surrounds central axis X. This will be typical, but is not necessarily required in all instances.

Still referring to FIG. 47, central access cover projection 521 can be seen as projecting into and being received by, groove 470 on end 439e (460) of cartridge 403; and, to project to a location between inner and outer walls 465 and 464 respectively. As a result, cartridge projection 471 is shown depicted extending into access cover recess 522.

In FIG. 46, projecting ring 462 on an interior surface of end piece 439e (460) of the main filter cartridge 403 can be seen projecting into a groove or recess 504 on the safety cartridge 404, surrounding central projection 506, and positioned between projection 506 and outer sidewall 504s of the remainder or groove 504.

Attention is directed to cushion member or grommet 502. The outer portion 511o can be seen engaging, a radially interior surface portion of projection 471 on main cartridge 403. This would be a cushion member arrangement portion.

Still referring to FIG. 46, attention is directed to projection 493 on the support 407. It can be seen as having tip 495, projecting into the cushion member or grommet 502 as described above.

It can be seen from FIG. 46, that a cushion interaction is provided, among selected components, namely: grommet 502 and main cartridge 403, in projection 471; and, between support 407 and grommet 502 at tip 495. This can help provide for secure engagement, and a cushion one that does not tend to allow rubbing between adjacent parts in a manner that can cause damage to one or the other or both.

In FIG. 47, an enlarged fragmentary view showing interaction in a region at an opposite end of the assembly from region 46 is shown. Here, outlet 411 is shown reinforced by support ring 530. Also, seal flange 531 is viewable, for engagement by seal member 501 on the safety filter 404, along an inside of flange 521; and, by seal member 440 on the main filter cartridge 403 at an outside. Further, the flange 531 can be seen as defining a groove 533, between the flange 531 and the support 407, of an end of the safety 404 therein. A tail 534 of the safety media can be seen projecting down into this groove 533.

Still referring to FIG. 47, projection 536 on an end of the housing body 402a can be seen projecting into groove 444 on the main filter cartridge 403.

6. Example Dimensions for the Arrangement of FIGS. 16-47

Selected ones of FIGS. 16-47, some example dimensions for the arrangement depicted are provided. Although variations from the dimensions can be practiced, the following list of example dimensions, will facilitate application of the practice of the invention, whether in the particular size depicted or alternate sizes.

In FIGS. 16-47, the example dimensions indicated can be for example as follows: TA1=350 mm; TA2=274.8 mm; TA3=331.9 mm; TA4=227.8 mm; TA5=125.8 mm; TA6=350.5 mm; TA7=210.4 mm; TA8=126.8 mm; TA9=337.5 mm; TA10=6 mm; TA11=85.3 mm; TA12=210.4 mm; TA13=148.6 mm; TA14=141.8 mm; TA15=337.5 mm; TA16=12 mm; TA17 is meant to indicate a wall thickness in the region identified as 2.5 mm; TA18=33 mm; TA19=4.5 mm; TA20=4 mm; TA21=34.4 mm; TA22=25.2 mm; TA23=127.5 mm; TA24=14.5 mm; TA25=8.5 mm; TA26=4 mm; TA28=2.9 mm; and, TA29=25 mm; TA30=95.2 mm; TA31=295.9 mm; TA32=28.3 mm; TA33=23 mm; TA34=50.5 mm; TA35=11.1 mm; TA36=5.6 mm; TA37=4.9 mm; TA38=25.6 mm; TA39=6.6 mm; TA40=2.1 mm; TA41=4.4 mm; TA42=126.1 mm; TA43=297.5 mm; TA44=14.6 mm; TA45=5 mm; TA46=15 mm; TA47=4.9 mm; TA48=5 mm; TA49=20.3 mm; TA50=73.2 mm; TA51=69.3 mm; TA52=69.3 mm; TA53=5 mm; TA54=5 mm; TA55=23.1 mm; TA56=47.8 mm; TA57=33.5 mm; TA58=27.5 mm; TA59=27.5 mm; TA60=38.1 mm; TA61=51.4 mm.

Referring again to FIG. 46, preferably the tip or ring 462, where the inner wall 465 and outer wall 464, defining the receiving groove in the outer surface of the end piece 439e, has a width dimension of no greater than 20 mm, typically no greater than 30 mm, preferably no greater than 25 mm, and usually within the range of 5-16 mm. Although alternatives are possible. Typically, the outer wall 464 has an inner surface portion facing axis X that extends fairly steeply, preferably at an angle of at least 85°, typically at least 86°, and usually within the range of 87-89.5°, relative to a plane perpendicular to the central axis X.

Although alternatives are possible, typically and preferably, an interior surface of projection 471 at a location where engaged by cushion member 511o, is circular in cross-section, and is engaged by the outer perimeter of member 411o in a 360° arc around the central axis X. Typically, this surface portion has a cross-dimension slightly smaller than a cross-dimension of the cushion member at this location, preferably at least 0.2 mm smaller, usually at least 0.5 mm smaller sometimes 1 mm or more smaller. Typically, the overall dimension of the engagement portion 511o of the cushion member 510 has a cross-dimension of at least 12 mm, typically at least 15 mm, usually not more than 26 mm, and typically not more than 23 mm. Typically, surface portion 565, where engaged by the cushion member 511o, extends at an angle, relative to a plane perpendicular to central axis X, of at least 84°, typically at least 85°, often within the range of 86°-89.5°. Alternately stated, typically that surface portion extends at an angle relative to central cartridge axis X of at least 0.5°, typically no greater than 6°, and usually within the range of 0.5-4°.

With respect to the definition of regions where a surface of wall 465, i.e. an inner surface of projection 471, engages cushion arrangement 502, and in particular perimeter 511o, is not meant to be suggested that no portion of the projection 471 varies from the definition given. Rather, the intent is meant to refer to the portion engaged when the cartridge is fully engaged with a grommet member 502, during installation.

Typically, the groove 470 has a depth, in extension inwardly from adjacent the outer wall 464, of at least 10 mm, typically at least 12 mm, and often at least 14 mm, for example 14-30 mm.

B. A Second Additional Alternate Air Cleaner Assembly Example, FIGS. 48-52

In FIGS. 48-52, a second additional embodiment using many of the features of the arrangement of FIGS. 16-47, is depicted. A third is depicted is FIGS. 53-57, as discussed in the next section. From these figures, additional variations and practices according to the present disclosure can be understood.

In previously described embodiments, safety or secondary filter configurations were described: that had an end remote from a seal end; and, that comprised a plurality of radially projecting members that would close ends of pleats; the members having recesses or spaces therebetween. This correlated with a preferred media definition that had outer pleat tips and inner pleat tips that would were not the same, in angle of extension.

Advantages can be obtained from applications of certain features described herein, even when the safety secondary filter configuration is more conventional with respect to the media pack; for example, a safety filter media pack comprises a cylindrical shape or slightly conical shape without tapering pleat ends. This is among the variations that will be understood from the embodiments of FIGS. 48-57.

In FIG. 48, an example air cleaner assembly 601 is depicted comprising housing 602. The housing 602 comprises a housing body 602a with a removable access cover 602b positioned thereon via latches 617. The access cover 602b includes a evacuator tube 619 with evacuator valve member 618 thereon. The housing 602 further includes inlet 610 and outlet 611. Mounting pad arrangement 620 is shown positioned on the housing body 602. Here, the mounting pad arrangement 620 is configured so that the assembly 601 is suspended from an equipment section in use, but alternatives are possible.

In FIG. 49, an exploded perspective view of air cleaner assembly 601 is provided. The assembly 601 includes: housing 602; main filter cartridge 603; safety cartridge 604; and, positioned in the housing body 602a, support 607. Also viewable is cap 614. Except for variation in the support 607 and safety 604, discussed herein below, the parts can be generally analogous to ones previously described herein.

In FIG. 50, a cross-sectional view of air cleaner assembly 601 is provided. A depicted main filter cartridge 603 can be seen as comprising media pack 631 (comprising media 631m) extending between ends 631a and 631b, and end pieces 632 and 633. The media pack 631 is seen as including inner liner 639 around which the media 631m is positioned. End piece 632 is generally configured analogously to end piece 432, and forms an internally directed radial seal by seal member 640; which is positioned to seal around a seal flange 643 in housing 602. End piece 633 operates generally analogously to end piece 433 except for specific detail referenced below.

Safety element 604 comprises media 605 around open interior 605i, supported between ends 604a and 604b. End 604a includes a radially (in the example outwardly) directed seal member 604r thereon. In this instance, the depicted seal member 604r does not comprise an o-ring, but an o-ring could be used. Rather, end piece 643x, positioned in the safety 604, would typically be formed from a material (such as a foamed polyurethane) sufficiently soft and compressible to form an outwardly directed radial seal in use.

It is noted that the safety 604 depicted, does not have a media configuration analogous to safety filter, discussed previously. Rather, safety 604 has a generally cylindrical media configuration, with media 605 that does not change with respect to depth (for example, if pleated, pleat depth) throughout its length. Further, it will be understood that at end 604b, it is closed by an end piece having a generally circular outer diameter, rather than one having a space projection arrangement for the safety 404. This is discussed further below.

Central support 607 is shown with an optional snap-fit in the housing at end 607a. As can be understood from FIG. 49, support 607 is different in specific configuration from support 407 previously discussed, although it is configured to provide an many analogous functions. In particular, while it comprises longitudinal extension 607l and rib 607r construction, at end 607e, it is generally circular, and does not have a shape analogous to support 407 with alternating projections and recesses as depicted in FIG. 32.

In FIG. 51, an enlarged fragmentary cross-sectional view of a portion of FIG. 50 is shown, the portion being where engagement among the access cover 602b, main filter cartridge 603, safety or secondary cartridge 604 and central (tower) support 607 occurs. The main filter cartridge 804 can be seen as having closure member 639e, across an interior thereof, somewhat analogous to end 439 on liner 439. In the arrangement of FIG. 51, the closure member 639e also comprises an end of a liner 639 around which the media 631m of cartridge 603 is positioned. The closure member 639e includes an outer surface 639x and an inner surface 639i. Along the inner surface, a central receiver recess 663 is defined ending in end or tip 660p. Receiver recess 663 is defined by projection 671 on an exterior surface 639x. Surrounding the projection 671 on exterior surface 639x is a groove 670 positioned between inner and outer sidewalls 665 and 664 respectively, which join at end, ring or projection, 662.

The safety or secondary filter 604 includes an end 701 extending thereacross, closing an end 604 of the safety filter 604 at an end remote from seal 604r, FIG. 50. The end 701 defines a central projection 706 having a tip 706t which is open, with certain member grommet 702 positioned therein. The grommet or cushion member 702 may be generally analogous to grommet or cushion member 502, previously discussed. Surrounding the projection 706 is a groove 707 defined between radially inner and outer walls 708 and 709; the inner wall 708 comprising a portion of projection 706. Into this groove 707 between the walls 708 and 709, projects projection ring 662 of the end piece 639e on the main cartridge 603.

The support 607 includes an end 710 with a central projection 711 thereon; the central projection 711 being surrounded by groove 713; and, having a tip 711t and a narrow neck 711n analogously to a previously described arrangement.

Further, access cover 602b includes a central projection 715 surrounding receiver 716. The receiver 716 is sized to receive extending therein, projection 663, projection 706, and projection 711. The projection 715 on the access cover, is sized to project into receiver groove 664g on the main filter cartridge 403, between walls 664, 665.

In FIG. 51, an analogous interaction among the components to that shown in FIG. 46 and discussed above are provided. The grommet or cushion member 702 is sized to engage, in an interference fit manner, an interior surface of projection 663 along a sidewall section thereof, to stabilize the main filter cartridge. Further, grommet or cushion member 702 is sized to engage the projection 711 adjacent tip 711t, in interference, cushion manner. This will help control movement of the main and safety filter cartridges once installed.

Also, various interactions among the grooves and projection depicted helps ensure that only the proper cartridge are installed.

Still referring to FIG. 51, it is noted that aperture 716 in end portion 710 of support 607 is viewable. On or more such apertures 716 can be used to receive one or more projections on a mechanical assembly for positioning the support 607 in housing 602 during initial assembly.

In FIG. 48, example dimensions are as follows: TA62=302.8 mm; TA63=530 mm; TA64=607 mm. In FIG. 51, example dimensions are indicated as follows: TA65=22.8 mm; TA66=61.1 mm; TA67=53 mm; TA68=46.9 mm; TA69=38.9 mm; TA70=52.9 mm; and, TA71=61 mm.

In FIG. 52, an enlarged fragmentary cross-sectional view taken through the assembly adjacent the outlet 611 is shown. The outlet 611 can be seen as having a reinforcing ring 611r therein. Viewable in FIG. 52 are inwardly directed radial seal 640 on the main filter cartridge 603 engaging seal flange 643. Also, safety cartridge 604 can be seen engaging flange 643 with an outwardly directed radial sealing member but not using an o-ring, but rather using an end piece 643a molded from an appropriately compressible material to provide the desired engagement. In the alternative, an o-ring engagement can be used.

Support 607 including long axial extensions 607l and radial ribs 607r is depicted. Inlet 610 can be viewed. As with other inlet arrangements described herein, inlet 610 can also be provided with a reinforcing ring analogous to reinforcing ring 611r and outlet 611, if desired.

The embodiment of FIGS. 48-52 shows that a cushion engagement among a main filter cartridge and support; and/or, among a safety filter cartridge and support, can be accomplished using a grommet arrangement analogous to those previously described, except in a context of an arrangement with a softy element that does not use the various features or safety elements described in previous embodiments.

Referring again to FIG. 51, there are some preferred features and dimensions for the arrangements depicted. For example, typically and preferably a tip of groove 664g, extending between the walls 664, 665 has a width of no greater than 30 mm, usually no greater than 28 mm, typically no greater than 25 mm. Also, preferably, sidewall 664, the outer sidewall of the groove 664g extends or tapers outwardly at an acute angle relative to a plane perpendicular to central axis X of at least 40°, typically at least 50°, often at least 60°, and usually within the range of 60°-80°, inclusive.

Typically and preferably, an interior surface portion of projection 663, surrounded by and engaging the cushion arrangement 702, extends at an angle (taper angle) relative to the central axis X of at least 0.5°, typically at least 1°, and often within the range of 1-7°. Typically, it engages the cushion arrangement 702 along a 360°, continuous interaction, with an interference. Typically, the dimension across the projection 663 at this location is at least 0.2 mm smaller than an extension across a cushion member 702 where engagement occurs, preferably at least 0.5 mm smaller and sometimes 1 mm or more smaller.

Typically, the cross-dimension of projection 663 when the engagement occurs, is at least 12 mm, typically at least 15 mm, and is preferably not more than 26 mm, usually no more than 23 mm.

C. A Third Additional Example Embodiment, FIGS. 53-57

In FIGS. 53-57, an assembly generally analogous to the assembly of FIGS. 48-52 is depicted. The assembly of FIGS. 53-57 is intended to be analogous in structure and operation, except for dimension and structural features that are included to accommodate that variation in dimension. This will be understood from comments below.

In FIG. 53, an example air cleaner assembly 801 is depicted comprising housing 802. The housing 802 comprises a housing body 802a with a removable access cover 802b positioned thereon via latches 817. The access cover 802b includes a evacuator tube 819 with evacuator valve member 818 thereon. The housing 802 further includes inlet 810 and outlet 811. Mounting pad arrangement 820 is shown positioned on the housing body 802.

In FIG. 54, an exploded perspective view of air cleaner assembly 801 is provided. The assembly 801 includes: housing 802; main filter cartridge 803; safety cartridge 804; and, positioned in the housing body 802a, support 807. Also viewable is cap 814. These parts can be generally analogous to those previously described for the embodiment of FIGS. 48-52. The main cartridge 303, as with cartridge 603, can be analogous to cartridge 403.

In FIG. 55, a cross-sectional view of air cleaner assembly 801 is provided. A depicted main filter cartridge 803 can be seen as comprising media pack 831 comprising media 831m extending between ends 831a and 831b, and end pieces 832 and 833. The media pack 831 is seen as including liner 839 around which the media 831m is positioned. End piece 832 is generally configured analogously to end piece 432, and forms an internally directed radial seal by seal member 840, being positioned to seal around a seal flange 843 in housing 802. End piece 833 operates generally analogously to end piece 433 except for specific detail referenced below.

Safety or secondary filter cartridge 804 is analogous to cartridge 604 and comprises media 805 around open interior 805i, supported between ends 804a and 804b. End 804a includes a radially (in the example outwardly) directed seal member 804r thereon. As with cartridge 604, a seal member 804r does not involve an o-ring, but an o-ring could be used. Rather, end piece 843x, positioned on the safety cartridge 804, would typically be formed from a material sufficiently soft and compressible to form an outwardly directed radial seal in use.

Analogous to cartridge 604, safety cartridge 404 has a generally cylindrical configuration, with media 805 that does not change with respect to depth (for example, if pleated pleat depth) throughout its length. Further, it will be understood that at end 804b, it is closed by an end piece 804e having a generally circular outer diameter, rather than one having a space projection arrangement for the safety 404.

Support 807 is shown snap-fit in position at end 807a.

As can be understood from FIG. 55, support 807 is analogous in specific configuration to support 607 previously discussed. It comprises longitudinal extensions 8071 and ribs 807r, end 804e, it is generally circular, and does not have a shape analogous to support 407 with alternating projections and recesses as depicted in FIG. 32.

In FIG. 56, an enlarged fragmentary cross-sectional view of a portion of FIG. 55 is shown, the portion being where analogous engagement among (to that described for FIG.

51) the access cover 802*b*, main filter cartridge 803, safety cartridge 804 and tower support 807 occurs.

In FIG. 56, example dimensions are as follows: TA72=22.8 mm; TA73=48.1 mm; TA74=423 mm; TA75=36.3 mm; TA76=47 mm; and, TA77=52.9 mm.

In FIG. 57, an enlarged fragmentary cross-sectional view taken through the assembly adjacent the outlet 811 is shown. The outlet 811 can be seen as having a reinforcing ring 811*r* therein.

In FIG. 57, interaction among: the main filter cartridge 803; the safety filter cartridge 804; the support 807; and, the housing base 802*b* is shown; the interaction being generally analogous to that discussed above, with respect to the description of FIG. 52, and shown therein.

By a review of the features and indicated dimensions of FIG. 56 and comparison to FIG. 51, still further alternate applications of the techniques described can be understood. It is noted that analogous features and appearance have analogous function.

VI. General Observations; Variations; and, Selectively Discussed Advantageous Features

A. Features Relating to Applicability with Variations in Safety Filter or Cartridge Type From the above, it can be understood that techniques described herein can be applied with variations in the type of cartridge. In FIGS. 1-47, filter assemblies and filter cartridge types can be described, in which a secondary safety filter, positioned underneath a main filter cartridge, has a particular preferred media configuration in which the media pleats terminate at an end piece remote from a seal end of the cartridge, which end piece comprises a central projection and a plurality of radially outwardly extending, spaced, projections with recesses therebetween. The projections close ends of the pleats. The arrangement is particularly well configured for use with media configurations in which pleat depth differs along a length from a first end to a second length end, typically increasing in depth toward the second end, when the second end is remote from a mounting seal or housing seal arrangement. The techniques can be applied when an end remote from the closed end piece having a central projection is not pleated at all, or is only pleated a small amount. The techniques can be applied when the seal is an o-ring, however alternatives are possible. The technique can be applied when an end of the media adjacent seal location is a free end, although alternatives are possible.

As shown and described in connection with FIGS. 1-47, a support can be positioned within the housing, along an interior of the safety cartridge when the safety cartridge is installed, that is configured to engage with and support the media in a desired manner. Further, safety cartridge features that include exterior or support, typically molded-in-place are shown and described. In the embodiments of FIGS. 48-57, on the other hand, variations are shown in which the safety or secondary cartridge is not configured from an analogous media configuration, but rather comprises a media definition that does not substantially vary along its length, with respect to pleat or depth definition. Such safety filter cartridges can have an end remote from the seal location, which is generally circular, but which includes a central projection analogously configured for engagement with various other structure in the system. The seal arrangement can be an o-ring, but examples are depicted in which it is molded-in-place, at an end remote from the closed end. With such an assembly, a cartridge support within the housing can be configured appropriately for engagement with such a cartridge.

Regardless of the particular shape of safety cartridge used in a given system, the selected principles described herein can be applied to provide a cushion member or grommet member than can be applied to cushion a preferred interaction among: a central housing support; the safety filter cartridge; and, a main filter cartridge. Examples of such cushion members are described, for example, in connection with FIGS. 16-57. In previously described embodiments, cushion members are depicted that can be applied in different ways, and general to manage interaction between the tower and the safety cartridge, but not necessarily the main cartridge.

B. Features Relating to Support of Main Filter Cartridge in a Cushion Manner It is noted that the features applied herein can even be used to support a main filter cartridge in a cushion manner, even when a safety cartridge is not present; or, when a safety cartridge is present, but it does not specifically engage the main filter cartridge, along a grommet member positioned therein. These variations can be accomplished, by mounting an appropriate cushion/grommet member on a tower support positioned in the housing, but separate from any safety cartridge present (if one is present at all). When such is the case, a cartridge analogous to those main filter cartridges described herein, could be pushed over the grommet, with the cushion engagement occurring. A grommet with an outer perimeter analogous to those described for the arrangements described in FIGS. 16-57 could be applied in this instance, except for grommet mounting on a support that is not necessarily a safety cartridge. In such instances, a safety cartridge could even be used, as a media member pushed over the support but not having an end with a grommet mounted thereon.

C. Variations that Relate to Desired Flexibility in Length

In some instances, it is desired to vary the length of the main filter cartridge in the overall housing. Referring to the arrangement of FIG. 16, this could be accomplished, for example, by having a long main filter cartridge 403 and a longer housing 402, in an axial direction, while using a same support 407 and safety 404. This can be accomplished by having the portions of the access cover and main filter cartridge that engage the safety and tower, project further toward the outlet end of the housing. An example of how this can be accomplished can be understood by comparing, for example the cross-section of FIG. 11 and the cross-section of FIG. 80.

From this, it can be understood that the same housing body, tower, and safety can be used in a system that is varied with respect to axial length of the main filter cartridge and overall housing.

D. Application of Principles with Variations in Diameter

The principles and techniques described herein can be applied in systems with a variety of alternate diameters of cartridges and other components. They can be managed in a "modular" manner, if those features that relate to interaction among the closes the main filter cartridge, and structure within the housing, such as a safety cartridge and central support are maintained with similar dimension to those described.

E. Features that Relate to Ensuring the Main Filter Cartridge is an Appropriate One for the System of Use Many of the features that relate to interaction of the main filter cartridge with the remainder of the assembly that are described herein, in connection with the various embodiments, relate to helping to ensure that the main filter cartridge is a proper one for the system in which it is installed. This can be managed by controlling dimension of those portions that interact axially or radially. Preferred dimensions and characterizations with respect to those features described herein, can be used to advantage with respect to accomplishing this.

F. Some Selected Preferred Methods

Also, characterized herein are methods of installation of a main filter cartridge into an assembly. Typically, the main filter cartridge would be as characterized, and is installed until a housing seal adjacent an open end of the cartridge fully engages in a sealing, in a releasable manner, a portion of a housing in which it is pushed. At the same time, preferably in an interior of a projection member at an opposite end of the cartridge is pushed over a cushion member until stabilizing, releasable, interfering engagement occurs. This is shown in various ones of the figures.

VII. Summary Comments and Observations

1. A filter cartridge characterized by:
(a) an extension of media surrounding an open interior and having a first end and a second end; (i) at the first end, the media having no pleat greater than 3 mm in depth; and, (ii) at the second end, the media comprising a plurality of pleats each having a pleat depth of at least 10 mm.

2. A filter cartridge according to characterization 1 wherein: (a) the extension of media surrounds a central axis; (i) the media being pleated adjacent the second end and defining a plurality of inner pleat tips extending at an acute angle, relative to a plane perpendicular to a central axis, of no greater than 89°, in extension toward the first end; and, (ii) the media being non-pleated at the first end.

3. A filter cartridge according to any one of characterizations 1 and 2 including: (a) a radially directed housing seal member positioned at a location within 50 mm of the first end of the extension of media; (i) the filter cartridge having a maximum, undistorted, radial width dimension, at a location in radial overlap with the media and the housing radial seal member, of at least 10 mm less than a maximum pleat depth of the extension of media adjacent the second end of the extension of media.

4. A filter cartridge according to any one of characterizations 1-3 including: (a) a media support; (i) the media including a non-pleated, free, tip section adjacent the media first end that extends, axially, in a direction away from the second end, an axial distance of at least 0.5 mm beyond a nearest adjacent portion of the media support.

5. A filter cartridge characterized by: (a) an extension of media surrounding a central axis and defining an open interior; (i) the media having first and second ends; and, (ii) the media being pleated adjacent the second end and defining a plurality of inner pleat tips extending at an acute angle, relative to a plane perpendicular to a central axis, of no greater than 89°, in extension toward the first end; and, (iii) the media being non-pleated at the first end.

6. A filter cartridge according to any one of characterizations 1-5 including: (a) a housing radial seal member positioned at a location within 40 mm of the first end.

7. A filter cartridge characterized by: (a) an extension of media surrounding an open interior and having a first end and a second end; (i) the media comprising a plurality of pleats each having a pleat depth decreasing in extension from the second end in a direction toward the first end; and, (b) a housing radial seal member positioned at a location within 50 mm of the first end.

8. A filter cartridge according to any one of characterizations 1-7 wherein: (a) the media surrounds and defines a central cartridge axis; and, (b) the media includes a plurality of inner pleats having inner pleat tips extending at an acute angle of no more than 88°, relative to a plane perpendicular to a central axis, in extension toward the first end.

9. A filter cartridge according to any one of characterizations 1-8 wherein: (a) the media surrounds and defines a central cartridge axis; and, (b) the media includes a plurality of inner pleats having inner pleat tips extending at an acute angle within the range of 70°-88°, inclusive, relative to a plane perpendicular to the central axis, in extension toward the first end.

10. A filter cartridge according to any one of characterizations 1-9 wherein: (a) the media surrounds and defines a central cartridge axis; and, (b) the media includes a plurality of outer pleats and a plurality of inner pleats; (i) the inner pleats including a plurality of inner pleat tips extending at a first angle relative to a plane perpendicular to the central axis, in extension from the second end toward the first end; and, (ii) the outer pleats including a plurality of outer pleats tips extending at a second angle, relative to a plane perpendicular to the central axis, in extension from the second end toward the first end; (ii) the second angle being greater than the first angle, with respect to a plane perpendicular to the central axis.

11. A filter cartridge according to any one of characterizations 1-10 wherein: (a) the media surrounds and defines a central cartridge axis; and, (b) the media includes a plurality of outer pleats having outer pleat tips extending at an angle within the range of 88°-90°, inclusive, relative to a plane perpendicular to the central axis, in extension from the second end toward the first end.

12. A filter cartridge characterized by: (a) an extension of media having a first end and a second end; (i) the media surrounding and defining an open interior; (ii) adjacent the second end, the extension of media being pleated; and, (b) a radially directed housing seal member positioned at a location within 50 mm of the first end of the extension of media; (i) the filter cartridge having a maximum, undistorted, radial width dimension, at a location in radial overlap with the media and the housing radial seal member, of at least 10 mm less than a maximum pleat depth of the extension of media adjacent the second end of the extension of media.

13. A filter cartridge characterized by: (a) an extension of media surrounding an open interior and having a first end and a second end; (i) the media, adjacent the second end, being pleated and comprising a plurality of outwardly directed pleats and a plurality of inwardly directed pleats; and, (ii) each one of the plurality of outwardly directed pleats having a pleat tip with an outer perimeter tip shape, (iii) an inner perimeter tip shape, of each pleat tip of the plurality of inwardly directed pleats, being narrower than the pleat tip shape of each one of the plurality of outwardly directed pleats; (A) the outer pleat tips having an outer, perimeter, pleat shape at a location adjacent the second end with a radius of at least 4 mm.

14. A filter cartridge according to any one of characterizations 1-13 including: (a) a radially directed housing seal member at a location within 40 mm of the first end of the media.

15. A filter cartridge according to any one of characterizations 1-14 including: (a) a radially directed housing seal member positioned within 30 mm of the first end of the media.

16. A filter cartridge according to any one of characterizations 1-15 including: (a) a radially directed housing seal member positioned at a location within 20 mm of the first end of the media.

17. A filter cartridge according to any one of characterizations 1-16 including: (a) a radially directed housing seal member positioned at a location within 15 mm of the first end of the media.

18. A filter cartridge according to any one of characterizations 1-17 including: (a) a radially outwardly directed housing seal member.

19. A filter cartridge characterized by: (a) an extension of media surrounding an open interior and having a first end and a second end; (i) the extension of media being pleated adjacent the second end; and, (b) a media support; (i) the media including a non-pleated, free, tip section adjacent the media first end that extends, axially, in a direction away from the second end, an axial distance of at least 0.5 mm beyond a nearest adjacent portion of the media support.

20. A filter cartridge characterized by: (a) an extension of pleated media having a first end and a second end; (i) the extension of media surrounding an open filter interior; and, (b) a media support including a first, intermediate, outer pleat spacer positioned between the media first end and the media second end; (i) the first, intermediate, outer pleat spacer defining an outer pleat engagement shape with an outer pleat radius of at least 4 mm; and, (ii) the first, intermediate, outer pleat spacer having radial projections defining inner pleat engagement tips having an outer pleat angle of at least 30°.

21. A filter cartridge characterized by: (a) an extension of media having first end and a second end; (i) the extension of media comprising a plurality of pleats adjacent the second end; and, (ii) the media surrounding a central axis and defining an open interior; and, (b) a plurality of intermediate outer pleat spacers positioned between the media first and second ends; (i) axially spaced, adjacent, ones of the plurality of intermediate outer pleat spacers having different amounts of radial projection extension toward the central axis.

22. A filter cartridge characterized by: (a) an extension of media having a first end and a second end; (i) the extension of media comprising a plurality of pleats adjacent the second end; and, (ii) the media surrounding and defining an open interior; and, (b) a media support including longitudinal ribs extending along, and secured to, outer pleat tips of the media in extension from the second end of the media toward the first end of the media, along at least 50% of a length of extension of the outer pleat tips.

23. A filter cartridge characterized by: (a) media extending between first and second ends and surrounding and defining a central axis and open interior; and, (b) an end piece adjacent the second end of the media; (i) the end piece defining an outer perimeter of alternating radial outward projections and radial inward recesses; and, (ii) adjacent ones of the outward projections being spaced by a radial gap of at least 30°.

24. A filter cartridge characterized by: (a) media extending between first and second ends and surrounding and defining a central axis and an open central interior; and, (i) the media being pleated adjacent the second end; and, (b) an end piece adjacent the second end of the media; (i) the end piece defining an outer perimeter of alternating radial outer projections and radial inward recesses; and, (ii) the end piece radial inward recesses being open, in axial overlap with spaces between outer pleats, by a gap of at least 15 mm in maximum width at a location remote from inner pleat tips.

25. A filter cartridge characterized by: (a) media extending between first and second media ends and surrounding and defining a central axis and an open central interior; and, (b) an end piece adjacent to, and extending across, the second media end;
the end piece including: an outer surface directed away from the first media end; and, an inner surface directed toward the first media end; (i) the inner surface of the end piece having a central recess therein extending in a direction away from the first media end; and, (c) a cushion member positioned with at least a portion thereof in the central recess.

26. A filter cartridge characterized by: (a) an extension of media having a first end and a second end and surrounding a central axis and a central interior; (b) a media support including an end piece adjacent to the second media end; (i) the end piece having a central projection with an aperture therethrough; and, (c) a radially outwardly directed housing radial seal member positioned on, and surrounding, the media support at a location within 50 mm of the first end of the media.

27. A filter cartridge characterized by: (a) media extending between first and second ends and surrounding and defining a central axis and an open central interior; and, (b) an end piece adjacent the second end of the media; (i) the end piece having an inner surface with a central recess therein; (ii) the central recess being defined by a projection extending away from the media first end having a wall surrounded by, and spaced from, the media; and, (iii) the projection having a tip, remote from the media first end, with an aperture therethrough.

28. A filter cartridge according to any one of characterizations 26-27 wherein: (a) a cushion member is positioned extending through the aperture in the central projection.

29. A filter cartridge according to characterization 28 wherein: (a) the cushion member is closed.

30. A filter cartridge according to any one of characterizations 28 and 29 wherein: (a) the cushion member includes a housing engagement cushion portion at a location outside of the central projection and having a largest cross-dimension than a tip of the central projection.

31. A filter cartridge according to any one of characterizations 23-30 wherein: (a) the media is pleated adjacent the second end.

32. A filter cartridge according to characterization 31 wherein: (a) the media, adjacent the second end, includes a plurality of inner pleat tips extending at an angle of no greater than 88°, relative to a plane perpendicular to the central axis, in extension from the second end toward the first end.

33. A filter cartridge according to any one of characterizations 1-32 wherein: (a) the first end of the media is not pleated.

34. A filter cartridge according to any one of characterizations 1-33 wherein: (a) at the second end, the media is pleated with a pleat depth of at least 10 mm.

35. A filter cartridge according to any one of characterizations 1-34 wherein: (a) at the second end, the media is pleated with a pleat depth of at least 15 mm.

36. A filter cartridge according to any one of characterizations 1-35 wherein: (a) at the second end, the media is pleated with a pleat depth within the range of 10 to 40 mm, inclusive.

37. A filter cartridge according to any one of characterizations 1-36 wherein: (a) the media includes a plurality of outer pleats adjacent the second end; each one of the plurality of outer pleats having an outer pleat tip extending at an acute angle of at least 86°, in extension toward the second end, relative to a plane perpendicular to the central axis.

38. A filter cartridge according to any one of characterizations 1-37 wherein: (a) the media includes a plurality of outer pleats adjacent the second end; each one of the plurality of outer pleats having an outer pleat tip extending and an acute angle of at least 87°, in extension toward the second end, relative to a plane perpendicular to the central axis.

39. A filter cartridge according to any one of characterizations 1-38 wherein: (a) the media includes a plurality of outer pleats adjacent the second end; each one of the plurality of outer pleats having an outer pleat tip extending at an acute angle within the range of 87–90°, inclusive, in extension toward the second end, relative to a plane perpendicular to the central axis.

40. A filter cartridge according to any one of characterizations 1-39 wherein: (a) the media comprises a plurality of inner pleats adjacent the second end, each one of plurality of inner pleats having an inner pleat tip that extend at an angle of no greater than 87°, relative to a plane perpendicular to the central axis, in extension toward the first end.

41. A filter cartridge according to any one of characterizations 1-40 wherein: (a) the media comprises a plurality of outer pleats with outer pleat tips and a plurality of inner pleats with inner pleat tips; (i) the inner pleat tips extending at a first angle relative to a plane perpendicular to the central axis, in extension from the second end toward the first end; and, (ii) the outer pleat tips extending at a second angle, relative to a plane perpendicular to the central axis, in extension from the second end toward the first end; (iii) the first angle being at least 2° less than the second angle.

42. A filter cartridge according to characterization 41 wherein: (a) the first angle is at least 3° less than the second angle.

43. A filter cartridge according to any one of characterizations 41 and 42 wherein: (a) the first angle is at least 4° less than the second angle.

44. A filter cartridge according to any one of characterizations 1-43 wherein: (a) the filter cartridge is open at an end adjacent the first end of the media.

45. A filter cartridge according to any one of characterizations 1-44 including: (a) a radially directed housing seal arrangement.

46. A filter cartridge according to characterizations 45 wherein: (a) the radially directed housing seal arrangement is a radially outwardly directed housing seal arrangement.

47. A filter cartridge according to any one of characterizations 1-46 including: (a) a radially directed housing seal arrangement comprising an o-ring.

48. A filter cartridge according to any one of characterizations 1-47 including: (a) a media support extending from the second end toward the first end of the media.

49. A filter cartridge according to characterization 48 wherein: (a) the media has an outer surface and an inner surface; (b) the media support has first and second ends; and, (c) the media support extends along the outer surface of the media, with no radial support for the media that extends at least 50% of a distance between the first and second ends of the support, that is also positioned projecting radially inwardly from adjacent portions of the media inner surface.

50. A filter cartridge according to any one of characterizations 48 and 49 wherein: (a) the media support includes: an open end within 20 mm of media first end; and, an end piece adjacent the media second end.

51. A filter cartridge according to characterization 50 wherein: (a) the end piece of the media support includes a central aperture therethrough that is lined with a resilient cushion member.

52. A filter cartridge according to any one of characterizations 50 and 51 wherein: (a) the end piece of the media support comprises an end piece having an outer perimeter of alternating radial projections and radial recess; the radial recesses extending radially inwardly at least 10 mm from the outermost portions of the radial projections.

53. A filter cartridge according to any one of characterizations 50-52 wherein: (a) the end piece of the media support comprises an end piece having an outer perimeter of alternating radial projections and radial recess; the radial recesses extending radially inwardly at least 15 mm from the outermost portions of the radial projections.

54. A filter cartridge according to any one of characterizations 50-53 wherein: (a) the end piece of the media support comprises an end piece having an outer perimeter with a plurality of radial recesses therein; each one of the plurality of radial recesses extending toward a central axis by at least 30% of a radial distance between an outermost portion of the closed end of the media support and the central axis.

55. A filter cartridge according to any one of characterizations 50-54 wherein: (a) the end piece of the media support comprises an end piece having an outer perimeter with a plurality of radial recesses therein; each one of the plurality of radial recess extending toward a central axial by at least 35% of a radial distance between an outermost portion of the closed end of the media support and the central axis.

56. A secondary filter cartridge according to any one of characterizations 50-55 wherein: (a) the end piece of the media support comprises an end piece having an outer perimeter with a plurality of radial recesses therein; each one of the plurality of radial recesses extending toward a central axis by at least 40% of a radial distance between an outermost portion of the closed end of the media support and the central axis.

57. A filter cartridge according to any one of characterizations 50-56 wherein: (a) the end piece of the media support includes an inner surface with an axially projecting receiver recess therein; (i) the axially projecting receiver recess projecting axially in a direction away from a first end of the media.

58. A filter cartridge according to any one of characterizations 50-57 wherein: (a) the end piece of the media support includes an outer surface with a central receiving groove therein surrounding an outer, central, projection; (i) the outer, central, projection projecting in a direction axially away from the first end of the media.

59. A filter cartridge according to characterization 58 wherein: (a) the outer, central, projection includes an aperture therethrough, that is lined with a resilient cushion member.

60. A filter cartridge according to any one of characterizations 58 and 59 wherein: (a) the central receiving groove is at least 5 mm deep, in axial direction toward the first end of the media, from any immediately surrounding portion of the closed end of the media support.

61. A filter cartridge according to any one of characterizations 58-60 wherein: (a) the outer central projection projects to a tip located axially beyond the second end of the media, from the first end of the media.

62. A filter cartridge according to any one of characterizations 58-61 wherein: (a) the outer central projection projects to a tip at least 5 mm from an immediately surrounding portion of the closed end, in a direction axially away from the open end.

63. A filter cartridge according to any one of characterizations 58-62 wherein: (a) the outer central projection projects to a tip located at least 10 mm from an immediately surrounding portion of the end piece in a direction axially away from the open end.

64. A filter cartridge according to any one of characterizations 58-63 wherein: (a) the media support includes a plurality of longitudinal ribs extending in a direction from the second end of the media toward the first end on the media.

65. A filter cartridge according to characterization 64 wherein: (a) each one of the plurality of longitudinal ribs extends along, and engages, an outer pleat tip of the media.

66. A filter cartridge according to any one of characterizations 58-65 wherein: (a) the media support includes at least one intermediate pleat spacer surrounding an outer surface of the media and having radial projections extending between adjacent media pleats.

67. A filter cartridge according to any one of characterizations 58-63 wherein: (a) the media support includes a plurality of intermediate pleat spacers surrounding an outer surface of the media and having radial projections extending between adjacent media pleats.

68. A filter cartridge according to any one of characterizations 1-67 including: (a) a seal support ring surrounding the media within 50 mm of the media first end; (i) the seal support ring including an o-ring receiving groove therein; and, (ii) the seal support ring including a plurality of spaced radial expansion gussets tapering radially inwardly along a direction of extension from a location adjacent the o-ring receiving groove toward the first end of the media.

69. A filter cartridge according to any one of characterizations 1-68 including: (a) an end piece adjacent to the second media end; the end piece including: an outer surface directed away from the first media end; and, an inner surface directed toward the first media end; (i) the inner surface of the end piece having a central recess therein extending in a direction away from the media end; (ii) the central recess being defined by a central projection having a tip with an aperture therethrough; and, (b) a resilient cushion member arrangement positioned in the central recess and projection through, and closing, the aperture in the tip of the central projection; (i) the cushion member arrangement defining a cushion receiver region within the central recess; and, (ii) the cushion member arrangement including an outer radial projection member positioned at an opposite side of the aperture from the central recess.

70. A filter cartridge characterized by: (a) an extension of media surrounding an open interior and having a first end and a second end; (b) an end piece adjacent to the second media end; the end piece including: an outer surface directed away from the first media end; and, an inner surface directed toward the first media end; (i) the inner surface of the end piece having a central recess therein extending in a direction away from the media end; (ii) the central recess being defined by a central projection having a tip with an aperture therethrough; and, (c) a cushion member arrangement positioned in the central recess and projections through, and closing, the aperture in the tip of the central projection; (i) the cushion member arrangement defining a cushion receiver region within the central recess; and, (ii) the cushion member arrangement including an outer radial projection member positioned at an opposite side of the aperture from the central recess.

71. A filter cartridge according to any one of characterizations 69 and 70 wherein: (a) the radial projection member of the cushion member arrangement has a largest radial cross-dimension of at least 15 mm.

72. A filter cartridge according to any one of characterizations 69-71 wherein: (a) the radial projection member of the cushion member arrangement has a largest radial cross-dimension of at least 18 mm.

73. A filter cartridge according to any of characterizations 69-72 wherein: (a) the radial projection member of the cushion member arrangement has a largest radial cross-dimension within the range of 15-30 mm.

74. A filter cartridge according to any one of characterizations 69-73 wherein: (a) the radial projection member of the cushion member arrangement has a largest radial cross-dimension of no greater than 25 mm.

75. A filter cartridge according to any one of characterizations 69-74 wherein: (a) the radial projection member of the cushion member arrangement has a largest radial cross-dimension at least 0.5 mm larger than the tip of the central projection.

76. A filter cartridge according to any one of characterizations 69-75 wherein: (a) the radial projection member of the cushion member arrangement has a largest radial cross-dimension at least 1 mm larger than the tip of the central projection.

77. A filter cartridge according to any one of characterizations 64-76 wherein: (a) the radial projection member of the cushion member arrangement has a circular outer perimeter.

78. A filter cartridge according to any one of characterizations 69-74 wherein: (a) the cushion member arrangement comprises a single integrally molded grommet member.

79. A filter cartridge according to any one of characterizations 69-78 wherein: (a) the cushion member arrangement comprises a single grommet having a hardness of no greater than 80 Shore A.

80. A filter cartridge according to any one of characterizations 69-79 wherein: (a) the cushion member arrangement comprises a single grommet having a hardness within the range of 50-80 Shore A.

81. A filter cartridge according to characterization 70 wherein: (a) the end piece adjacent to the second media end has a circular outer perimeter.

82. A filter cartridge according to characterization 81 wherein: (a) the media is pleated with a pleat depth that does not vary in extension from the first end to the second end.

83. A filter cartridge according to any one of characterizations 70-82 wherein: (a) the central projection, on the end piece adjacent to the second media end, is surrounded by a receiving groove positioned around the central projection and having an outer wall spaced from the central projection to provide a cross-dimension at an inner end of the groove of at least 4 mm and no more than 25 mm, at a location adjacent an innermost end of the central projection.

84. A filter cartridge according to any one of characterizations 70-83 wherein: (a) the media is pleated with a pleat depth that does not vary in extension from the first end to the second end.

85. A gas filter assembly characterized by: (a) a housing defining: an interior, a gas flow inlet; and, a gas flow outlet; (i) the housing including a housing base section and a removable access cover; (b) a safety filter cartridge according to at least one of claims 1-84 operably and removably positioned within the housing interior; and, (c) a main filter cartridge comprising media surrounding an open filter interior; (i) the main filter cartridge being operably and removably positioned within the housing interior with media of the safety cartridge projecting into the open filter interior of the main filter cartridge.

86. A gas filter assembly according to characterization 85 wherein: (a) the housing includes a central cartridge support in the housing base section directed toward the access cover; and, (b) the safety filter cartridge is positioned with the central cartridge support projecting into an open filter interior of the safety filter cartridge.

87. A gas filter assembly according to characterization 86 wherein: (a) the central cartridge support includes a central cartridge support end directed toward the access cover; (i) the central cartridge support end including a central projection thereon; and, (b) the safety filter cartridge includes an inner surface having a receiver recess into which the central projection on the central cartridge support extends; (i) a resilient cushion member being provided with a portion in the receiver recess of the safety filter cartridge and around the central projection on the central cartridge support.

88. A gas filter assembly according to any one of characterizations 86 and 87 wherein: (a) the central cartridge support includes a central cartridge support end directed toward the access cover; (i) the central cartridge support end including a central projection thereon; and, (b) the safety filter cartridge including an end directed toward the access cover with a projection having a tip with an aperture therethrough; (i) the central projection on the central cartridge support projecting completely through the aperture in the tip of the projection in the safety filter cartridge.

89. A gas filter assembly according to characterization 88 wherein: (a) the aperture in the tip of the projection in the safety filter cartridge is closed by a resilient cushion member that projects through the aperture.

90. A gas filter assembly according to any one of characterizations 87-89 including: (a) a resilient cushion member on the safety filter cartridge in releasable sealing engagement around the central projection on the central cartridge support.

91. A gas filter assembly according to any one of characterizations 88-90 wherein: (a) the central projection on the central cartridge support includes a tip and a neck section; (i) the neck section having a narrower cross-sectional dimension than a dimension of the central projection, on the central cartridge support, adjacent the tip.

92. A gas filter assembly according to characterization 91 wherein: (a) an interference fit is provided between the tip of the central projection on the central cartridge support, and the safety filter cartridge, by the tip and the neck section.

93. A gas filter assembly according to any one of characterizations 87-90 wherein: (a) a resilient cushion member on the safety filter cartridge comprises a grommet projecting through an aperture in a tip of the central projection on the cartridge support; (i) the grommet closing the aperture in the tip; (b) the grommet including an outer radial projection member positioned on opposite side of the aperture from the central recess; and, (c) the main filter cartridge including an end with a receiver therein positioned surrounding, and in interference engagement with, the outer radial projection member of the grommet.

94. A gas filter assembly according to characterization 93 wherein: (a) the outer radial projection member of the grommet is contacted by the receiver on the main filter cartridge with a continuous 360° contact around a central axis.

95. A gas filter assembly according to any one of characterizations 85-94 wherein: (a) the housing includes a seal flange surrounding a safety filter cartridge end receiver recess; and, (b) the safety filter cartridge is positioned with the media first end projecting into the safety filter cartridge end receiver recess.

96. A gas filter assembly according to characterization 95 wherein: (a) the safety filter cartridge end receiver recess has a maximum radial width of no greater than 15 mm; and, (b) the safety filter cartridge includes media having a pleat depth, adjacent a second end, of greater than 15 mm.

97. A gas filter assembly according to any one of characterizations 95 and 96 wherein: (a) at the media first end, the safety filter cartridge is non-pleated.

98. A gas filter assembly according to any one of characterizations 95-97 wherein: (a) the media first end, of the safety filter cartridge, is a free end having a tip of extension of at least 0.5 mm with no end cap thereon, and no media support structure, of the safety filter cartridge, positioned radially thereagainst.

99. A gas filter assembly according to any one of characterizations 95-98 wherein: (a) the safety filter cartridge end receiver recess is positioned between the seal flange and a base end of a central cartridge support; (i) the central cartridge support being separate from the safety filter cartridge and being positioned in the housing at a location projecting toward the access cover.

100. A gas filter assembly according to any one of characterizations 85-99 wherein: (a) the media of the main filter cartridge has a first end and a second end; (i) the media of the main filter cartridge having an internal perimeter that decreases in cross-sectional dimension in extension from the first end to the second end.

101. A gas filter assembly according to characterization 100 wherein: (a) the main filter cartridge includes a first end piece adjacent the first end and a second end piece positioned toward the second end; (i) the first end piece being open; and, (ii) the second end piece being closed and including a central projection thereon projecting from the second end of the media toward the first end of the media at least 15% of a distance from the second end of the media toward the first end of the media.

102. A gas filter assembly according to any one of characterizations 85-101 wherein: (a) the main filter cartridge includes a first end piece adjacent the first end and a second end piece spaced toward the second end; (i) the first end piece being open; and, (ii) the second end piece being closed and including a central projection thereon projecting from the second end of the media toward the first end of the media at least 20% of a distance from the second end of the media toward the first end of the media.

103. A gas filter assembly according to any one of characterizations 100-102 wherein: (a) the safety filter cartridge projects into the open filter interior of the main filter cartridge to a location no more than 90% of a distance from the first end of the main filter cartridge media to the second end of the main filter cartridge media.

104. A gas filter assembly according to any one of characterizations 100-103 wherein: (a) the safety filter cartridge projects into the open filter interior of the main filter cartridge to a location no more than 85% of a distance from the first end of the main filter cartridge media to the second end of the main filter cartridge media.

105. A gas filter assembly according to any one of characterizations 100-104 wherein: (a) at a location around the second end of the media of the safety cartridge, a clearance between the main filter cartridge and the safety cartridge is no more than 8 mm.

106. A gas filter assembly according to any one of characterizations 85-105 wherein: (a) the housing includes a central cartridge support, in the housing base section, directed toward the access cover; (b) the safety filter cartridge is positioned with the central cartridge support projecting into an open filter interior of the safety filter cartridge; (c) the safety filter cartridge includes an end, directed toward the access cover, having a recess into which the central projection on the cartridge support extends; (i) the receiver recess in the safety filter cartridge being defined by a projection directed toward the access cover; (d) a resilient cushion member being provided in the receiver recess of the safety filter cartridge and around the central projection on the central cartridge support; and, (e) the main filter cartridge includes a closed end piece having an inner surface with a receiver recess therein; (i) the central projection on the cartridge support, and the projection on the safety filter cartridge, defining the receiver recess in the safety filter cartridge, projecting into the receiver recess in the inner surface of the closed end piece of the main filter cartridge.

107. A gas filter assembly according to any one of characterizations 85-106 wherein: (a) the housing includes a central cartridge support in the housing base section directed toward the access cover; (b) the safety filter cartridge is positioned with the central cartridge support projecting into an open filter interior of the safety filter cartridge; (c) a resilient cushion member is provided in the receiver recess of the safety filter cartridge around the central projection on the central cartridge support; (d) the safety filter cartridge includes an end directed toward the access cover having an outer surface with a receiver groove surrounding a central projection; and, (e) the main filter cartridge includes a closed end piece having an inner surface with a projection extending into the receiver groove on the outer surface of the safety cartridge end.

108. A gas filter assembly characterized by: (a) a housing defining an interior, a gas flow inlet; and, a gas flow outlet; (i) the housing including a housing base section and a removable access cover; (ii) the housing including a central cartridge support in the housing base section directed toward the access cover; (b) a safety filter cartridge positioned over the central cartridge support; the safety filter comprising media having first and second ends, surrounding a central axis and defining an open interior; (i) at the first end, the media having no pleat greater than 3 mm in depth; and, (ii) at the second end, the media comprising a plurality of pleats each having a pleat depth of at least 10 mm; (c) a main filter cartridge comprising media surrounding a central axis end defining an open interior; (i) the media being pleated in extension between first and second ends; (ii) the media tapering inwardly in extension from the first end toward the second end; (iii) the main filter cartridge including a first, open, end piece on the media first end; (A) a radially inwardly directed housing seal being positioned on the first end piece; and, (iv) the main filter cartridge including a closed end piece on the media second end; (A) the closed end piece including a central projection extending toward the first end of the media to a location at least 15% of a distance between the media second end and the media first end.

109. A gas filter assembly according to characterizations 108 wherein: (a) the closed end piece including a central projection extending toward the first end of the media to a location at least 20% of a distance between the media second end and the media first end.

110. A gas filter assembly according to any one of characterizations 108 and 109 wherein: (a) the closed end piece including a central projection extending toward the first end of the media to a location at least 25% of a distance between the media second end and the media first end.

111. A gas filter assembly according to any one of characterizations 108-110 wherein: (a) the safety filter cartridge is in accord with any one of characterizations 1-84.

112. A gas filter assembly according to any one of characterizations 108-111 wherein: (a) the assembly is also in accord with any one of characterizations 85-107.

113. A gas filter assembly characterized by: (a) a housing defining: an interior; a gas flow inlet; a gas flow outlet; and, a seal flange; (i) the housing including a housing base section and a removable access cover; (b) a main filter cartridge support positioned in the housing interior; (i) the main cartridge support including an end remote from the gas flow outlet; (c) a resilient cushion member positioned on the end of the main cartridge support remote from the gas flow outlet; (i) the resilient cushion member including an outer radial projection member; and, (d) a main filter cartridge comprising media surrounding an open filter interior; (i) the media extending between first and second ends; (ii) the main filter cartridge including an open end having a housing seal member thereon, adjacent the media first end; (A) the housing seal member comprising a radially directed seal member; (iii) the main filter cartridge includes a closed end remote from the open end; (A) the filter cartridge closed end including a receiver therein positioned surrounded by, and in releasable interference engagement with, the outlet radial projection member.

114. A gas filter assembly according to characterization 113 wherein: (a) the main filter cartridge support comprises a safety filter cartridge removably positioned within the gas filter assembly.

115. A gas filter assembly according to characterization 114 wherein: (a) the safety filter cartridge is in accord with any one of characterizations 1-84.

116. A gas filter assembly according to any one of characterizations 114-115 wherein: (a) the housing includes a central cartridge support; and, (b) the safety filter is removeably positioned over the central cartridge support.

117. A gas filter assembly according to any one of characterizations 114-116 wherein: (a) the assembly is also in accord with any one of characterizations 85-112.

118. A gas filter assembly in accord with any one of characterizations 113-117 wherein: (a) the main filter cartridge is in accord with characterization 125.

119. A gas filter assembly according to characterization 118 wherein: (a) the main filter cartridge is in accord with any one of characterizations 126-136.

120. A gas filter assembly in accord with any one of characterizations 118-119 wherein: (a) the main filter cartridge is in accord with any one of characterizations 136-138.

121. A gas filter assembly in accord with any one of characterizations 118-120 wherein (a) the main filter cartridge is in accord with any one of characterizations 139-141.

122. A gas filter assembly in accord with any one of characterizations 115-121 wherein: (a) the main filter cartridge is installed in accord with the method of characterizations 142.

123. A housing for a gas filter assembly; the housing: (a) defining an interior and a gas flow outlet; (i) the housing including a housing base section and a removable access cover; (b) the housing including a central cartridge support in the housing base section directed toward the access cover; and, (c) the central cartridge support includes a cartridge support end directed toward the access cover having a central projection with an end tip and a neck section; (i) the neck section having a narrower cross-sectional dimension than a dimension of the central projection on the central cartridge support, adjacent the end tip.

124. A housing according to characterization 123 including: (a) a seal flange surrounding an end of the central cartridge support defining a safety filter cartridge and receiver recess having a maximum radial width of no greater than 25 mm.

125. A main air filter cartridge for removable installation in an air cleaner housing over, and in releasable support engagement with, a cushion member positioned within the air cleaner housing; the main air filter cartridge comprising: (a) media surrounding and defining an open interior and a central axis; (i) the media extending between first and second ends; (b) a first end piece at the first end of the media; (i) the first end piece having a central air flow aperture therethrough, in communication with the open filter interior; (c) a radially directed housing seal arrangement on the first end piece and surrounding the central air flow aperture; (d) a central closure member extending across, and closing, the filter cartridge at a location spaced toward the second end of the media from the first end of the media; (i) the central closure member having an inner surface and an outer surface; (ii) the inner surface of the central closure member defining a central recess therein, defined by an inner surface of a surrounding central projection on the outer surface; (A) the central recess including resilient cushion member engagement sidewall portion having a largest cross-section dimension of within the range of 12-26 mm at a selected location for releasable supported engagement with a resilient cushion member positioned in a housing, during installation; (iii) the outer surface of the central closure member having a receiving groove therein, surrounding the central projection; (A) the receiving groove being defined between inner and outer sidewalls, joined at a ring tip; (1) the inner sidewall comprising a portion of the central projection; (2) the ring tip having an outer width of no greater than 30 mm; and, (3) the groove being at least 10 mm deep with respect to the outer sidewall.

126. A main filter cartridge according to characterization 125 wherein: (a) the resilient cushion member engagement sidewall portion defines an inner surface section having a circular cross-section taken in direction perpendicular to the central axis.

127. A main filter cartridge according to any one of characterizations 125 and 126 wherein: (a) the resilient cushion member engagement sidewall portion defines an inner surface section having a taper angle, relative to a central axis, within the range of 0.5°-7,° inclusive, at a location that is engaged by a resilient cushion member, during installation.

128. A main filter cartridge according to characterization 127 wherein: (a) the resilient cushion member engagement sidewall portion defines an inner surface section having a taper angle of at least 1°, at a location that is engaged by a resilient cushion member, during installation.

129. A main filter cartridge according to any one of characterizations 127 and 128 wherein:
(a) the receiving groove is no greater than 30 mm wide at an innermost portion thereof.

130. A main filter cartridge according to any one of characterizations 128 and 129 wherein: (a) the receiving groove is no greater than 25 mm wide at an innermost portion thereof 131. A main filter cartridge according to any one of characterizations 129 and 130 wherein: (a) the receiving groove is no greater than 12 mm wide.

132. A main air filter cartridge according to any one of characterizations 125-131 wherein: (a) the outer sidewall, of the receiving groove, has an outward taper at an angle of at least 40° relative to a plane perpendicular to the central axis.

133. A main air filter cartridge according to characterization 132 wherein: (a) the outer sidewall, of the receiving groove, has an outward taper at an angle of at least 50° relative to a plane perpendicular to the central axis.

134. A main air filter cartridge according to characterization 132 wherein: (a) the outer sidewall, of the receiving groove, has an outward taper at an angle of at least 60° relative to a plane perpendicular to the central axis.

135. A main filter cartridge according to any one of characterizations 125-134 wherein: (a) the housing seal arrangement comprises a radially inwardly directed housing seal member.

136. A main filter cartridge according to characterization 131 wherein: (a) the housing seal member is positioned at a location surrounded by the media.

137. A main air filter cartridge according to any one of characterizations 125-136 wherein: (a) the media tapers downwardly in extension from the first end of the second end.

138. A main air filter cartridge according to any one of characterizations 125-137 wherein: (a) the media is pleated.

139. A main filter cartridge according to any one of characterizations 125-138 wherein: (a) the ring tip projects to a location at least 5% from the media second end toward the media first end.

140. A main filter cartridge according to any one of characterizations 125-138 wherein: (a) ring tip projects to a location at least 10% from the media second end toward the media first end.

141. A main filter cartridge according to any one of characterizations 125-140 wherein: (a) ring tip projects to a location at least 20% from the media second end toward the media first end.

142. A method of installing a main air filter cartridge according to any one of characterizations 125-141 in a housing of an air cleaner assembly; the method comprising a step of: (a) pushing the main air filter cartridge over a support having a resilient cushion member thereon until: (i) the housing seal arrangement is in releasable sealing engagement with the air cleaner housing; and, (ii) the resilient cushion member is in releasable supporting engagement with the inner surface of the central recess defined by the central projection on the central closure member.

143. A method according to characterization 142 wherein: (a) the resilient cushion member is positioned on a safety cartridge in accord with any one of characterizations 1-84.

144. A method according to any one of characterizations 142 and 143 wherein: (a) the air cleaner assembly is a filter assembly in accord with any one of characterizations 85-122.

The principles, techniques, and features described herein can be applied in a variety of systems, and there is no requirement that all of the advantageous features identified be incorporated in an assembly, system or component to obtain some benefit according to the present disclosure. In addition, the dimensions characterizing an example system are meant to indicate a usable construction, and variations from them are possible.

What is claimed is:
1. A filter cartridge comprising:
(a) an extension of media surrounding an open interior and having a first end and a second end;
(i) at the first end, the media having no pleat greater than 3 mm in depth; and,

(ii) at the second end, the media comprising a plurality of pleats each having a pleat depth of at least 10 mm.

2. A filter cartridge according to claim 1 wherein:
(a) the extension of media surrounds a central axis;
  (i) the media being pleated adjacent the second end and defining a plurality of inner pleat tips extending at an acute angle, relative to a plane perpendicular to a central axis, of no greater than 89°, in extension toward the first end; and,
  (ii) the media being non-pleated at the first end.

3. A filter cartridge according to claim 1 including:
(a) a radially directed housing seal member positioned at a location within 50 mm of the first end of the extension of media;
  (i) the filter cartridge having a maximum, undistorted, radial width dimension, at a location in radial overlap with the media and the housing radial seal member, of at least 10 mm less than a maximum pleat depth of the extension of media adjacent the second end of the extension of media.

4. A filter cartridge according to claim 1 including:
(a) a media support;
  (i) the media including a non-pleated, free, tip section adjacent the media first end that extends, axially, in a direction away from the second end, an axial distance of at least 0.5 mm beyond a nearest adjacent portion of the media support.

5. A filter cartridge according to claim 1 including:
(a) a housing radial seal member positioned at a location within 40 mm of the first end.

6. A filter cartridge according to claim 1 wherein:
(a) the media surrounds and defines a central cartridge axis; and,
(b) the media includes a plurality of inner pleats having inner pleat tips extending at an acute angle of no more than 88°, relative to a plane perpendicular to a central axis, in extension toward the first end.

7. A filter cartridge according to claims 1 wherein:
(a) the media surrounds and defines a central cartridge axis; and,
(b) the media includes a plurality of inner pleats having inner pleat tips extending at an acute angle within the range of 70°-88°, inclusive, relative to a plane perpendicular to the central axis, in extension toward the first end.

8. A filter cartridge according to claim 1 wherein:
(a) the media surrounds and defines a central cartridge axis; and,
(b) the media includes a plurality of outer pleats and a plurality of inner pleats;
  (i) the inner pleats including a plurality of inner pleat tips extending at a first angle relative to a plane perpendicular to the central axis, in extension from the second end toward the first end; and,
  (ii) the outer pleats including a plurality of outer pleats tips extending at a second angle, relative to a plane perpendicular to the central axis, in extension from the second end toward the first end;
  (ii) the second angle being greater than the first angle, with respect to a plane perpendicular to the central axis.

9. A filter cartridge according to claim 1 wherein:
(a) the media surrounds and defines a central cartridge axis; and,
(b) the media includes a plurality of outer pleats having outer pleat tips extending at an angle within the range of 88°- 90°, inclusive, relative to a plane perpendicular to the central axis, in extension from the second end toward the first end.

10. A filter cartridge comprising:
(a) an extension of media surrounding a central axis and defining an open interior;
  (i) the media having first and second ends; and,
  (ii) the media being pleated adjacent the second end and defining a plurality of inner pleat tips extending at an acute angle, relative to a plane perpendicular to a central axis, of no greater than 89°, in extension toward the first end; and,
  (iii) the media being non-pleated at the first end.

11. A filter cartridge comprising:
(a) an extension of media surrounding an open interior and having a first end and a second end;
  (i) the media comprising a plurality of pleats each having a pleat depth decreasing in extension from the second end in a direction toward the first end; and,
(b) a housing radial seal member positioned at a location within 50 mm of the first end.

12. A filter cartridge comprising:
(a) an extension of media having a first end and a second end;
  (i) the media surrounding and defining an open interior;
  (ii) adjacent the second end, the extension of media being pleated; and,
(b) a radially directed housing seal member positioned at a location within 50 mm of the first end of the extension of media;
  (i) the filter cartridge having a maximum, undistorted, radial width dimension, at a location in radial overlap with the media and the housing radial seal member, of at least 10 mm less than a maximum pleat depth of the extension of media adjacent the second end of the extension of media.

13. A filter cartridge comprising:
(a) an extension of media surrounding an open interior and having a first end and a second end;
  (i) the media, adjacent the second end, being pleated and comprising a plurality of outwardly directed pleats and a plurality of inwardly directed pleats; and,
  (ii) each one of the plurality of outwardly directed pleats having a pleat tip with an outer perimeter tip shape,
  (iii) an inner perimeter tip shape, of each pleat tip of the plurality of inwardly directed pleats, being narrower than the pleat tip shape of each one of the plurality of outwardly directed pleats;
    (A) the outer pleat tips having an outer, perimeter, pleat shape at a location adjacent the second end with a radius of at least 4 mm.

14. A filter cartridge according to claim 13 including:
(a) a radially directed housing seal member at a location within 40 mm of the first end of the media.

15. A filter cartridge according to claim 14 including:
(a) a radially directed housing seal member positioned within 30 mm of the first end of the media.

16. A filter cartridge according to claim 14 including:
(a) a radially directed housing seal member positioned at a location within 20 mm of the first end of the media.

17. A filter cartridge according to claim 14 including:
(a) a radially directed housing seal member positioned at a location within 15 mm of the first end of the media.

18. A filter cartridge according to claim 14 including:
(a) a radially outwardly directed housing seal member.

19. A filter cartridge comprising:
(a) an extension of media surrounding an open interior and having a first end and a second end;
  (i) the extension of media being pleated adjacent the second end; and,
(b) a media support;
  (i) the media including a non-pleated, free, tip section adjacent the media first end that extends, axially, in a direction away from the second end, an axial distance of at least 0.5 mm beyond a nearest adjacent portion of the media support.

* * * * *